United States Patent
Leventis et al.

(10) Patent No.: US 10,669,212 B2
(45) Date of Patent: Jun. 2, 2020

(54) HIGHLY POROUS CERAMIC AND METAL AEROGELS FROM XEROGEL POWDER PRECURSORS, AND METHODS FOR THEIR PRODUCTION AND USE

(71) Applicant: The Curators of the University of Missouri, Columbia, MO (US)

(72) Inventors: Nicholas Leventis, Rolla, MO (US); Chariklia Sotiriou-Leventis, Rolla, MO (US); Malik Adnan Saeed, Rolla, MO (US); Parwani Rewatkar, Rolla, MO (US); Tahereh Taghvaee, Rolla, MO (US)

(73) Assignee: THE CURATORS OF THE UNIVERSITY OF MISSOURI, Columbia, MO (US)

( * ) Notice: Subject to any disclaimer, the term of this patent is extended or adjusted under 35 U.S.C. 154(b) by 257 days.

(21) Appl. No.: 15/946,904

(22) Filed: Apr. 6, 2018

(65) Prior Publication Data
US 2019/0308912 A1    Oct. 10, 2019

(51) Int. Cl.
C04B 38/00    (2006.01)
B22F 3/11     (2006.01)
B22F 1/00     (2006.01)

(52) U.S. Cl.
CPC ........ *C04B 38/0045* (2013.01); *B22F 1/0018* (2013.01); *B22F 3/1103* (2013.01); *B22F 3/1143* (2013.01); *C04B 38/0032* (2013.01); *B22F 2302/25* (2013.01); *B22F 2304/05* (2013.01)

(58) Field of Classification Search
None
See application file for complete search history.

(56) References Cited

U.S. PATENT DOCUMENTS

| | | | | |
|---|---|---|---|---|
| 5,484,818 A | * | 1/1996 | De Vos | C08G 18/022 521/123 |
| 7,618,608 B1 | * | 11/2009 | Keller, Sr. | C01B 33/1585 423/335 |
| 7,732,496 B1 | * | 6/2010 | Leventis | C04B 35/14 423/335 |
| 8,394,492 B1 | * | 3/2013 | Leventis | C04B 41/009 427/385.5 |
| 2004/0132846 A1 | * | 7/2004 | Leventis | C08G 18/3895 521/99 |
| 2008/0241262 A1 | * | 10/2008 | Lee | A61K 9/0009 424/490 |
| 2011/0250428 A1 | * | 10/2011 | Leventis | C01B 32/90 428/304.4 |
| 2012/0134909 A1 | * | 5/2012 | Leventis | C08G 73/1067 216/56 |
| 2012/0152846 A1 | * | 6/2012 | Leventis | C08G 18/792 210/660 |
| 2014/0147607 A1 | * | 5/2014 | Leventis | C08G 18/7657 428/36.5 |
| 2018/0112054 A1 | * | 4/2018 | Steiner, III | C08J 9/28 |
| 2019/0308912 A1 | * | 10/2019 | Leventis | B22F 3/1103 |

* cited by examiner

*Primary Examiner* — Peter A Salamon
(74) *Attorney, Agent, or Firm* — C. John Brannon; Brannon Sowers & Cracraft PC

(57) ABSTRACT

The present invention discloses novel methods for producing highly porous ceramic and/or metal aerogel monolithic objects that are hard, sturdy, and resistant to high temperatures. These methods comprise preparing nanoparticulate oxides of metals and/or metalloids via a step of vigorous stirring to prevent gelation, preparing polymer-modified xerogel powder compositions by reacting said nanoparticulate oxides with one or more polyfunctional monomers, compressing said polymer-modified xerogel powder compositions into shaped compacts, and carbothermal conversion of the shaped xerogel compacts via pyrolysis to provide the highly porous ceramic and/or metal aerogel monolithic objects that have the same shapes as to their corresponding xerogel compact precursors. Representative of the highly porous ceramic and/or metal aerogel monolithic objects of the invention are ceramic and/or metal aerogels of Si, Zr, Hf, Ti, Cr, Fe, Co, Ni, Cu, Ru, Au, and the like. Examples include sturdy, shaped, highly porous silicon carbide (SiC), silicon nitride ($Si_3N_4$), zirconium carbide (ZrC), hafnium carbide (HfC), chromium carbide ($Cr_3C_2$), titanium carbide (TiC), zirconium boride ($ZrB_2$), hafnium boride ($HfB_2$), and metallic aerogels of iron (Fe), nickel (Ni), cobalt (Co), copper (Cu), ruthenium (Ru), gold (Au), and the like. Said aerogel monolithic objects have utility in various applications such as, illustratively, in abrasives, in cutting tools, as catalyst support materials such as in reformers and converters, as filters such as for molten metals and hot gasses, in bio-medical tissue engineering such as bone replacement materials, in applications requiring strong lightweight materials such as in automotive and aircraft structural components, in ultra-high temperature ceramics, and the like.

15 Claims, 25 Drawing Sheets

Quantitative Analysis from NMR (Lorentzian fitting)

| Sample | Pyrolysis Time - Temperature | wt% Si₃N₄ | wt% SiC | wt% SiO₂ | Molar Ratio [Si₃N₄] : [SiC] : [SiO₂] |
|---|---|---|---|---|---|
| 1 | 10 h - 1450 °C | 42.15 | 19.04 | 38.81 | 1 : 1.38 : 2.15 |
| 2 | 14.39 h - 1418 °C | 69.38 | 6.55 | 24.07 | 1 : 0.33 : 0.81 |
| 3 | 14.39 h - 1482 °C | 71.14 | 13.02 | 15.84 | 1 : 0.64 : 0.32 |
| 4 | 20 h - 1450 °C | 74.24 | 5.73 | 20.03 | 1 : 0.27 : 0.63 |
| 5 | 20 h - 1470 °C | 83.14 | 6.18 | 10.68 | 1 : 0.26 : 0.30 |
| 6 | 25 h - 1405 °C | 79.83 | 3.42 | 16.75 | 1 : 0.15 : 0.49 |
| 7 | 25 h - 1450 °C | 80.37 | 5.52 | 14.11 | 1 : 0.24 : 0.41 |
| 8 | 25 h - 1495 °C | 80.47 | 7.13 | 12.40 | 1 : 0.31 : 0.36 |
| 9 | 25 h - 1450 °C | 88.72 | 7.10 | 4.18 | 1 : 0.28 : 0.11 |
| 10 | 30 h - 1430 °C | 81.86 | 6.55 | 11.57 | 1 : 0.28 : 0.33 |
| 11 | 30 h - 1470 °C | 84.96 | 6.31 | 8.73 | 1 : 0.26 : 0.24 |
| 12 | 35.61 h - 1418 °C | 86.97 | 2.98 | 10.05 | 1 : 0.12 : 0.27 |
| 13 | 35.61 h - 1482 °C | 90.10 | 6.43 | 3.47 | 1 : 0.25 : 0.09 |
| 14 | 40 h - 1450 °C | 85.06 | 5.83 | 9.11 | 1 : 0.24 : 0.25 |
| 15 | 50 h - 1500 °C | 89.88 | 0 | 0.93 | 1 : 0.00 : 0.007 |

FIG. 6

Silicon Nitride (Si₃N₄)

- Bulk density (g/cc) = 0.35 ± 0.24
- Skeletal density (g/cc) = 2.98 ± 0.01
- Porosity (% v/v) = 85.00
- % Shrinkage = 21.38 ± 0.88

Silicon Carbide (SiC)

- Bulk density (g/cc) = 0.41 ± 0.00₂
- Skeletal density (g/cc) = 3.33 ± 0.01
- Porosity (% v/v) = 87.68
- % Shrinkage = 20.80 ± 0.93

HIGHLY POROUS CERAMIC AND METAL AEROGELS FROM XEROGEL POWDER PRECURSORS, AND METHODS FOR THEIR PRODUCTION AND USE

GOVERNMENT RIGHTS

This invention was made with Government support under Grant No. W911NF-14-1-0369 awarded by the Army Research Office and Grant No. 1530603 awarded by the National Science Foundation. The U.S. government has certain rights in the invention.

TECHNICAL FIELD

The present invention relates to novel methods for producing highly porous ceramic and metal aerogel monolithic objects that are hard, sturdy, and resistant to high temperatures. These methods entail preparation of polymer-cross-linked xerogel powder compositions, compressing said polymer-crosslinked xerogel powder compositions into shaped compacts, and carbothermal conversion of the shaped xerogel compacts to the highly porous ceramic and metal aerogel monolithic objects. Said aerogel monolithic objects have utility in various applications such as, illustratively, in abrasives, in cutting tools, as catalyst support materials such as in reformers and converters, as filters such as for molten metals and hot gasses, in bio-medical tissue engineering such as bone replacement materials, in applications requiring strong lightweight materials such as in automotive and aircraft structural components, in ultra-high temperature ceramics, and the like.

BACKGROUND AND SUMMARY OF THE INVENTION

Aerogels are solid objects derived from wet-gels by converting their pore-filling solvent into a supercritical fluid that is vented off like a gas. In principle, that process preserves the volume of the original wet-gel into the final dry object; thereby aerogels are highly porous, low-density materials. Conversely, simple evaporation of the pore-filling solvent causes extensive shrinkage, resulting in materials that are referred to as xerogels, which consist of the same elementary building blocks as aerogels. However, due to shrinkage-induced compaction, xerogels have lower porosities and higher densities than aerogels (e.g., see: Brinker, C. J., et al., Sol-Gel Science. The Physics and Chemistry of Sol-gel Processing. Academic Press: New York, 1990).

Silica is the most common type of aerogels, but a wide array of other inorganic and polymeric aerogels is known, including organic/inorganic interpenetrating networks (e.g., see: Leventis, N., Interpenetrating Organic/Inorganic Networks of Resorcinol-Formaldehyde/Metal Oxide Aerogels in Aerogels Handbook—Advances in Sol-Gel Derived Materials and Technologies. Aegerter, M.; Leventis, N.; Koebel, M. Eds., Springer: New York, N.Y., 2011, Chapter 14, pp 287-313), and polymer-crosslinked oxide aerogel composites (e.g., see: Leventis, N., Acc. Chem. Res., 40:874-884 (2007); While, L. S., et al., Transl. Mater. Res., 3:015002 (2006); Maleki, H., et al., J. Phys. Chem. C, 119:7689-7703 (2015); Mohite, D. P., et al., Chem. Mater., 24:3434-3448 (2012)). In the latter variety, the skeletal inorganic-oxide framework is coated conformally with a nano-thin layer of polymer, and those materials have been investigated extensively for their mechanical strength. Eventually, the term "aerogel" has been broadened to include "secondary" materials best represented by carbon aerogels, which are obtained from pyrolysis of several sol-gel derived polymeric aerogels (e.g., see: Brinker, C. J., et al., Sol-Gel Science. The Physics and Chemistry of Sol-gel Processing. Academic Press: New York, 1990).

Many aerogels exhibit fragility and are produced by methods that require supercritical fluid (SCF) extraction steps. These shortcomings have hampered commercialization. In one embodiment, the invention disclosed herein overcomes these shortcomings; it describes secondary SiC and $Si_3N_4$ aerogels, and metal aerogels, derived from xerogels rather than aerogels, as discussed below.

Organic/inorganic interpenetrating networks include oxide aerogels (e.g., of Cr, Fe, Co, Ni, Cu, Ti, Hf, Sn, and the like) whose skeletal framework is intertwined with a second network of a carbonizable phenolic-resin aerogel (e.g., resorcinol-formaldehyde, polybenzoxazine, and the like). Mimicking the age-old smelting process (e.g., see Leventis, N., et al., J. Mater. Chem., 19:63-65 (2009)), those materials undergo carbothermal reduction, and have been a source for several metallic (e.g., Fe, Co, Ni, Cu) and ceramic (e.g., TiC, $Cr_3C_4$, HfC) aerogels (e.g., see Mahadik-Khanolkar, S., et al., Chem. Mater., 26:1318-1331 (2014); Leventis, N., et al., J. Mater. Chem., 20:7456-7471 (2010)). Importantly, it was reported that chemically identical interpenetrating xerogels underwent carbothermal reduction at temperatures that were up to 400° C. lower than those for the corresponding aerogels. Without being bound by theory, this may be taken to indicate that reactions, even amongst nanostructured reagents, may still benefit from a more intimate contact like the one that is found in a more compact structure, i.e., that of a xerogel versus that of an aerogel. Along these lines, it was contemplated herein that the ultimate proximity between an inorganic oxide framework and a carbonizable polymer may be found in nanostructured oxide networks coated conformally with a carbonizable polymer.

As part of an embodiment of the invention herein, a generalizable synthetic protocol that implements the foregoing line of reasoning is illustrated here by the carbothermal synthesis of SiC and $Si_3N_4$ aerogels as large shaped-objects using Equations (1) and (2) below, respectively (e.g., see: Saito, M., et al., J. Mater. Sci. Lett., 11:373-376 (1992); Klinger, N., et al., J. Am. Ceram. Soc., 9:369-375 (1966); Bandyopadhyay, S., et al., Ceram. Int., 17:171-179 (1991); Ličlco, T., et al., J. Eur. Ceram. Soc., 9:219-230 (1992); Chung, S. L., et al., J. Mater. Sci., 44:3784-3792 (2009)):

$$SiO_2 + 3C \rightarrow SiC + 2CO \qquad (1)$$

$$3SiO_2 + 2N_2 + 6C \rightarrow Si_3N_4 + 6CO \qquad (2)$$

The substrate converted to those two ceramics was sol-gel silica coated conformally and cross-linked covalently with carbonizable polyurea from reaction of: (a) innate —OH, and deliberately added —$NH_2$ groups on silica, and (b) adsorbed water, with triisocyanatophenylmethane (TIPM), an available-in-bulk triisocyanate. The process for cross-linking skeletal silica nanoparticles (native or —$NH_2$ modified) with the triisocyanate TIPM is shown in Scheme 1.

Scheme 1

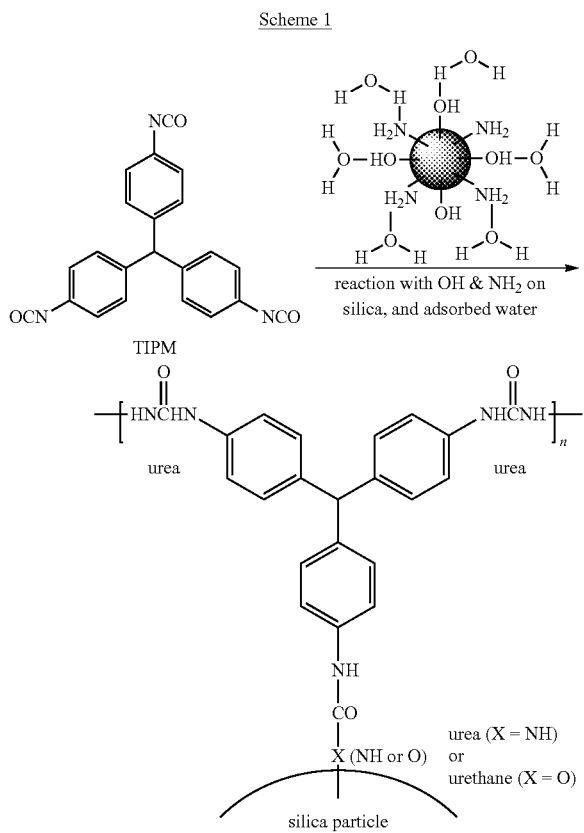

Monolithic SiC aerogels have been described before from silica aerogels crosslinked via free-radical surface-initiated polymerization (FR-SIP) of acrylonitrile (see: Leventis, N., et al., *Chem. Mater.*, 22:2790-2803 (2010)). Apart from the inherent synthetic complexity involved with FR-SIP, a main drawback of that approach was also that for porosity it relied on the innate, pre-pyrolysis porosity of the monolithic, crosslinked silica aerogel network. In addition, the topology of the reactants in that arrangement led to mechanically weak materials, and to low utilization of polyacrylonitrile-derived carbon.

In contrast, according to one embodiment of the invention disclosed herein, described below is a TIPM-based methodology that is fast, energy- and materials-efficient, and can be extended to the preparation of other large monolithic ceramic and/or metallic aerogels. In a key aspect, instead of using cross-linked monolithic silica aerogels as the ceramic precursors, the methodology described herein involves preparation and pyrolysis of dry compressed crosslinked silica xerogel powders. These xerogel powders, crosslinked with TIPM-derived polyurea and/or polyurethane coating, have the same nanoparticulate structure as typical monolithic aerogels, but, owing to the short diffusion path in the xerogel powder grains, they can be solvent-exchanged and processed from one step to the next within seconds rather than hours or days. In one aspect, the TIPM-derived polyurea and/or polyurethane coating acts as a binder for the underlying silica particles, so that the dry, crosslinked silica powders can be compressed into large, sturdy compacts with any desirable shape, which effectively removes the autoclave-size limitation from the accessible size of the resulting aerogel articles. And, as importantly, taking isomorphic carbothermal synthesis one step further (e.g., see: Ledoux, M. J., et al., *CATTECH*, 5:226-246 (2001); Moene, R., et al., *Appl. Catal., A*, 167:321-330 (1998); Greil, P., 1 *Eur. Ceram. Soc.*, 21:105-118 (2001); Qian, J.-M., et al., *J. Eur. Ceram. Soc.*, 24:3251-3259 (2004); Sonnenburg, K., et al., *Phys. Chem. Chem. Phys.*, 8:3561-3566 (2006)), it was realized that for porosity, polymer crosslinked xerogel powders would rely not on the porosity of the pre-carbothermal object, but rather on the fact that in the course of the carbothermal reduction the carbonizable polymer coating would react away (to the ceramic and CO) (see Equations 1 and 2) creating new porosity that did not exist before. This synthetic design has certain distinct advantages over all prior ceramic aerogel work: First, use of xerogel precursors bypasses supercritical drying, and thus improves energy efficiency. Second, a more subtle feature of working with compressed cross-linked xerogel powders, rather than aerogel monoliths, is that in principle none (or very little) of the reducing agent, CO, which is generated in situ during the course of the reaction, would be carried away; no matter which way from the $SiO_2$/C interface CO wants to move, the compactness of the assembly forces it always through silica, resulting in the most efficient utilization of the carbonizable polymer. Indeed, as disclosed herein, it was just sufficient to work with C: $SiO_2$ ratios near the stoichiometric level, while in the acrylonitrile-crosslinked silica aerogels methodology reported in the literature (see above) that ratio had to be at least 2.5 times higher than the stoichiometric. Eventually, as disclosed herein, pyrolysis of compressed shaped crosslinked xerogel compacts under Ar or $N_2$ yielded same-shape highly porous monolithic SiC or $Si_3N_4$, respectively, possessing porosities ≥85%. In contrast, oftentimes in this art porosities up to 30% are considered high. These highly porous ceramic objects of SiC and $Si_3N_4$ were mechanically robust, chemically inert at high temperatures, and good thermal insulators. In more general terms, these highly porous SiC and $Si_3N_4$ objects are hard ceramics that are useful as abrasives, in cutting tools, and in biomedicine (such as in bone replacement materials). Further, they have industrial usefulness as catalyst supports, or as filters for molten metals, and are prepared by annealing powders under compression. Apart from the immediate relevance of the two model materials disclosed herein to all those industrial applications, the generalizable methodology that is described herewith has brought other porous ceramic and metallic aerogels within its reach, as is disclosed in subsequent embodiments below.

3D Assemblies of polymer-coated silica nanoparticles have been investigated extensively in aerogel form as strong lightweight materials. According to another embodiment of the invention, provided herein is an alternative application for such 3D assemblies of nanoparticles, namely in a novel methodology for carbothermal preparation of sturdy, highly porous SiC and $Si_3N_4$ ceramics. This methodology takes into consideration the topology of the carbothermal reactions, and for porosity it relies on the void space created by carbon reacting away. That allows making aerogels from xerogels. Thus, using polymer-crosslinked xerogel powder compacts as the ceramic precursors, rather than monolithic polymer-crosslinked aerogels, processing moves fast, it is energy- and materials-efficient, and most importantly it is generalizable. In that regard, (a) gelation of any system that does so relatively slowly (minutes, hours, or longer) can be significantly expedited by diverting it to powders by vigorous agitation, which is an advantageous key feature of the invention herein; (b) the surface of any sol-gel derived skeletal oxide particle is rich with —OH groups, where isocyanate-derived polymers, like carbonizable TIPM-derived polyurethane and/or polyurea, can latch on covalently; and, (c) crosslinked powders can be compressed to shaped compacts of any size, thus liberating synthesis of ceramic aerogels from the size of the autoclave. In addition to other ceramic aerogels based on refractory materials (e.g., zirconium carbide, and the like; see below), the invention described herein includes Fe(0) metallic aerogels that may alleviate certain issues in thermite applications. Likewise, the invention described herein includes metallic aerogels of Co(0), Ni(0), Cu(0), Ru(0), Au(0), and the like, as described in subsequent embodiments below.

In another embodiment of the invention, disclosed herein are novel, sturdy, highly porous ceramic, metal carbide, metal boride, and metal aerogel monolithic compositions or objects. In a related embodiment, disclosed herein is a method for the synthesis of these sturdy, highly porous ceramic, metal carbide, metal boride, and metal aerogel monolithic compositions or objects from corresponding nanoparticulate polyurea- and/or polyurethane-crosslinked xerogel powder precursors. Said method entails a process that comprises the carbothermal (i.e., pyrolytic) reaction of compressed compacts of the nanoparticulate polyurea- and/or polyurethane-crosslinked xerogel powder precursors. One key aspect of the ceramic and metal aerogel monoliths obtained by this method is that they exhibit high porosity that is ≥35%, even ≥65%, even ≥80%, and even ≥85%. In another aspect, the high porosity in the obtained aerogel monoliths did not exist prior to pyrolysis, but was created via reaction of the core nanoparticles with their carbonized polymer coating toward the new ceramic or metallic framework and the CO that escaped. In another aspect, this method is applicable, and has been demonstrated herein, toward the synthesis of a multiplicity of highly porous ceramic, metal carbide, metal boride, and metal aerogel monoliths, illustratively including, but not limited to, silicon carbide (SiC), silicon nitride ($Si_3N_4$), zirconium carbide (ZrC), chromium carbide ($Cr_3C_2$), hafnium carbide (HfC), titanium carbide (TiC), zirconium boride ($ZrB_2$), hafnium boride ($HfB_2$), and metallic aerogels of iron (Fe), nickel (Ni), cobalt (Co), copper (Cu), ruthenium (Ru), gold (Au), and others.

Using the compressed compacts of the polymer-crosslinked xerogel powder precursors has several distinct advantages over working with porous monoliths (aerogels or xerogels). First, it accelerates processing, because powders can be washed and solvent-exchanged within seconds rather than hours, due to the short diffusion path. Second, as mentioned above, in compressed compacts, all carbothermal intermediates, especially CO, are forced to go through the reactants, minimizing losses and thus reducing the amount of carbon precursor needed for the conversion to the highly porous ceramic and metal aerogel monoliths, e.g., of silica to SiC or $Si_3N_4$. Third, since porosity is created by consuming the carbon precursor, the porous ceramic or metal aerogel is much sturdier than what is obtained if one starts with silica or metal aerogel in porous form.

Thus, in accordance with the above method, highly porous aerogels of SiC and $Si_3N_4$ were synthesized as follows. A sol-gel oxide powder (e.g., silica, or a silica precursor; see below) was obtained by disrupting gelation of a silica sol with vigorous agitation. Disrupting gelation via vigorous agitation, accompanied by addition of a solvent (e.g., hexane, and the like), is a key feature of the method herein, because it produces wet-gel powders very rapidly; subsequent processing of the powders (rather than processing monoliths obtained by other methods known in the art) accelerates the whole process tremendously, because the diffusion path in the tiny grains of powder is orders of magnitude smaller than the diffusion path in monoliths; powders can be solvent-exchanged and washed rapidly (e.g., in less than 5 minutes), and can be dried rapidly by simply pulling a vacuum on them. The grains of the obtained powder were about 50 μm in size, irregular in shape, and consisted of 3D assemblies of silica nanoparticles as in any typical silica gel. The individual elementary silica nanoparticles within the grains of the powder were coated conformally with a nano-thin layer of carbonizable polyurea and/or polyurethane derived from the reaction of a polyisocyanate such as an aromatic triisocyanate (e.g., triisocyanatophenylmethane (TIPM)) with the innate —OH groups, deliberately added —$NH_2$ groups, and adsorbed water on the surface of the silica nanoparticles, to yield cross-linked silica powder. The resulting wet-gel powder was solvent-exchanged with a suitable solvent, such as pentane, and the like, and dried at ambient temperature under vacuum. The resulting free-flowing polyurea- and/or polyurethane-coated silica xerogel powder was vibration-settled in suitable dies and was compressed to convenient shapes (e.g., discs, cylinders, donut-like objects, and the like), which in turn were converted to same-shape SiC or $Si_3N_4$ artifacts by pyrolysis, e.g., at 1500° C. under Ar or $N_2$, respectively. The overall synthesis was time-, energy-, and materials-efficient. (a) Solvent exchanges within the grains of powder took seconds rather than hours or longer in literature-reported methods; (b) drying did not require high-pressure vessels and supercritical fluids; and, (c) the utilization of the carbonizable polymer was at almost the stoichiometric ratio, due to the xerogel compactness. The final ceramic objects were chemically pure, sturdy, and chemically inert as expected. Pure iron and nickel aerogels (as well as a variety of other metal, metal carbide and metal boride aerogels; see below) were produced via a similar method from sol-gel-derived feria and nickel oxide powders.

The foregoing embodiments of the invention, and additional embodiments, are described in greater detail in the Detailed Description section and the Examples section below.

All publications cited throughout this application are incorporated herein by reference in their entirety. Indeed, throughout this description, including the foregoing description of related art and cited publications, as well as any and all publications cited in what follows below, it is to be understood that any and all publicly available documents described herein, including any and all cited U.S. patents, patent applications, and non-patent publications, are specifically incorporated by reference herein in their entirety. Nonetheless, the related art and publications described herein are not intended in any way as an admission that any of the documents described therein, including pending U.S. patent applications, are prior art to embodiments of the present disclosure. Moreover, the description herein of any disadvantages associated with the described products, methods, and/or apparatus, is not intended to limit the disclosed embodiments. Indeed, embodiments of the present disclosure may include certain features of the described products, methods, and/or apparatus without suffering from their described disadvantages.

Naturally, further objects of the invention are disclosed throughout other areas of the specification, drawings, and claims.

BRIEF DESCRIPTION OF THE DRAWINGS

FIG. 6 shows a tabulation of quantitative analysis data using solid-state $^{29}Si$ NMR under the conditions indicated in the legend of FIG. 4 of samples prepared by pyrolysis of X-APTES@TMOS compacts according to the conditions of FIG. 5.

DETAILED DESCRIPTION

Figure 1:
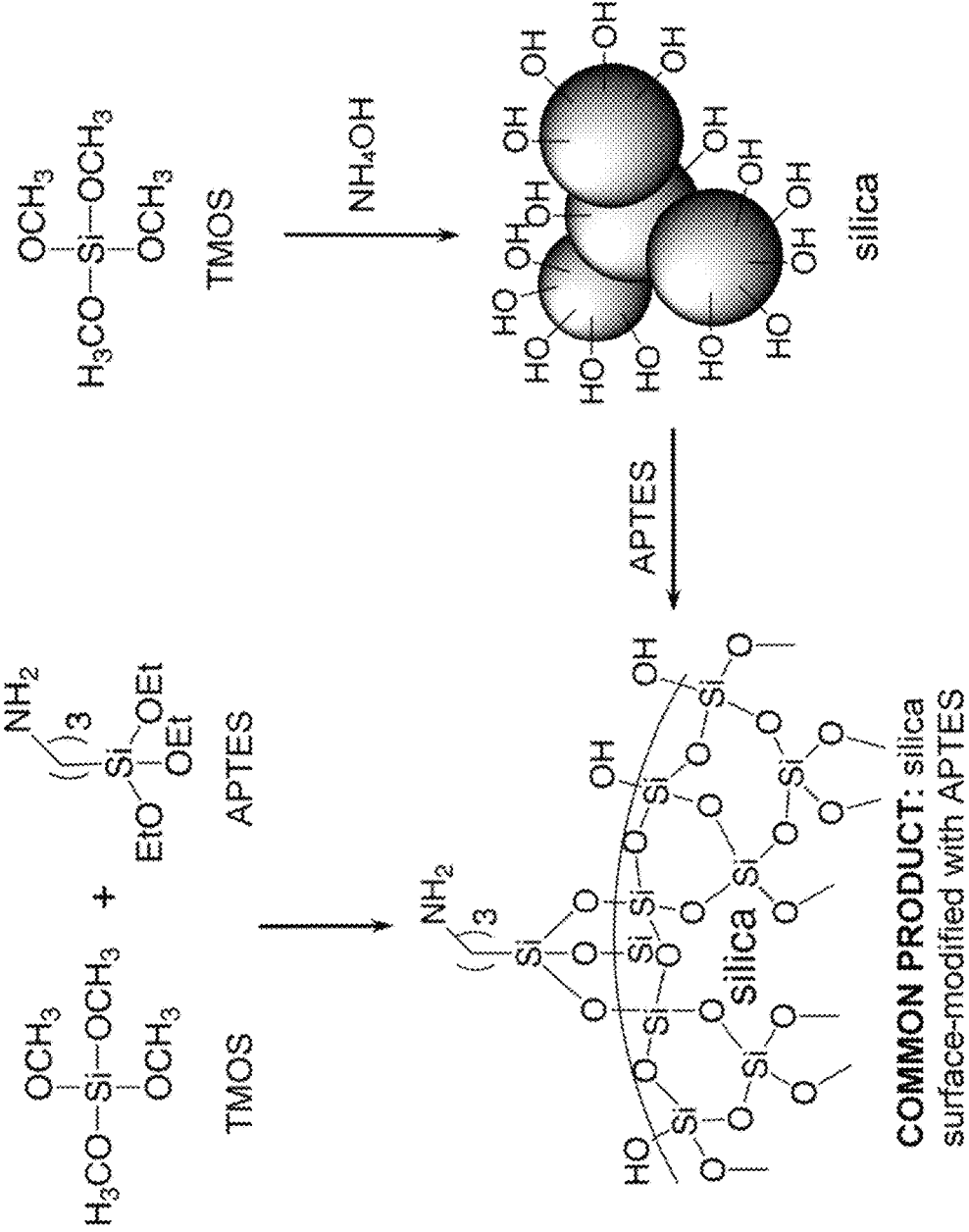
FIG. 1 shows two routes to a common product: Silica-gels surface-modified with APTES. Powders can be prepared only via Operational Control.

Before the present methods, implementations and systems are disclosed and described, it is to be understood that this invention is not limited to specific components, specific methods, specific implementation, or to particular compositions, and as such may, of course, vary. It is also to be understood that the terminology used herein is for the purpose of describing particular implementations only and is not intended to be limiting. Neither are mechanisms which have been provided to assist in understanding the disclosure meant to be limiting.

One embodiment of the invention provides a method for preparing porous ceramics and metals from chemically corresponding xerogel powder precursors. This method comprises the steps of: (a) reacting the xerogel powder precursors with one or more polyfunctional monomers to obtain polymer-modified xerogel powder precursors; (b) compressing said polymer-modified xerogel powder precursors under pressure to obtain polymer-modified xerogel compacts; and, (c) subjecting the polymer-modified xerogel compacts to pyrolysis to obtain the porous ceramics and metals; wherein the polymer is pyrolytically carbonizable. In one aspect, the obtained porous ceramics and metals are monoliths. In another aspect, the porous ceramic and metal monoliths are aerogels.

Another embodiment of the invention provides a method for preparing ceramic and metallic aerogels from chemically corresponding xerogel precursors. This method comprises the steps of: (a) reacting the xerogel precursors with one or more polyfunctional monomers to obtain polymer-modified xerogel precursors; (b) compressing said polymer-modified xerogel precursors under pressure to obtain polymer-modified xerogel compacts; and, (c) subjecting the polymer-modified xerogel compacts to pyrolysis to obtain said ceramic and metallic aerogels; wherein the polymer is pyrolytically carbonizable.

Another embodiment of the invention provides methods for preparing sturdy, shaped, highly porous ceramic, metal, metal carbide, or metal boride monolithic aerogel compositions or objects, illustratively including, but not limited to, sturdy, shaped, highly porous silicon carbide (SiC), silicon nitride ($Si_3N_4$), zirconium carbide (ZrC), chromium carbide ($Cr_3C_2$), hafnium carbide (HfC), titanium carbide (TiC), zirconium boride ($ZrB_2$), hafnium boride ($HfB_2$), and metallic aerogels of iron (Fe), nickel (Ni), cobalt (Co), copper (Cu), ruthenium (Ru), gold (Au), and the like. Details of these methods will become clear in the following.

Sturdy, Shaped, Highly Porous Silicon Carbide (SiC) and Silicon Nitride ($Si_3N_4$) Aerogel Monoliths:

In one embodiment, described herein is a method for the preparation of sturdy, shaped, highly porous monolithic ceramic SiC and $Si_3N_4$ aerogels, which follows the following steps:

(1) A first step of the method for preparation of said SiC and $Si_3N_4$ aerogels entails preparing a Solution A, which is a solution of a first compound selected from one of silica or a silicon oxide-precursor, such as a silica-precursor, in a suitable first solvent. Preferably the first compound is a silicon oxide-precursor; and it is understood that any one or more of various suitable silicon oxide-precursors known in the art may be selected. Herein, a preferred silicon oxide-precursor is a compound of the formula $Si(OR_a)_4$, wherein $R_a$ is a 1-4 carbon straight or branched alkyl group. A more preferred silicon oxide-precursor for the method herein is the compound in which $R_a$ is a methyl group, i.e., tetramethoxysilane, commonly known as TMOS. A suitable first solvent may be selected from an alcohol solvent, such as MeOH, EtOH, mixtures thereof, and the like; preferably the solvent is MeOH. The amount of alcohol solvent is between about 100 mL to about 250 mL per mol of the silicon oxide-precursor, preferably about 175 mL per mol of silicon oxide-precursor. Additionally, this first step entails preparing a Solution B, which is a solution that comprises a suitable hydrolysis catalyst in a suitable second solvent, wherein the suitable hydrolysis catalyst is a compound capable of converting said silicon oxide-precursor to the corresponding silicon oxide. Any suitable hydrolysis catalyst known in the art may be used. Herein, the preferred catalyst is $NH_4OH$, mixed in the second solvent, which is a mixture of an alcohol and water in a vol/vol ratio of about 3:1; the alcohol may be selected from MeOH, EtOH, mixtures thereof, and the like, preferably MeOH; the amount of alcohol in the second solvent is about the same amount of alcohol in the first solvent. The amount of $NH_4OH$ used is between about 1 mL per mol of silicon oxide-precursor to about 2 mL per mol of silicon oxide-precursor, preferably about 1.5 mL per mol of silicon oxide-precursor.

(2) A second step of the method for preparation of said SiC and $Si_3N_4$ aerogels entails mixing together at ambient temperature under vigorous stirring conditions Solution A and Solution B in the presence of a non-polar solvent such as hexane, pentane, and the like; preferably hexane. The volume of non-polar solvent used is between about twice to about four times the combined volume of Solution A and Solution B, preferably about three times the combined volume of Solution A and Solution B. In order to disrupt and deter gelation of the silica particles being formed, vigorous stirring is continued for a period of time preferably between about 10 minutes and about 30 minutes, and more preferably about 20 minutes. As previously stated, disrupting gelation via vigorous agitation is an advantageous key feature of the method herein, because it produces wet-gel powders very rapidly; subsequent processing of the powders (rather than processing monoliths obtained by other methods known in the art) accelerates the whole process tremendously. This step results in the formation of a suspension of silica particles; the suspension of silica particles is typically milky white.

(3) A third step of the method for preparation of said SiC and $Si_3N_4$ aerogels entails treatment of the suspension of silica particles obtained in the second step, under continued vigorous stirring, with an amination agent that introduces $NH_2$ groups to the silica particles. It is understood that several suitable amination agents are known in the art and may be used. Herein, a preferred amination agent is a compound of the formula $H_2N(CH_2)_mSi(OR_b)_3$, wherein $R_b$ is a 1-4 carbon alkyl group and m is an integer in the range 2-6. A more preferred amination agent for the method herein is the compound in which $R_b$ is an ethyl group and m=3, i.e., 3-aminopropyl triethoxysilane, commonly known as APTES. APTES is added to the vigorously stirred suspension of silica particles in such an amount so that the mol/mol ratio of APTES:TMOS is between about 0.1 and about 0.3, and preferably about 0.2. The resulting mixture is aged while vigorous stirring is continued for a period between about 18 hours and about 30 hours, preferably for about 24 hours. This step provides a suspension of aminated silica nanoparticles.

(4) A fourth step of the method for preparation of said SiC and $Si_3N_4$ aerogels entails separating the aminated silica nanoparticles, such as by using a centrifuge, followed by successive washings with suitable solvents, such as, illustratively, with EtOAc, EtOAc saturated with $H_2O$, and acetone. It is understood that, as contemplated herein, several variations to these successive washings may be implemented by those skilled in the art, leading to similar outcomes. At this point, the separated aminated silica nanoparticles may be used directly in the next step, for example as obtained in the centrifuge tubes, or may alternatively be washed further, illustratively, with pentane, hexane, and the like, then dried under vacuum to obtain the aminated silica nanoparticles as a dry powder.

(5) A fifth step of the method for preparation of said SiC and $Si_3N_4$ aerogels entails coating conformally the surface of the aminated silica nanoparticles obtained in the fourth step with a nano-thin layer of a carbonizable polymer. This is accomplished by reacting the innate OH groups, the deliberately added $NH_2$ groups, and adsorbed water on the aminated silica nanoparticles with one or more suitable monomeric crosslinking agent at a suitable temperature and for a suitable length of time, to obtain a polymer-coated silica powder. The suitable temperature and length of time are dependent on the type and nature of the crosslinking agent used (see below). Various suitable crosslinking agents known to those skilled in the art may be used for this method. Herein, a preferred crosslinking agent is any one or more of a polyisocyanate crosslinking agent. This one or more polyisocyanate crosslinking agent is a compound of the general formula (I):

$$G_1\text{-}(NCO)_q \qquad (I)$$

wherein $G_1$ is a moiety selected from $C_1$-$C_{10}$ straight chain alkyl or branched alkyl or cycloalkyl, alkylaryl, aryl, heteroalkyl, heterocyclylalkyl, or heteroaryl, each of which is optionally substituted; and, q is an integer in the range 2-6. Illustratively, the one or more polyisocyanate crosslinking agent may be selected from one or more of the following representative compounds:

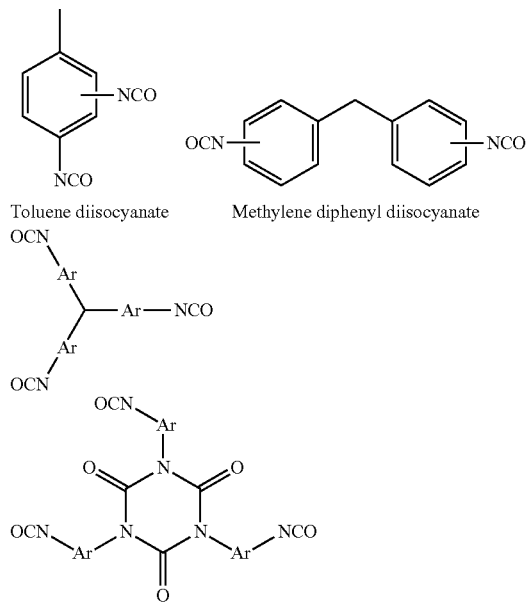

Toluene diisocyanate     Methylene diphenyl diisocyanate

It is understood that one of ordinary skill in the chemical arts could readily make or conceive of a nigh-infinite number of modifications to the foregoing illustrative chemical formulae of the polyisocyanate crosslinking agents that would come within the spirit of the invention, and that it would be impractical to attempt to list herein all such variations of contemplated chemical formulae. Especially preferred herein are one or more polyisocyanate crosslinking agents represented by compounds of the general formula (II):

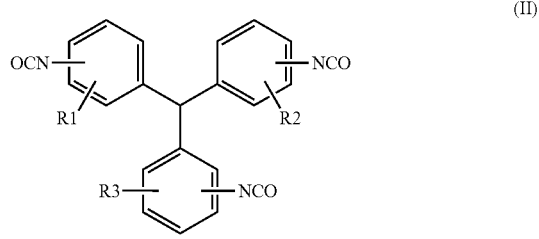

wherein the isocyanate groups of compound (II) are independently attached to their respective aryl rings at the 2, 3, or 4-positions of the aryl rings; and, wherein R1, R2, and R3 are independently one or more substituents selected from H, alkyl, cycloalkyl, alkoxy, alkylthio, aryl, aryloxy, arylthio, each of which is optionally substituted, and halogen, nitro, or cyano. A most preferred polyisocyanate crosslinking agent herein is the compound (II) in which R1=R2=R3=H, and wherein the isocyanate groups are attached to their respective aryl rings on the 4-position, namely, 4,4',4"-triisocyanatophenylmethane, commonly known as TIPM. TIPM will be used illustratively in the following, but it is understood that other polyisocyanate crosslinking agents may be used as well. Conveniently, TIPM is available commercially as a 27% w/w solution in dry EtOAc, known under the trade name Desmodur® RE. Thus, the aminated silica nanoparticles obtained in the fourth step above, e.g., those separated in the centrifuge tubes, are treated with Desmodur® RE, the tubes are sealed, and the mixtures are heated at a suitable temperature for a suitable period of time, with periodic swirling. The volume of Desmodur® RE used may vary from between about four times to about eight times the approximate volume of the aminated silica nanoparticles; preferably, the volume of Desmodur® RE used is about six times the approximate volume of the aminated silica nanoparticles. Alternatively, a suitable amount of TIPM is used such that the mol/mol ratio of TIPM:$SiO_2$ is in the range between about 0.05 and about 2.5, but preferably in the range between about 0.1 and about 2.1. The suitable temperature for the reaction may vary from between about 55° C. to about 75° C.; a preferred temperature is about 65° C. The suitable period of time for the reaction may vary between about 2 days to about 4 days; a preferred period of time is about 3 days. At the conclusion of the reaction, the mixture is allowed to cool to ambient temperature, then is washed successively multiple times with suitable solvents, such as, illustratively, acetone and pentane, and the like. It is understood that, as contemplated herein, several variations to these successive washings may be implemented by those skilled in the art, leading to similar outcomes. At this point, the TIPM-derived, polymer-coated silica nanoparticles are dried under vacuum to obtain a dry polymer-coated silica xerogel powder. It is understood that, being TIPM-derived, the polymeric coating includes polyurethanes and/or polyureas, which arise from reaction of the isocyanate functional groups of TIPM with the innate OH groups and adsorbed water, and with the deliberately added $NH_2$ groups, respectively.

(6) A sixth step of the method for preparation of said SiC and $Si_3N_4$ aerogels entails preparing compressed, shaped compacts, i.e., compressed objects, of the polyurethane-and/or polyurea-coated silica xerogel powders obtained in the fifth step above. This is accomplished by placing said polyurethane- and/or polyurea-coated silica xerogel powders in one or more of various dies of choice, using any suitable technique known in the art, such as pouring the powder into the die in small portions, along with tapping as needed. Naturally, the shapes and sizes of the dies are limited only by availability, except that the materials from which the dies are made must be able to withstand the high temperatures used in the subsequent pyrolysis step described below. Herein, dies made of aluminum are used; but dies made from other suitable materials may be used as well. The powders in the dies are compressed under high pressure. It is understood that one may use any of a variety of suitable compressing devices and methods known in the art. Herein, a hydraulic press is used. The high pressure employed may be, illustratively, between about 10,000 psi and about 20,000 psi; preferably, the pressure is about 15,000 psi. Thus, this step provides compressed, shaped compacts or objects of the polyurethane- and/or polyurea-coated silica xerogel powders in dies.

(7) A seventh step of the method for preparation of said SiC and $Si_3N_4$ aerogels entails pyrolytic conversion of the compressed, shaped compacts of polyurethane- and/or polyurea-coated silica xerogel powders obtained in the sixth step above to sturdy, shaped, highly porous monolithic SiC and $Si_3N_4$ aerogel objects. This is accomplished by heating the dies/compressed contents in a suitable heating device, illustratively a furnace, or any other suitable heating device known in the art, at a suitable temperature and for a suitable period of time, under an atmosphere of either flowing Ar gas (to obtain SiC) or flowing $N_2$ gas (to obtain $Si_3N_4$). Preferably the suitable temperature is a temperature between about 1000° C. and about 2000° C.; more preferably the suitable temperature is between about 1300° C. and about 1700° C.; most preferably the temperature is about 1500° C. Preferably the temperature is raised slowly from ambient to the target temperature at a set rate under flowing Ar gas or flowing $N_2$ gas, then maintained at the target temperature for the duration of the pyrolysis, and finally is allowed to decrease slowly at a set rate, which may be the same as or different than the temperature raising rate, until reaching ambient temperature again. An illustrative rate for both the temperature raising and cooling phases is between about 1° C. min' and about 4° C. min', a preferred rate is about 2.5° C. The suitable period of time for pyrolysis at the target temperature is between about 24 hours and about 48 hours; preferably the period of time is about 36 hours. A suitable flowrate of the Ar or $N_2$ gas is between about 100 mL $min^{-1}$ and about 400 mL $min^{-1}$, preferably about 325 mL In the case of SiC, residual carbon in the crude SiC aerogels that are obtained is removed by a second pyrolysis carried out in air at a temperature between about 700° C. and about 900° C., preferably about 800° C., for a period between about 18 hours and about 30 hours, preferably about 24 hours. In the case of $Si_3N_4$, residual carbon in the crude $Si_3N_4$ aerogels that are obtained is removed by a second pyrolysis carried out in air at a temperature between about 500° C. and about 700° C., preferably about 600° C., for a period between about 18 hours and about 30 hours, preferably about 24 hours. Thus, this step provides the desired sturdy, shaped, highly porous monolithic SiC aerogel objects (when Ar gas is used) and $Si_3N_4$ aerogel objects (when $N_2$ gas is used), in which porosities equal to or exceeding 85% are observed.

Another embodiment of the invention provides novel compositions comprising polyurethane- and/or polyurea-coated nanoparticulate silica xerogel powders. These compositions are obtained by the reaction of the innate OH groups, the deliberately added $NH_2$ groups, and adsorbed water on the surface of the nanoparticulate xerogel powder obtained as described in the fourth step of the method above with one or more polyisocyanate crosslinking agent, in accordance with the procedure described in the fifth step of the method above.

Another embodiment of the invention provides novel compositions consisting of sturdy, shaped, highly porous monolithic SiC and $Si_3N_4$ aerogel objects. These objects are prepared from the compressed, shaped compacts of polyurethane- and/or polyurea-coated silica xerogel powders obtained as described in the fifth and sixth steps of the method above, by following the pyrolysis procedure described in the seventh step of the method above. These sturdy, shaped, highly porous monolithic SiC and $Si_3N_4$ aerogel objects have porosities that are equal to or exceed 85%. These aerogel objects, obtained by the novel method disclosed herein using xerogel powders, possess properties that are superior to the properties of highly porous SiC foams reported in the literature (see Examples section below).

Sturdy, Shaped, Highly Porous Metal Carbide and Metal Boride Aerogel Monoliths:

An embodiment of the invention herein provides a method (closely related to the foregoing method for making SiC and $Si_3N_4$ aerogel monoliths) for preparing sturdy, shaped, highly porous metal carbide and metal boride monolithic aerogel compositions or objects, illustratively including, but not limited to, sturdy, shaped, highly porous zirconium carbide (ZrC), chromium carbide ($Cr_3C_2$), hafnium carbide (HfC), titanium carbide (TiC), zirconium boride ($ZrB_2$), hafnium boride ($HfB_2$), and the like. This method starts with preparing a Solution C, which is a solution of a first compound selected from one of a metal oxide or a metal oxide precursor in a suitable solvent S1. Preferably the first compound is a metal oxide precursor, such as metal oxide precursors of Zr, Cr, Hf, and Ti. It is understood that any one or more of various suitable metal oxide precursors known in the art may be selected and used. Herein, preferred metal oxide precursors include metal chloride salts, anhydrous metal chloride salts, and the like, designated herein by the general formula $MCl_x$. The suitable solvent Si may be selected from an alcohol solvent, e.g., MeOH, EtOH, and the like, and mixtures thereof; herein solvent S1 is preferably EtOH. Thus, Solution C is prepared, which includes the anhydrous metal chloride salt $MCl_x$ dissolved in an amount of EtOH preferably ranging between about 2000 mL and about 4000 mL per mol of $MCl_x$, more preferably about 3000 mL per mol of $MCl_x$.

In the case of preparing metal carbide aerogel monoliths, Solution C obtained above is then treated with vigorous stirring with an amount of $H_2O$ such that the mol/mol ratio of $H_2O:MCl_x$ is in the range between about 5 to about 7, more preferably about 6. This provides a Solution D. The vigorously stirred Solution D is then treated sequentially with an amount of a non-polar solvent, followed by an amount of a suitable proton-scavenging agent. Illustratively, the non-polar solvent may be selected from an alkane solvent, e.g., hexane, pentane, and the like, and mixtures thereof; herein the non-polar solvent is preferably hexane, which is used hereafter for illustration. The amount of hexane used is preferably in the range between about 2000 mL to about 4000 mL per mol of $MCl_x$, more preferably about 3000 mL per mol of $MCl_x$. The proton-scavenging agent is needed to remove $H^+$ from the acidic metal hydrate that arises upon reaction of $MCl_x$ with the added $H_2O$. It is known in the art that if the $H^+$ is not removed, gelation will result. A variety of suitable proton-scavenging agents are known in the art, which may be used. Herein, a preferred type of agent may be selected from the epoxide family of proton-scavenging agents, such as epichlorohydrin, commonly referred to as ECH, which is used hereafter for illustration. The amount of ECH used is preferably such that the mol/mol ratio of $ECH:MCl_x$ is in the range between about 7 to about 12, more preferably about 9.5. After sequential treatment of the Solution D with hexane and ECH, vigorous stirring is continued at ambient temperature for a suitable period of time ranging between about 12 hours and about 36 hours, preferably between about 18 hours and about 30 hours, and more preferably about 24 hours. As previously stated in the foregoing, vigorous stirring is a key feature of the methods herein, as it disrupts gelation into monoliths. Obtained at the conclusion of this step is a metal-oxide suspension.

In the case of preparing metal boride aerogel monoliths, Solution C obtained above is treated with vigorous stirring with an amount of a boron alkoxide followed by an amount of $H_2O$. Preferred boron alkoxides include compounds such as triethyl borate, and the like; triethyl borate is used hereafter for illustration. The amount of triethyl borate used is preferably such that the mol/mol ratio of triethyl borate: $MCl$ is in the range between about 5 to about 7, more preferably about 6. The amount of $H_2O$ used is such that the mol/mol ratio of $H_2O:MCl_x$ is in the range between about 18 to about 24, more preferably about 21. This provides a Solution E. The vigorously stirred Solution E is then treated sequentially with an amount of a non-polar solvent followed by an amount of a suitable proton-scavenging agent, illustratively, hexane and ECH, respectively, and the like; hexane and ECH are used hereafter for illustration. The amounts of hexane and ECH, and the vigorous stirring period of time, are exactly as described above in the immediately preceding paragraph. Obtained at the conclusion of this step is a metal-oxide/boron-oxide suspension.

The metal-oxide suspension or the metal-oxide/boron-oxide suspension obtained in the immediately preceding two paragraphs are subjected to successive washings with one or more suitable solvents. These successive washings may be carried out in a variety of ways known to those skilled in the art. Herein, the successive washings are successfully carried out by using a centrifuge. Thus, each suspension is transferred to centrifuge tubes and the suspension solvent is exchanged multiple times, illustratively, three times, with the one or more suitable solvents. A variety of suitable solvents may be used, such as, illustratively, ester solvent, e.g., EtOAc, PrOAc, and the like; preferably EtOAc; EtOAc will be used hereafter for illustration. It is understood that, as contemplated herein, several variations to these successive washings may be implemented by those skilled in the art, leading to similar outcomes. All washes and solvent exchanges are carried out with centrifugation for between about 15 minutes and about 20 minutes. Each time the supernatant solvent is removed an amount of fresh solvent about twice the approximate volume of the compacted slurry/paste in the centrifuge tubes is added, and the slurry is resuspended with vigorous agitation before further centrifugation. Obtained at the conclusion of this step of successive washings is a metal-oxide slurry or a metal-oxide/boron-oxide slurry.

The metal-oxide slurry or the metal-oxide/boron-oxide slurry obtained as described in the immediately preceding paragraph are then converted to a polymer-modified metal-oxide composite xerogel powder or to a polymer-modified metal-oxide/boron-oxide composite xerogel powder, respectively, by reaction with one or more suitable polyfunctional monomers. In one key aspect, the polymer is a carbonizable polymer. Various suitable polyfunctional monomers known in the art may be used. A preferred polyfunctional monomer herein is the polyisocyanate compound of the general formula (I):

$$G_1\text{-}(NCO)_q \qquad (I)$$

wherein $G_1$ and q are exactly as defined in the foregoing fifth step of the method for preparation of SiC and $Si_3N_4$ aerogels. Indeed, all the illustrative examples of polyisocyanate compounds listed in the foregoing fifth step of the method for preparation of SiC and $Si_3N_4$ aerogels are useful herein as well in this method for preparation of metal carbide and metal boride aerogel monoliths. Likewise, especially preferred herein are one or more polyisocyanate compounds represented by compounds of the general formula (II):

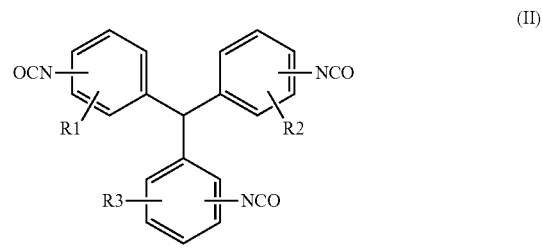

wherein the positions of the isocyanate groups on their respective aryl rings and the definitions of R1, R2, and R3 are exactly as stated in the foregoing fifth step of the method for preparation of SiC and $Si_3N_4$ aerogels. As in the foregoing, a most preferred polyisocyanate compound herein is TIPM, which will be used illustratively in the following; but it is understood that other alternative polyisocyanate compounds may be used as well. Reaction of TIPM (or alternative polyisocyanate compounds) with the metal-oxide slurry or the metal-oxide/boron-oxide slurry takes advantage of the fact that these slurries include residual coordination water that remains on the surface of the oxide network, such that the isocyanate groups react with the residual water to produce polyurea, in accordance with the following Equations (3) and (4):

$$R\text{---}NCO + H_2O \rightarrow R\text{---}NH_2 + CO_2 \qquad (3)$$

$$R\text{---}NH_2 + R\text{---}NCO \rightarrow \text{Polyurea} \qquad (4)$$

Thus, the metal-oxide slurry or the metal-oxide/boron-oxide slurry in the centrifuge tubes is treated with Desmodur® RE, the tubes are sealed, and the mixtures are heated at a suitable temperature for a suitable period of time, with periodic swirling, illustratively, every 10-12 minutes. The volume of Desmodur® RE used may vary from between about the same volume to about eight times the approximate volume of the slurry; preferably, the volume of Desmodur® RE used is about six times the approximate volume of the slurry. Alternatively, a suitable amount of TIPM is used such that the mol/mol ratio of TIPM:metal-oxide is in the range between about 0.1 and about 1, and preferably between about 0.2 and about 0.8. The suitable temperature for the reaction may vary from between about 55° C. to about 75° C.; a preferred temperature is about 65° C. The suitable period of time for the reaction may vary from about 2 days to about 4 days; a preferred period of time is about 3 days, with swirling every about 10-12 hours to redistribute the settled powder and increase the diffusion rate. At the conclusion of the reaction, the mixture is allowed to cool to ambient temperature, then is washed successively multiple times with suitable solvents, such as, illustratively, EtOAc, and the like. It is understood that, as contemplated herein, several variations to these successive washings may be implemented by those skilled in the art, leading to similar outcomes. After the last wash, the slurry is dried under vacuum at a temperature ranging between about 50° C. and about 80° C., or higher if needed, preferably about 80° C., to obtain the dry polyurea-modified metal-oxide composite xerogel powder or the dry polyurea-modified metal-oxide/boron-oxide composite xerogel powder.

The dry polyurea-modified metal-oxide composite xerogel powder or the dry polyurea-modified metal-oxide/boron-oxide composite xerogel powder obtained as described in the immediately preceding paragraph are transferred into dies and compressed into shaped objects, following exactly the same procedural variations and conditions described in the foregoing sixth step of the method for preparation of SiC and $Si_3N_4$ aerogels, to obtain polyurea-modified metal-oxide composite monolithic compacts or polyurea-modified metal-oxide/boron-oxide composite monolithic compacts, respectively.

The polyurea-modified metal-oxide composite monolithic compacts or polyurea-modified metal-oxide/boron-oxide composite monolithic compacts obtained as described in the immediately preceding paragraph are then subjected to pyrolysis following exactly the same procedural variations and conditions described in the foregoing seventh step of the method for preparation of SiC and $Si_3N_4$ aerogels, except that only Ar gas is used. Obtained at the conclusion of pyrolysis are the desired sturdy, shaped, highly porous zirconium carbide (ZrC), chromium carbide ($Cr_3C_2$), hafnium carbide (HfC), and titanium carbide (TiC) aerogel objects, or the desired sturdy, shaped, highly porous zirconium boride ($ZrB_2$), and hafnium boride ($HfB_2$) aerogel objects, in which porosities equal to or exceeding 85% are observed.

Another embodiment of the invention provides novel compositions comprising polyurea-modified metal-oxide composite xerogel powders or novel compositions comprising polyurea-modified metal-oxide/boron-oxide composite xerogel powders, wherein the metal is selected from Zr, Hf, Ti, and Cr. These compositions are obtained by the reaction of a polyisocyanate compound with a metal-oxide slurry or a metal-oxide/boron-oxide slurry, respectively, in accordance with the foregoing method for preparation of sturdy, shaped, highly porous metal carbide and metal boride aerogel monoliths. In a preferred embodiment, the polyurea in said polyurea-modified metal-oxide composite xerogel powders is a TIPM-derived polyurea.

Another embodiment of the invention provides novel compositions consisting of sturdy, shaped, highly porous zirconium carbide (ZrC), chromium carbide ($Cr_3C_2$), hafnium carbide (HfC), and titanium carbide (TiC) aerogel objects, or sturdy, shaped, highly porous zirconium boride ($ZrB_2$), and hafnium boride ($HfB_2$) aerogel objects, having porosities that are equal to or exceed 85%. These compositions are obtained in accordance with the foregoing method for preparation of sturdy, shaped, highly porous metal carbide and metal boride aerogel monoliths. In contrast, it is believed that ZrC, $Cr_3C_2$, HfC, TiC, $ZrB_2$, and $HfB_2$ aerogel objects with porosity ≥65% have never been described previously anywhere in the literature. Indeed, it is believed that none of these carbides or borides with porosity ≥30% have been reported. Additionally, it is believed that none of these highly porous carbides and borides have ever been obtained via sol-gel-derived precursors, particularly via xerogel precursors.

Sturdy, Shaped, Highly Porous Metal Aerogel Monoliths:

Another embodiment of the invention herein provides a method (closely related to the foregoing method for making SiC and $Si_3N_4$ aerogel monoliths, and the foregoing method for making metal carbide and metal boride aerogel monoliths) for preparing sturdy, shaped, highly porous metal monolithic aerogel compositions or objects, illustratively including, but not limited to, sturdy, shaped, highly porous iron (Fe), nickel (Ni), cobalt (Co), copper (Cu), ruthenium (Ru), gold (Au), and the like. This method starts with preparing a Solution F, which is a solution of a first compound selected from one of a metal oxide or a metal oxide precursor in a suitable solvent S2. Preferably the first compound is a metal oxide precursor, such as metal oxide precursors of Fe, Ni, Co, Cu, Ru, and Au. It is understood that any one or more of various suitable metal oxide precursors known in the art may be selected and used. Herein, preferred metal oxide precursors include hydrates of metal chloride salts (e.g., hexahydrate salts), anhydrous metal chloride salts, and the like, designated herein by the general formula $MCl_x$. The suitable solvent S2 may be selected from an alcohol solvent, e.g., MeOH, EtOH, and the like, and mixtures thereof; herein solvent S2 is preferably EtOH. Thus, Solution F is prepared, which includes the metal chloride salt $MCl_x$ or the hydrate of the metal chloride salt $MCl_x$ dissolved in an amount of EtOH preferably ranging from about 1000 mL to about 2000 mL per mol of $MCl_x$, more preferably about 1500 mL per mol of $MCl_x$. In the case of using anhydrous metal chloride salts, solution F is then treated with vigorous stirring with an amount of $H_2O$ such that the mol/mol ratio of $H_2O:MCl_x$ is in the range between about 5 to about 7, more preferably about 6. In the case of using hydrates of metal chloride salts (e.g., hexahydrate salts), there is usually no need to add additional amounts of $H_2O$, because the water of hydration is sufficient to produce enough polymer. This provides a Solution G. The vigorously stirred Solution G is then treated with an amount of a suitable proton-scavenging agent, followed immediately with mixing with an amount of a non-polar solvent, all under vigorous stirring. The suitable proton-scavenging agent and the non-polar solvent are exactly as described in the foregoing method for making metal carbide and metal boride aerogel monoliths. For illustration hereafter, ECH is used as the proton-scavenging agent and hexane is used as the non-polar solvent. The amount of ECH used is preferably such that the mol/mol ratio of $ECH:MCl_x$ is in the range between about 7 to about 12, more preferably about 9.5. The amount of hexane used is preferably in the range between about 1000 mL to about 2000 mL per mol of $MCl_x$, more preferably about 1500 mL per mol of $MCl_x$. Vigorous stirring is continued at ambient temperature for between about 25 minutes and about 45 minutes, preferably for about 35 minutes, during which the mixture develops fine particles and turns into a thick suspension. Subsequently, a second addition of a non-polar solvent, preferably hexane, is made. The amount of hexane used in this second addition ranges between about 500 mL to about 1000 mL per mol of $MCl_x$, more preferably about 750 mL per mol of $MCl_x$. The mixture is stirred vigorously for a suitable period of time ranging between about 12 hours and about 36 hours, preferably between about 18 hours and about 30 hours, and more preferably about 24 hours. As previously stated in the foregoing, vigorous stirring is a key feature of the methods herein, as it disrupts gelation into monoliths. Obtained at the conclusion of this step is a metal-oxide suspension.

The metal-oxide suspension obtained as described in the immediately preceding paragraph is subjected to successive washings with one or more suitable solvents. These successive washings may be carried out in a variety of ways known to those skilled in the art. Herein, the successive washings are successfully carried out by using a centrifuge. Thus, the metal-oxide suspension is transferred to centrifuge tubes and the suspension solvent is exchanged multiple times, illustratively, three times, with the one or more suitable solvents. A variety of suitable solvents may be used, such as, illustratively, ester solvent, e.g., EtOAc, PrOAc, and the like; preferably EtOAc; EtOAc will be used hereafter for illustration. It is understood that, as contemplated herein, several variations to these successive washings may be implemented by those skilled in the art, leading to similar outcomes. All washes and solvent exchanges are carried out with centrifugation for between about 15 minutes and about 20 minutes. Each time the supernatant solvent is removed an amount of fresh solvent about twice the approximate volume of the compacted slurry/paste in the centrifuge tubes is added, and the slurry is resuspended with vigorous agitation before further centrifugation. Obtained at the conclusion of this step of successive washings is a metal-oxide slurry.

The metal-oxide slurry obtained as described in the immediately preceding paragraph is then converted to a polymer-modified metal-oxide composite xerogel powder by reaction with one or more suitable polyfunctional monomers. In one key aspect, the polymer is a carbonizable polymer. Various suitable polyfunctional monomers known in the art may be used. A preferred polyfunctional monomer employed herein is the polyisocyanate compound of the general formula (I):

wherein $G_1$ and q are exactly as defined in the foregoing fifth step of the method for preparation of SiC and $Si_3N_4$ aerogels. Indeed, all the illustrative examples of polyisocyanate compounds listed in the foregoing fifth step of the method for preparation of SiC and $Si_3N_4$ aerogels are useful herein as well in this method for preparation of metal aerogel monoliths. Likewise, especially preferred herein are one or more polyisocyanate compounds represented by compounds of the general formula (II):

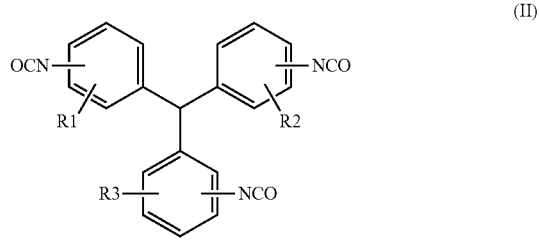

wherein the positions of the isocyanate groups on their respective aryl rings and the definitions of R1, R2, and R3 are exactly as stated in the foregoing fifth step of the method for preparation of SiC and $Si_3N_4$ aerogels. As in the foregoing, a most preferred polyisocyanate compound herein is TIPM, which will be used illustratively in the following; but it is understood that other alternative polyisocyanate compounds may be used as well. Thus, the metal-oxide slurry in the centrifuge tubes is treated with Desmodur® RE, the tubes are sealed, and the mixtures are heated at a suitable temperature for a suitable period of time. The volume of Desmodur® RE used may vary from between about half to about two times the approximate volume of the slurry; preferably, the volume of Desmodur® RE used is about equal to the approximate volume of the slurry. Alternatively, a suitable amount of TIPM is used such that the mol/mol ratio of TIPM:metal-oxide is in the range between about 0.04 and about 0.2, and preferably between about 0.06 and about 0.17. The suitable temperature for the reaction may vary from between about 55° C. to about 75° C.; a preferred temperature is about 65° C. The suitable period of time for the reaction may vary from about 2 days to about 4 days; a preferred period of time is about 3 days, with swirling every about 10-12 hours to redistribute the settled powder and increase the diffusion rate. At the conclusion of the reaction, the mixture is allowed to cool to ambient temperature, then is washed successively multiple times with suitable solvents, such as, illustratively, EtOAc, and the like. It is understood that, as contemplated herein, several variations to these successive washings may be implemented by those skilled in the art, leading to similar outcomes. After the last wash, the slurry is dried under vacuum at a temperature ranging between about 50° C. and about 80° C., or higher if needed, preferably about 80° C., to obtain the dry polyurea-modified metal-oxide composite xerogel powder. This dry polyurea-modified metal-oxide composite xerogel powder is transferred into dies and compressed into shaped objects, following exactly the same procedural variations and conditions described in the foregoing sixth step of the method for preparation of SiC and $Si_3N_4$ aerogels, to obtain polyurea-modified metal-oxide composite monolithic compacts. These compacts are then subjected to carbothermal reduction by pyrolysis following procedural variations similar to those described in the foregoing seventh step of the method for preparation of SiC and $Si_3N_4$ aerogels, except as follows: (a) only Ar gas is used; (b) pyrolysis is carried out at between about 700° C. and about 900° C., preferably at about 800° C.; (c) pyrolysis is carried out for a period of between about 3 hours and about 7 hours, preferably about 5 hours. Obtained after this pyrolysis step are mostly metallic objects that include residual carbon impurities. These impure metallic objects are purified via a second pyrolysis in the presence of water-saturated $H_2$ at a temperature of between about 700° C. and about 900° C., preferably at about 800° C., for a period of between about 30 hours and about 42 hours, preferably about 36 hours. The gas flow rate during both pyrolysis steps is about 325 mL min'. Obtained at the conclusion of the second pyrolysis are the desired pure, sturdy, shaped, highly porous Fe, Ni, Co, Cu, Ru, or Au monolithic aerogel objects, in which porosities equal to or exceeding 85% are observed. In contrast, while porous Fe, Co and Cu with porosities ≥35% had been previously reported, made by pyrolysis of aerogels consisting of interpenetrating oxide-polymer networks, not from crosslinked xerogel powders, and the porous Co and Cu had been obtained as chunks, not as monoliths, the advantageous method described herein resolves previous issues effortlessly and cost-efficiently.

Another embodiment of the invention provides novel compositions comprising polyurea-modified metal-oxide composite xerogel powders, wherein the metal is selected from Fe, Ni, Co, Cu, Ru, and Au. These compositions are obtained by the reaction of a polyisocyanate compound with the appropriate metal-oxide slurry in accordance with the foregoing method for preparation of sturdy, shaped, highly porous metal aerogel monoliths. In one preferred embodiment, the polyurea in said polyurea-modified metal-oxide composite xerogel powders is a TIPM-derived polyurea.

Another embodiment of the invention provides novel sturdy, shaped, highly porous pure metal aerogel objects, having porosities that are equal to or exceed 85%. Each of said pure metal aerogel objects consists of one pure metal selected from Fe, Ni, Co, Cu, Ru, and Au. These compositions are obtained in accordance with the foregoing method for preparation of sturdy, shaped, highly porous metal aerogel monoliths.

While the novel technology herein has been illustrated and described in detail in the foregoing description, and in the following examples and the figures herein, the same is to be considered as illustrative and not restrictive in character. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

EXAMPLES

The following examples further illustrate specific embodiments of the invention. However, the following examples should not be interpreted in any way to limit the invention.

Example 1

Fabrication of shaped SiC and $Si_3N_4$ porous objects. In order to facilitate latching of polyurea onto the surface of silica, the long-standing strategy has been to provide silica with amines (e.g., see: Katti, A., et al., *Chem. Mater.*, 18:285-296 (2006); Meador, M. A. B., et al., *Chem. Mater.*, 19:2247-2260 (2007)). Based on the reported higher reactivity of (a) tetra-versus tri-alkoxysilanes (e.g., see: Wising, N., et al., *Angew. Chem., Int. Ed.*, 37:22-45 (1998)), and of (b) methoxy versus the ethoxysilanes (e.g., see: Wising, N., et al., *Chem. Mater.*, 11:451-457 (1999)), it has been suggested that co-gelation of tetramethoxysilane (TMOS) with 3-aminopropyl triethoxysilane (APTES), leads to a TMOS-derived 3D network of silica nanoparticles, which are surface-modified later with slower-reacting APTES (FIG. 1) (see: Leventis, N., *Acc. Chem. Res.*, 40:874-884 (2007)). Overall, it is noted that hydrolysis and polycondensation of TMOS is catalyzed by the high concentration of base (APTES), and such TMOS/APTES sols gel in seconds. For comparison, such one-pot, one-step TMOS/APTES gel networks have been reproduced here in monolithic aerogel form, and are referred to as TMOS-co-APTES.

Being extremely fast, co-gelation of TMOS and APTES does not leave much room for manipulation, and the course of the reaction could not be diverted away from monolithic gels into micron-sized particles (powders). To that end, a viable approach was to deconvolute gelation of TMOS from incorporation of APTES operationally (FIG. 1). Thus, referring to FIG. 2, materials preparation started with conventional $NH_4OH$-catalyzed hydrolysis and polycondensation of TMOS (Leventis, N., et al., *Chem. Mater.*, 11:2837-2845 (1999)). That reaction is typically carried out by mixing two solutions: Solution A (TMOS in methanol) and Solution B (water+catalyst in methanol). Given the monomer and catalyst concentrations of Solutions A and B (see below), the undisturbed combined solution yields monolithic gels in about 20 min. Here, gelation was disrupted by adding Solutions A and B in hexane under vigorous mechanical stirring. APTES, in a APTES:TMOS mol/mol ratio of 0.2, was added to the reaction mixture as soon as it turned milky-white (in approximately 20 min, as expected). The suspension was aged for 24 h under continuous vigorous stirring to ensure that latching of APTES on the surface of the silica particles was complete. The resulting new wet-silica suspension, and materials from that point on are referred to as APTES@TMOS. That abbreviation is intended to trace the material to its monomers, and to underline the synthetic sequence of events. As it turns out, APTES@TMOS and TMOS-co-APTES were chemically indistinguishable as emphasized in FIG. 1. The APTES@TMOS suspension was separated from the gelation solvents using centrifugation, and the resulting wet APTES@TMOS paste was washed successively (i.e., resuspended and centrifuged) with ethyl acetate (EtOAc, 2×), water-saturated EtOAc (1×), and once with acetone (3×). Those conditions were the result of an optimization study (see FIG. 3) that related acetone washes to the amount of carbonizable polymer taken up during the crosslinking step. In that regard, the combination of one wash with water-saturated EtOAc and one wash with acetone provided silica with a reproducible amount of adsorbed water for the reaction with the required amount of TIPM. For characterization purposes, some of the APTES@TMOS slurry from the last acetone wash was washed again with pentane and was dried at room temperature under vacuum. The rest of the APTES@TMOS slurry was crosslinked at 65° C. for 72 h in Desmodur RE (a commercial solution of TIPM in dry EtOAc, courtesy of Covestro, LLC). The resulting polymer-crosslinked wet-silica suspension was washed with acetone and then with pentane. Excess pentane was removed with a centrifuge, and the wet, crosslinked silica paste was dried under vacuum at ambient temperature to a free-flowing fine powder that is referred to as X-APTES@TMOS.

Figure 2:
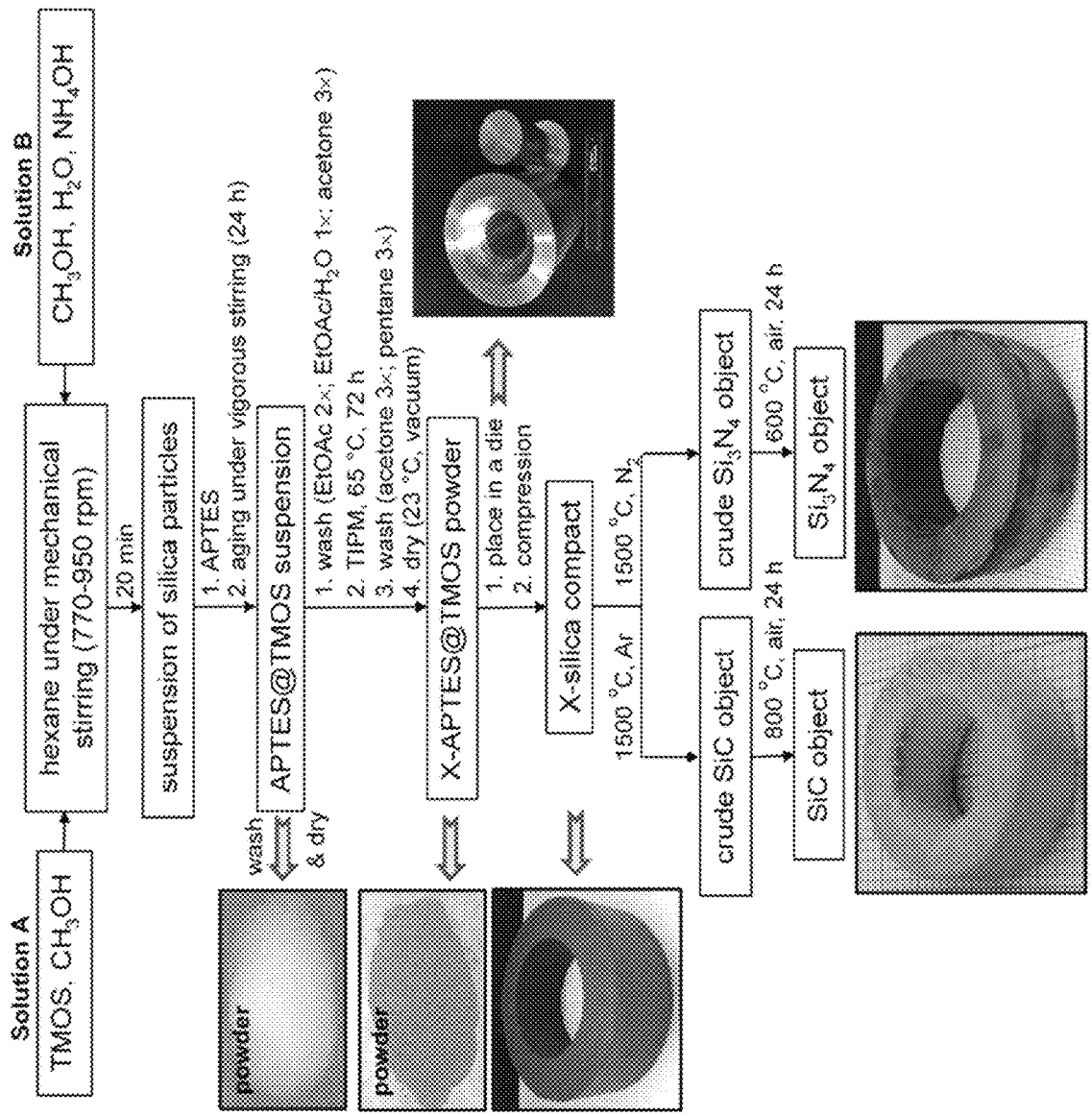
FIG. 2 shows a scheme for fabrication of highly porous SiC and $Si_3N_4$ shaped objects in accordance with an embodiment of the invention herein.
Figure 3:
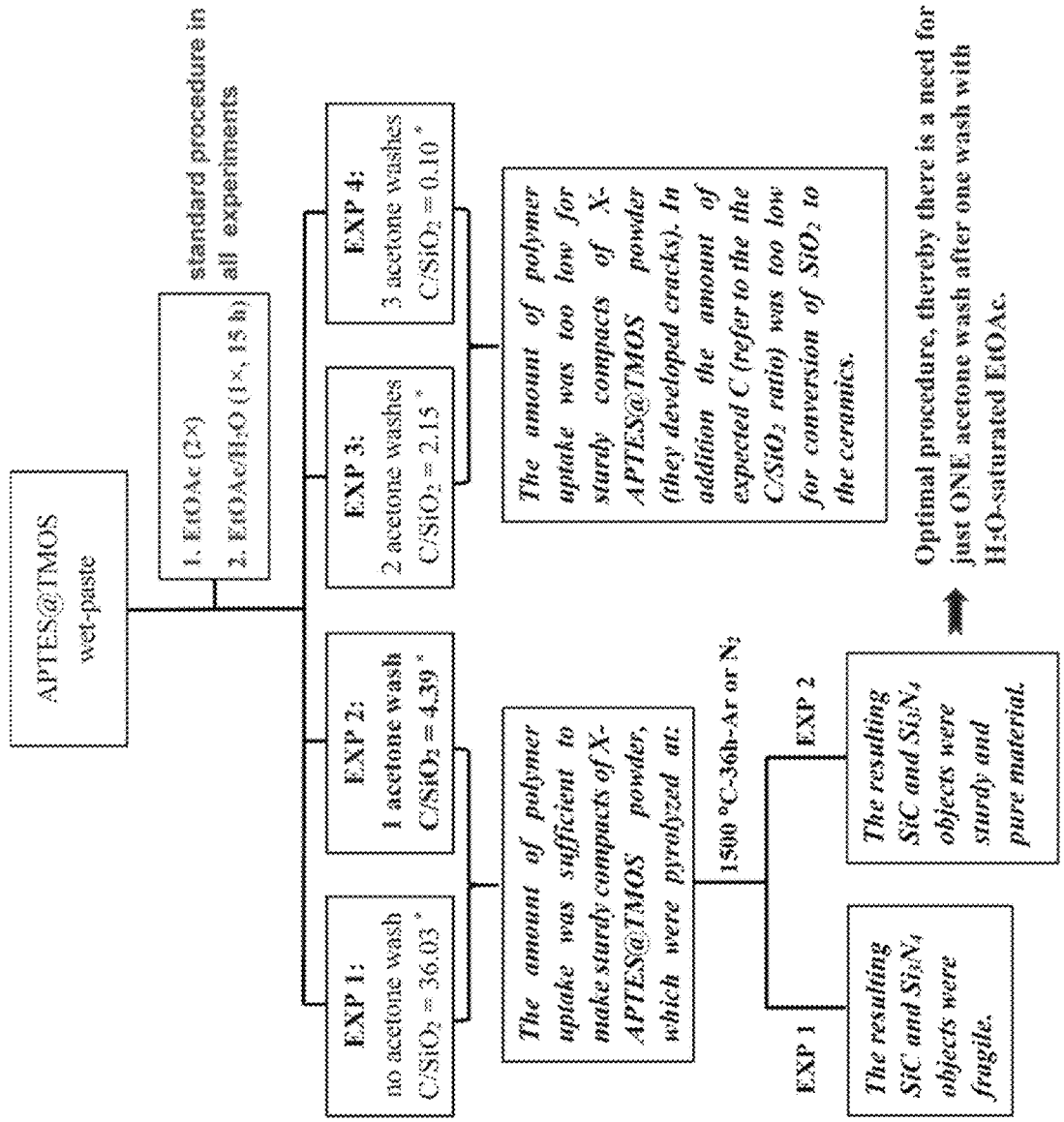
FIG. 3 shows a scheme for optimization of washing procedure for optimal polymer uptake during crosslinking, and thereby optimal amount of carbon produced and available for carbothermal reduction. The asterisk (*) refers to the amount of carbon relative to silica that is expected based on the carbonization yield of TIPM-derived polyurea (56% w/w, by pyrolysis at 800° C./Ar) and the amount of polyurea in the resulting X-APTES@TMOS powder determined with TGA (as in FIG. 11; see below).
Figure 4:
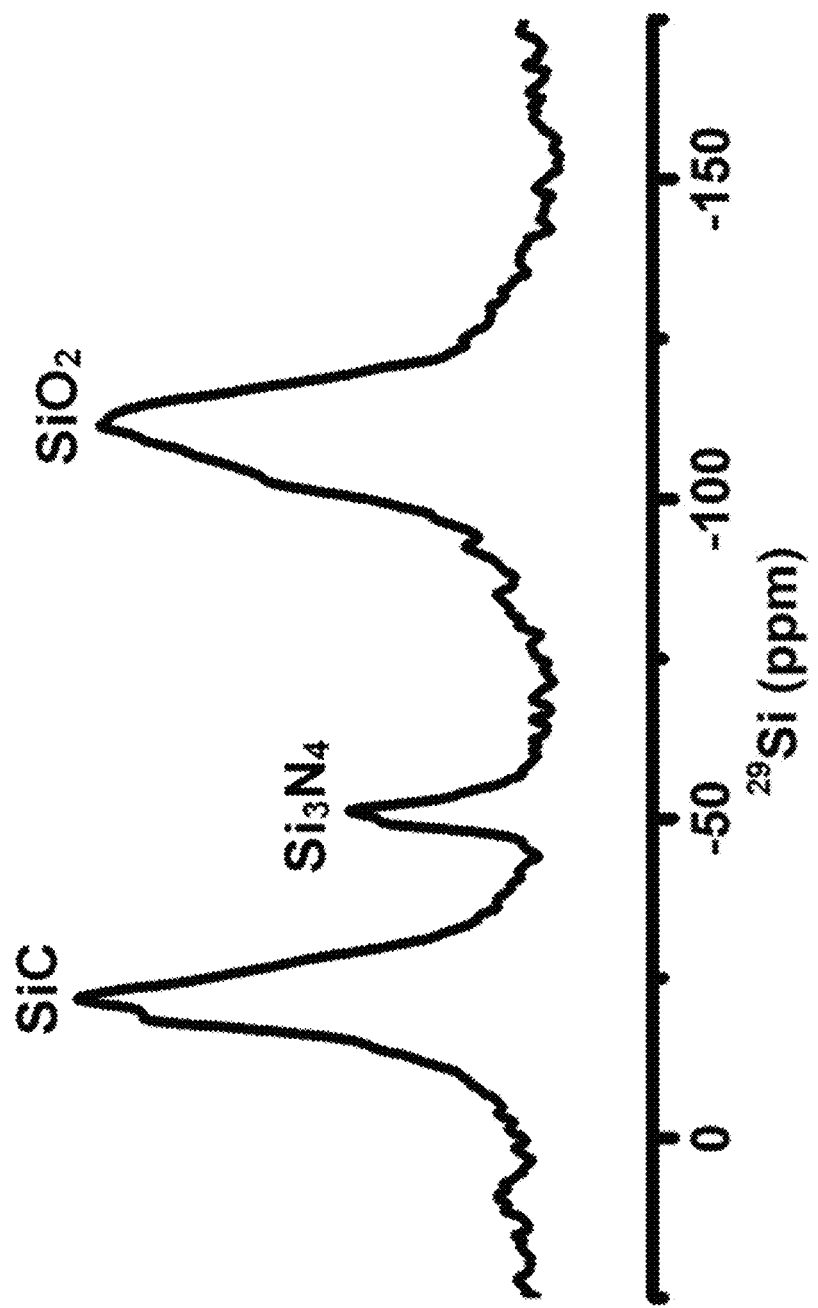
FIG. 4 displays optimization of pyrolytic conditions for converting compressed silica compacts to $Si_3N_4$ aerogels. Shown is the solid-state MAS $^{29}Si$ NMR of a mixture consisting of $SiC:Si_3N_4:SiO_2$ in a ratio of 1:1:1 mol:mol:mol, using a ZrO rotor spun at 7 kHz and direct polarization (zg pulse sequence). Acquisition parameters: number of scans: 16384; relaxation delay: 5 sec; acquisition time: 0.0129 sec; power level for pulse: 250 W. Integrated areas: SiC: 39.02; $Si_3N_4$: 7.77; $SiO_2$: 53.02.
Figure 5:
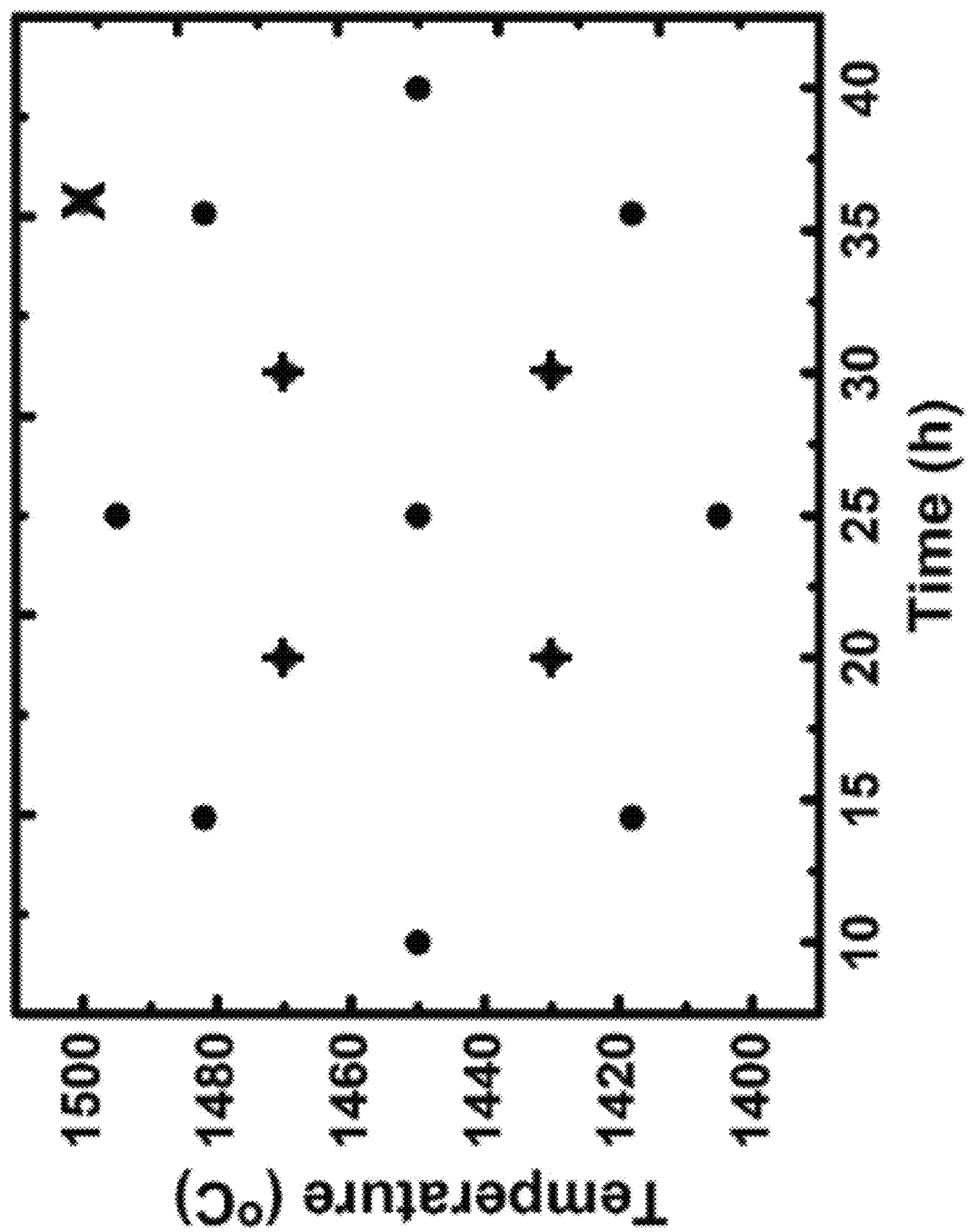
FIG. 5 shows the samples prepared to identify the optimal conditions (pyrolysis temperature and time) for $Si_3N_4$. Black points: samples suggested by a Central Composite Rotatable Design (CCRD) statistical method. Blue points (+): extra points added to the CCRD design to increase confidence. Red point (x): conditions predicted to produce pure $Si_3N_4$.
Figure 7:
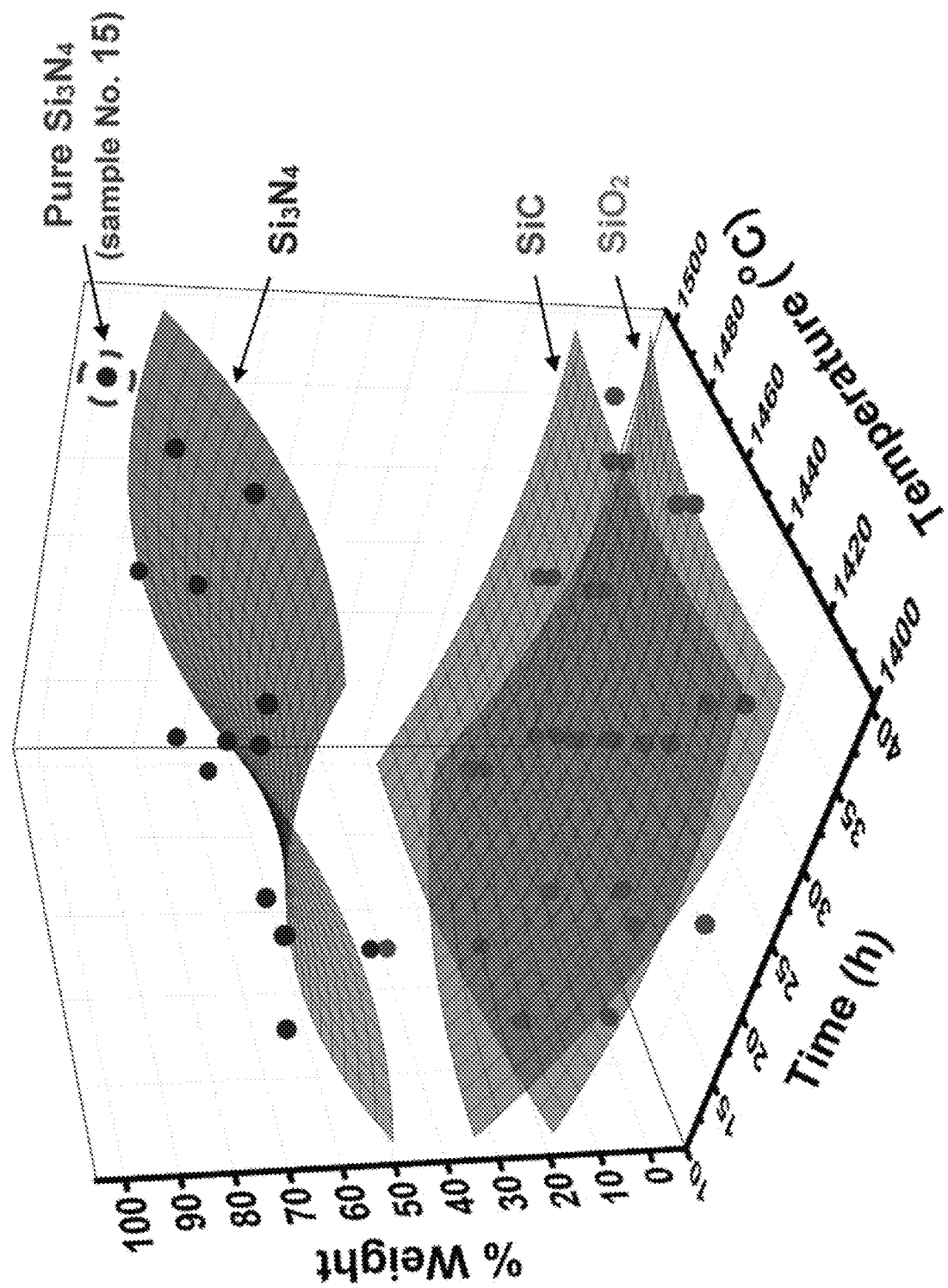
FIG. 7 shows a plot fitting the weight percent data for SiC, $Si_3N_4$ and unreacted $SiO_2$ (from the table in FIG. 6) in samples produced by pyrolysis of X-APTES@TMOS compacts for the time periods (t) and at the specific temperatures ($\theta$) as indicated. The fitting equations are: % SiC=$(0.022_1)$$t^2+(-0.001_4)\theta^2+(-0.0042)t\theta+(4.66_9)t+(4.30_7)\theta+(-3199)$; $R^2$=0.82904. % $Si_3N_4$=$(-0.0636)t^2+(0.003_4)\theta^2+(0.001_1)t\theta+(2.73_5)t+(-9.80_7)\theta+(7078)$; $R^2$=0.91297. % $SiO_2$=$(0.042_5)$$t^2+(-0.0029)\theta^2+(0.003_1)t\theta+(-7.39_4)t+(5.50_0)\theta+(-3780)$; $R^2$=0.93479.

Dry X-APTES@TMOS powder was placed in suitable dies and was compressed under 15,000 psi into sturdy monolithic compacts. To test the latitude of this technology, large donut-shaped objects (FIG. 2) were fabricated with a die made to spec by a commercial machine shop. Finally, X-APTES@TMOS shaped compacts were converted to SiC and $Si_3N_4$ monoliths via pyrolysis at 1500° C. for 36 h under flowing Ar or $N_2$, respectively. Those conditions were identified using solid-state $^{29}Si$ NMR analysis of a series of X-APTES@TMOS compacts that were pyrolyzed according to a pre-determined matrix of temperatures and pyrolysis times (see FIG. 4, FIG. 5, FIG. 6, and FIG. 7). Residual unreacted carbon in the SiC or the $Si_3N_4$ objects was oxidized off with air at elevated temperatures as shown in FIG. 2.

Example 2

Figure 8:
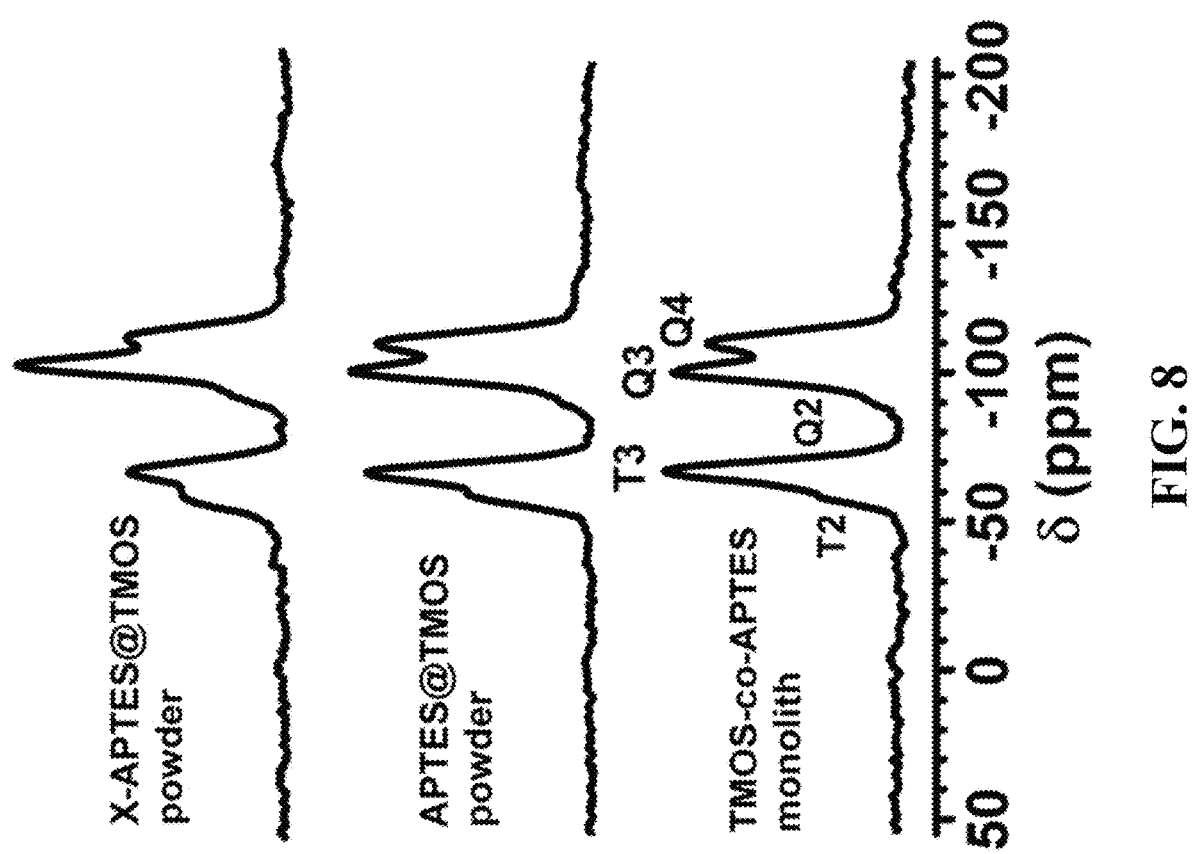
FIG. 8 shows solid-state CPMAS $^{29}Si$ NMR spectra of samples as shown. (For the corresponding spectra under direct polarization see FIG. 10).

Chemical characterization along synthesis. Latching of APTES on TMOS-derived silica particles was confirmed with solid-state CPMAS $^{29}Si$ NMR. The spectrum of APTES@TMOS (FIG. 8) shows two features: (a) a peak at −66 ppm with a shoulder at −59 ppm, which were assigned to the T3 and T2 silica atoms from APTES, and (b) two peaks at −110 ppm and at −101 ppm with a shoulder at −92 ppm, which were assigned respectively to the Q4, Q3 and Q2 silicon atoms from TMOS. The presence of Q3 and T2 silicon atoms points to dangling Si—OH groups, thereby APTES@TMOS offers two kinds of possible sites for reaction with the isocyanate: —$NH_2$ and —OH. FIG. 8 also includes the $^{29}Si$ NMR spectrum of a TMOS-co-APTES aerogel prepared with the same APTES:TMOS mol ratio (0.2) as APTES@TMOS. The two spectra were in all aspects identical, including both the integrated Q:T ratio of 1.635±0.015, as well as the T3:T2 and the Q4:Q3:Q2 ratios, which may lead to the conclusion that: (a) preventing gelation by vigorous agitation; and, (b) separating operationally (experimentally) the incorporation of APTES from gelation of TMOS did not have any adverse effects on the product, which was chemically indistinguishable from well-known TMOS-co-APTES.

Uptake of TIPM-derived polyurea in X-APTES@TMOS was confirmed with solid-state CPMAS $^{13}C$ NMR. The intimate connection of the polymer to the silica framework was investigated with $^{29}Si$ NMR. The amount of polyurea was quantified with thermogravimetric analysis (TGA).

Figure 9:
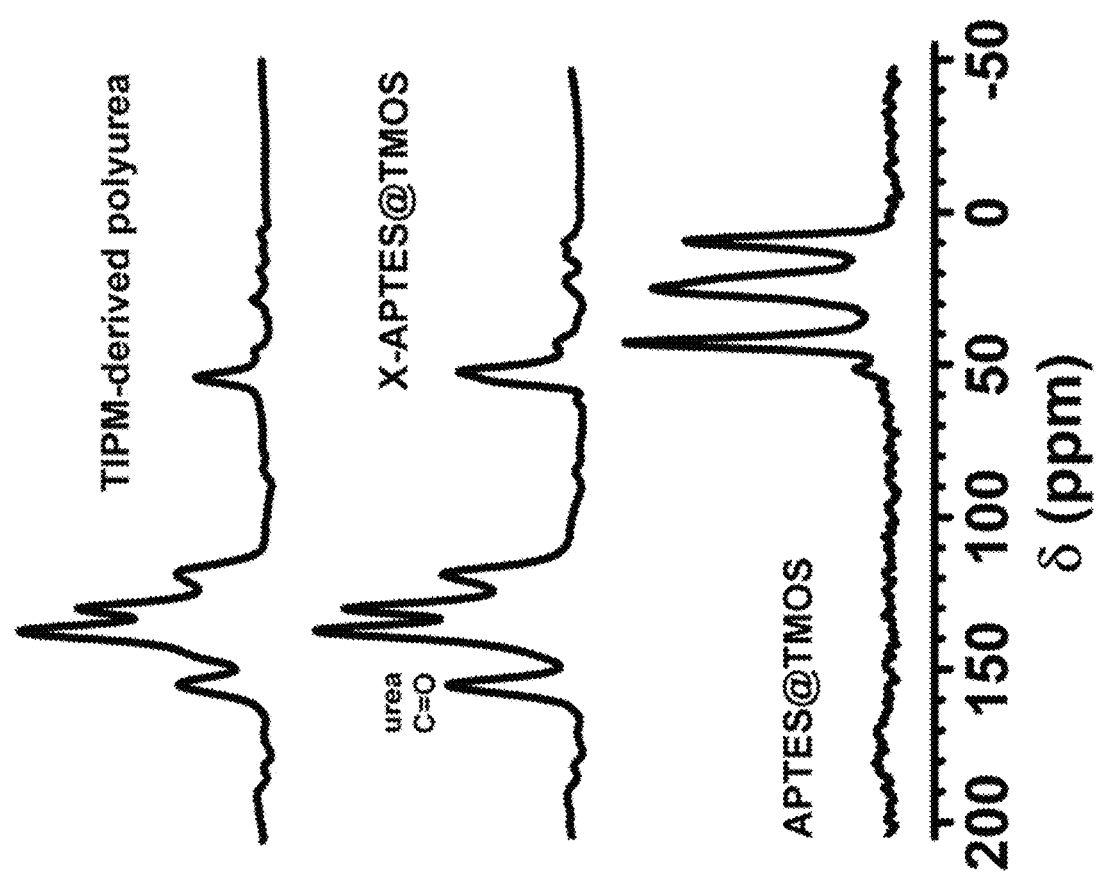
FIG. 9 displays solid-state CPMAS $^{13}C$ NMR of materials as shown.

The CPMAS $^{13}$C NMR spectrum of native APTES@TMOS powder (FIG. 9) shows three upfield peaks of about equal intensity at 42, 25, and 9.5 ppm, which were assigned to the three carbons of APTES. The spectrum of TIPM-crosslinked X-APTES@TMOS powder (FIG. 9) was dominated by the resonances of TIPM-derived polyurea. A spectrum of the latter (see: Leventis, N., et al., *Chem. Mater.*, 28:67-78 (2016)) is included in FIG. 9 for comparison. Owing to massive polymer uptake, the relative intensity of the —$CH_2$— groups of APTES in X-APTES@TMOS was suppressed. Next, turning to the solid-state CPMAS $^{29}$Si NMR spectrum of X-APTES@TMOS powder (FIG. 8), it is noted that the Q4:Q3 ratio changed in favor of Q3 relative to the spectrum of APTES@TMOS: Indeed, in native APTES@TMOS powder the Q4:Q3 area ratio (after deconvolution and Gaussian fitting) was 1.11, in X-APTES@TMOS that ratio was found equal to 0.69. Similarly, the T3:T2 ratio was also reduced from 2.33 before, to 1.33 after crosslinking, i.e., in favor of T2. Those data may be taken to mean that the triisocyanate (TIPM) gets attached to the surface of silica not only via the —$NH_2$ groups that were provided deliberately for that purpose, but also via any other reactive group that it could find available, like for example —SiOH at the Q3 and T2 positions, and, without being bound by theory, the following may be a justification: since all relevant $^{29}$Si NMR spectra of FIG. 8 were run using cross-polarization (CP), after crosslinking Q3 and T2 positions found themselves closer to an abundance of protons, from TIPM, hence their intensity increased relative to Q4 and T3, respectively. To cross-check this proposition, the spectra of APTES@TMOS and of X-APTES@TMOS were also run using direct polarization (see FIG. 10), and it was observed that the intensity ratios of Q4:Q3 and T3:T2 stayed the same before and after crosslinking, as may be expected. Considering both sets of $^{29}$Si NMR data together (i.e., with direct and with cross-polarization), it was concluded that: (a) neither the crosslinking process, nor the accumulated polymer had any adverse effect on the silica backbone, and thereby (b) the intensity increase of Q3 and T2 in CPMAS could possibly only be attributed to polymer uptake at both the innate —OH and the deliberately added —$NH_2$ positions on silica. The next task was to quantify the amount of TIPM-derived polyurea in X-APTES@TMOS powders.

Figure 11:
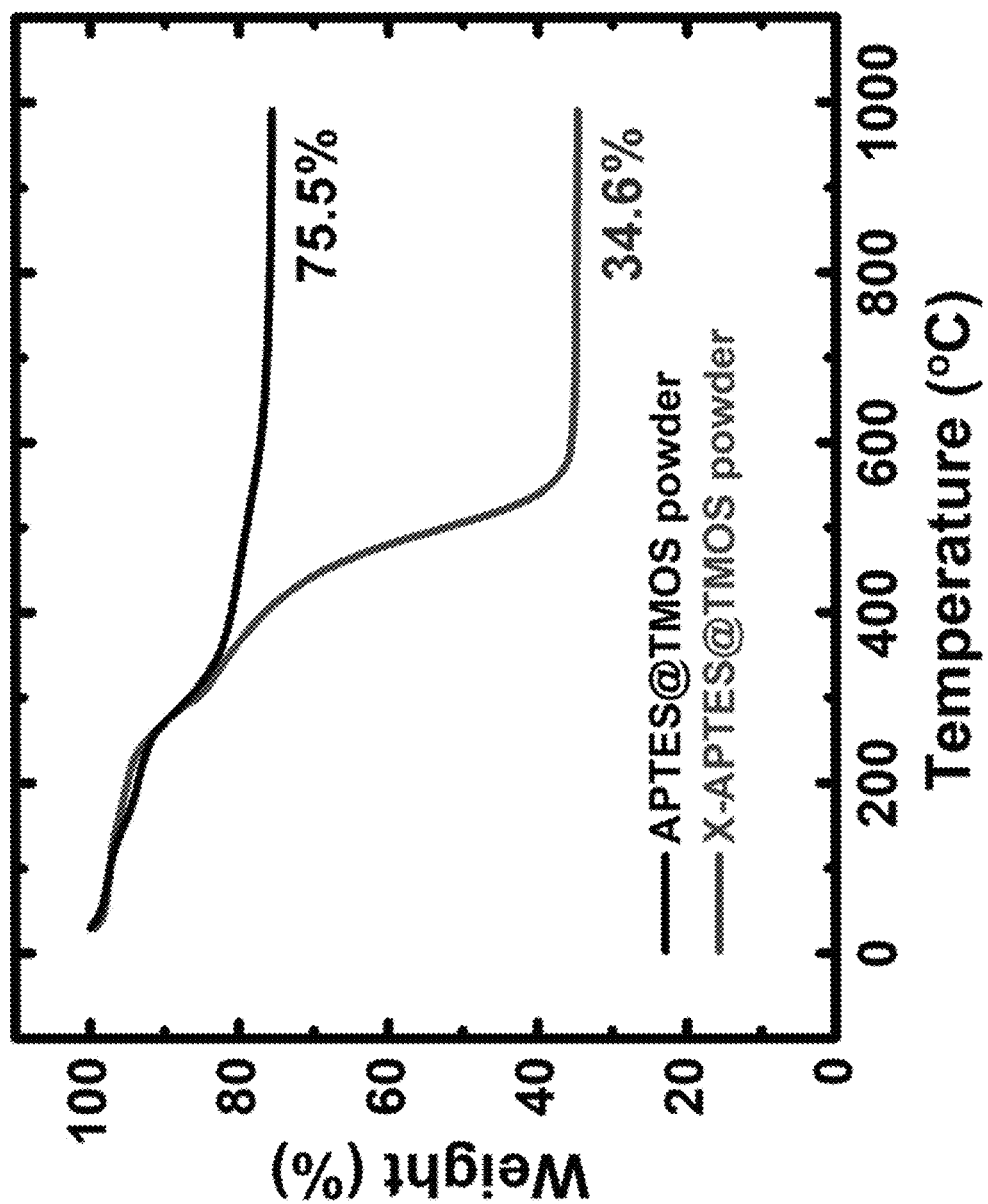
FIG. 11 shows thermogravimetric analysis (TGA) data under $N_2$ of samples as shown. The heating rate was 5° C. $min^{-1}$.

Using thermogravimetric analysis under $O_2$ (TGA, FIG. 11), the APTES@TMOS powder lost 24.5% of its mass, which was attributed to its organic component. Thereby, it was concluded that APTES@TMOS consisted of 75.5% of $SiO_2$. Under the same conditions X-APTES@TMOS lost 65.4% of its mass. That mass loss corresponded to the sum of the organic component coming from APTES plus TIPM-derived polyurea. From those data, it was calculated that X-APTES@TMOS consisted of 34.6% w/w $SiO_2$ and 54.2% w/w of TIPM-derived polyurea. Considering the carbonization yield of the latter (56% w/w, by pyrolysis at 800° C./Ar) (see: Leventis, N., et al., *Chem. Mater.*, 22:6692-6710 (2010)), it was calculated that the C: $SiO_2$ mol/mol ratio that was expected to enter carbothermal reactions towards SiC or $Si_3N_4$ was equal to 4.4. Considering that the C: $SiO_2$ mol ratio for converting $SiO_2$ to SiC is equal to 3 (see Eq 1) (e.g., see: Saito, M., et al., *J. Mater. Sci. Lett.*, 11:373-376 (1992); Klinger N., et al., *J. Am. Ceram. Soc.*, 9:369-375 (1966)), and for converting to $Si_3N_4$ is equal to 2 (refer to Eq 2) (e.g., see: Bandyopadhyay, S., et al., *Ceram. Int.*, 17:171-179 (1991); Ličlco, T., et al., *J. Eur. Ceram. Soc.*, 9:219-230 (1992); Chung, S. L., et al., *J. Mater. Sci.*, 44:3784-3792 (2009)), it was concluded that the expected C: $SiO_2$ mol ratio of 4.4 from X-APTES@TMOS would be sufficient for the complete conversion of $SiO_2$ to either ceramic.

Consistent with the stoichiometry of Eqs 1 and 2 and the expected C: $SiO_2$ mol ratio of 4.4, the crude products from pyrolysis at 1500° C. in Ar (SiC) or $N_2$ ($Si_3N_4$) contained vastly different amounts of carbon. As-prepared SiC articles contained only 0.29±0.07% carbon (by TGA), while those of $Si_3N_4$ contained 49±1% carbon (in both cases, those values were averages of 3 independent experiments, i.e., from different batches). Clearly, some carbon was wasted in the process, but its utilization in the xerogel compacts was much more efficient than in aerogels: for instance, for complete conversion of polyacrylonitrile-crosslinked silica aerogels to SiC, the C: $SiO_2$ ratio had to be ≥7 (see: Leventis, N., et al., *Chem. Mater.*, 22:2790-2803 (2010)).

Figure 12:
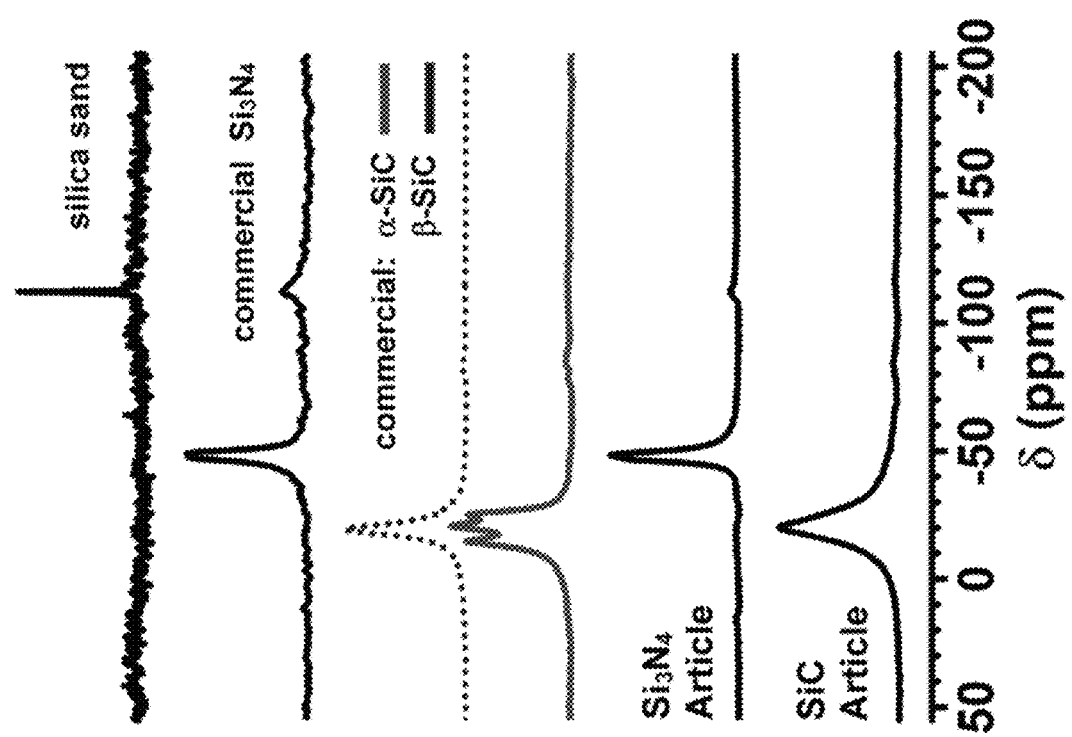
FIG. 12 shows solid-state MAS $^{29}Si$ NMR spectra of samples as shown. All spectra were obtained using excitation with direct polarization.

After removing carbon (FIG. 2), the solid-state $^{29}$Si NMR spectra of the terminal SiC objects showed only one peak at −20 ppm (FIG. 12). The broadness of that resonance was attributed to three overlapping resonances from α-SiC (at −14, −20 and −25 ppm) and one resonance from β-SiC (at −18 ppm) (see: Zujovic, Z. D., et al., *Ind. Eng. Chem. Res.*, 47:9913-9918 (2008)). The spectra of commercial α-SiC and β-SiC are included in FIG. 12 for comparison. Similarly, the $^{29}$Si NMR spectra of the $Si_3N_4$ objects showed a resonance at −48 ppm and a low-intensity peak at −112 ppm. Based on literature values (see: Zujovic, Z. D., et al., *Ind. Eng. Chem. Res.*, 47:9913-9918 (2008); Leonova, E., et al., *Solid State Nucl. Mag. Res.*, 36:11-18 (2009)), as well as the spectra of commercial $Si_3N_4$ and silica sand (both included in FIG. 12), the former peak was assigned to $Si_3N_4$, and the latter one to Q4 type of silicon in $SiO_2$. Based on the relative integrated intensity of the peaks corresponding to $Si_3N_4$ and $SiO_2$ (19:1), and the silica:$Si_3N_4$ response factor (6.82:1.00) at the given acquisition parameters (see FIGS. 4-7), it was calculated that the $SiO_2$ impurity in the $Si_3N_4$ objects was 0.33% w/w. It is noted that $SiO_2$ was also present as an impurity in the commercial $Si_3N_4$ source at a level of 1.16% w/w (see FIG. 12).

Figure 13:
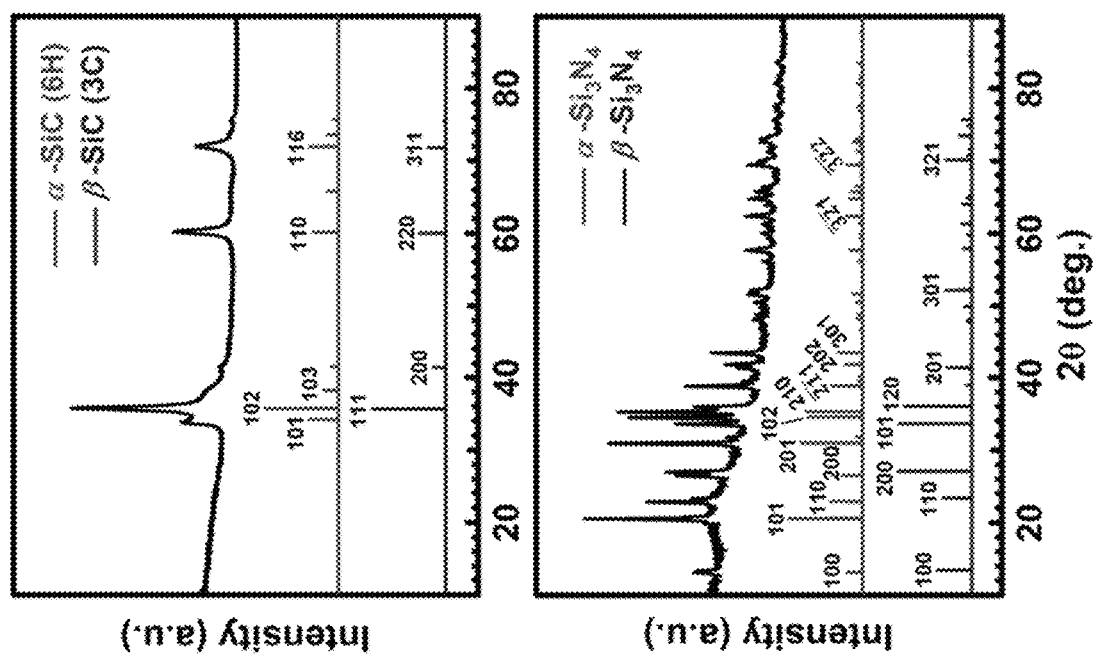
FIG. 13 shows X-ray diffraction of porous ceramic artifacts: Top: SiC; Bottom: $Si_3N_4$.

XRD (FIG. 13) confirmed the presence of both the α- and β-phases of SiC and $Si_3N_4$ in the respective ceramic objects. No peaks corresponding to remaining crystalline silica were present. Quantitative phase analysis for SiC was difficult owing to overlapping, or partially overlapping reflections from the α- and β-phases. From analysis of the pattern generated from the (101) and (102) reflections of α-SiC, and the (111) reflection of β-SiC, an approximate composition of 68% of α-SiC and 32% of β-SiC was obtained. On the other hand, $Si_3N_4$ consisted of 78% of α-$Si_3N_4$ and 22% of β-$Si_3N_4$. The proximity/overlap of the (102)/(111), (110)/(220), and (116)/(311) reflections of α-SiC/β-SiC caused additional peak broadening, thereby the average crystallite size calculated via the Scherrer equation (see: Patterson, A., *Phys. Rev.*, 56:978-982 (1939)) from those three reflections (11.9±2.8 nm) is considered as the lowest limit. On the other hand, the average crystallite size of α-$Si_3N_4$ was calculated at 46.9 nm (from the (101) reflection at 2θ=20.4°), and the crystallite size of β-$Si_3N_4$ was calculated at 52.5 nm (from the (101) reflection at 2θ=33.5°).

Example 3

Materials Characterization. That focused on: (a) the evolution of the micromorphology and the pore structure along the operations of FIG. 2, and (b) application-related properties such as oxidation resistance at high temperatures, thermal conductivity and mechanical strength.

Figure 14:
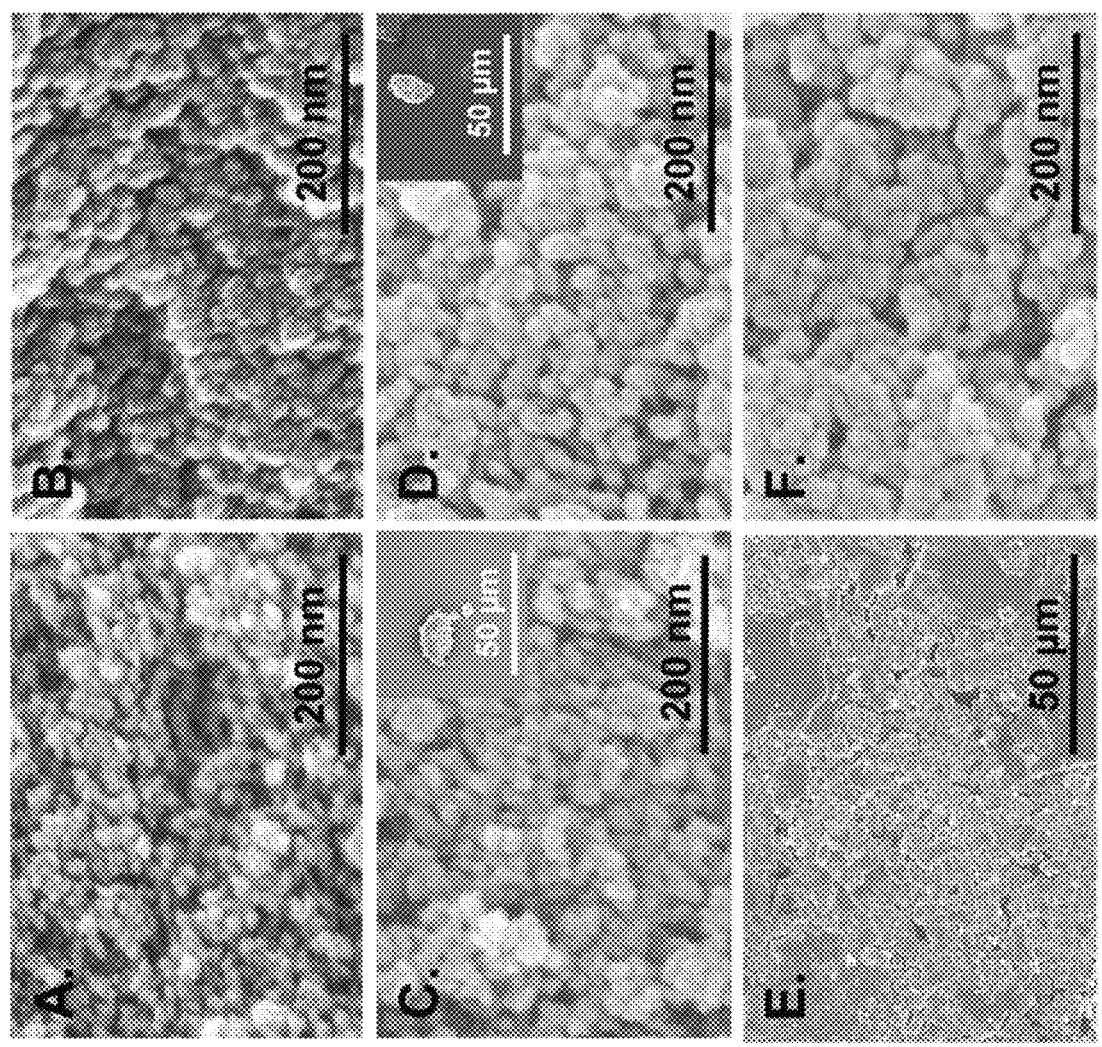
FIG. 14 displays SEM of: (A) TMOS-co-APTES aerogel; (B) X-TMOS-co-APTES aerogel; (C) Inside a grain (see Inset) of a APTES@TMOS powder; (D) Inside a grain (see Inset) of a X-APTES@TMOS powder; (E) Low magnification image from inside a X-APTES@TMOS compact; and, (F) High magnification image from inside a X-APTES@TMOS compact.
Figure 15:
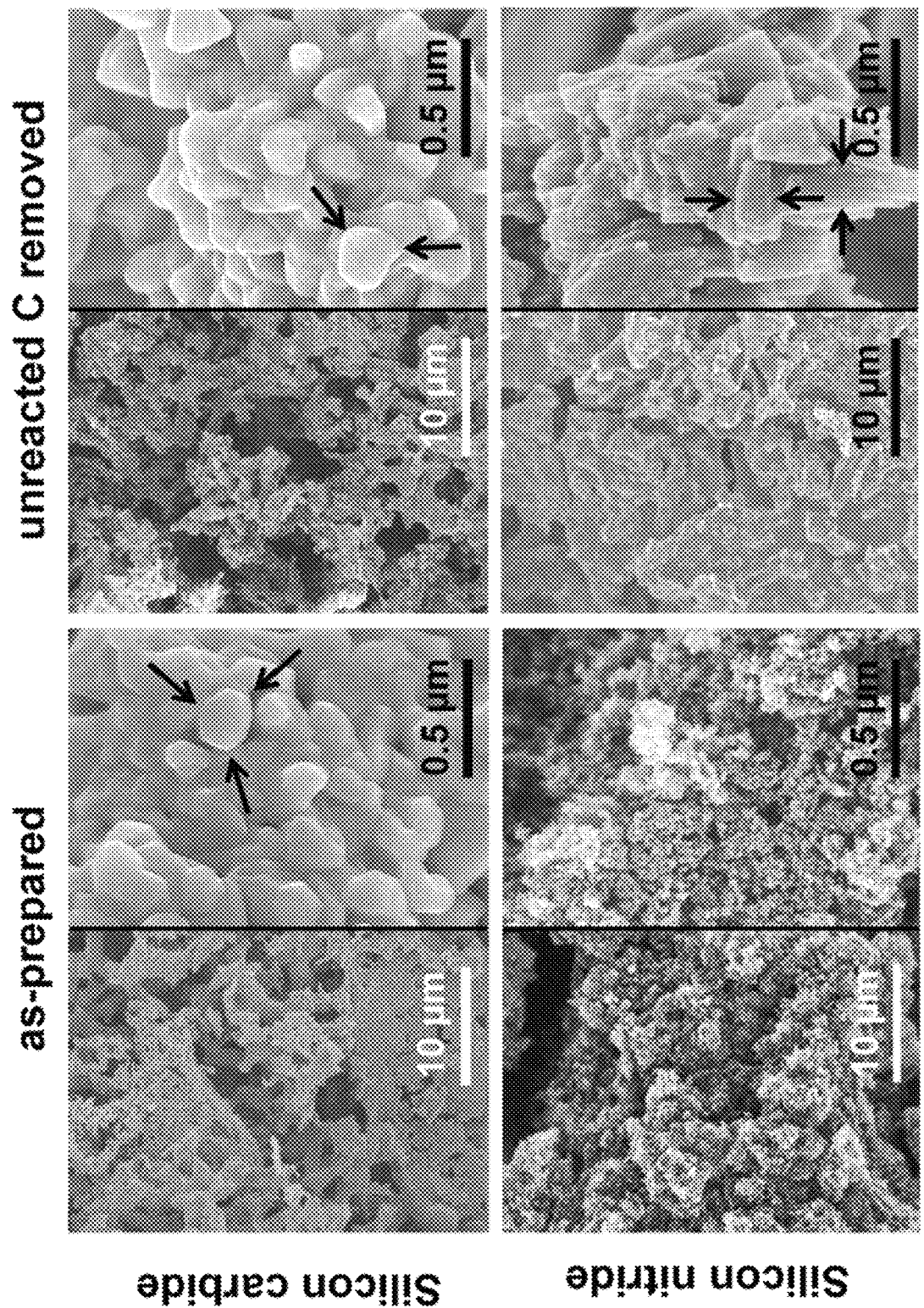
FIG. 15 shows SEM from a fracture cross-section of a SiC and a $Si_3N_4$ aerogel artifact at two different magnifications, before and after removal of unreacted carbon, as indicated. Arrows show features that correspond to features in the precursors (the X-APTES@TMOS compacts—case of SiC) or to crystallite sizes calculated from the XRD data (case of $Si_3N_4$).

Structural evolution along processing: The evolution of the micromorphology along processing is illustrated in FIGS. 14 and 15. Relevant material characterization data are summarized in Table 1. For setting a reference point relative to previous literature both FIG. 14 and Table 1 include corresponding data for TMOS-co-APTES and X-TMOS-co-APTES aerogel monoliths. FIGS. 14C and 14D concern powders and include insets showing typical grains of the respective materials, irregular shaped, about 50 μm in size; the main subject of FIGS. 14C and 14D is the interior of those grains, in high magnification.

limits for the correct values of Π inside granules, because bulk densities used for calculating Π were what is referred to as tapped-densities (see: "Bulk Density and Tapped Density of Powders." World Health Organization Document QAS/11.450, March 2012). Overall, all data together show that polymer-coated nanoparticles in polyurea-crosslinked xerogel powders were squeezed closer together relative to their position in aerogel monoliths.

Next, putting crosslinked xerogel powders in a die under pressure yielded compacts in which the overall porosity was reduced even further (from 45% to 29% v/v), however the

TABLE 1

Materials characterization data along processing

| Sample I.D. | Linear shrinkage (%) [a] | Bulk density, $\rho_b$ (g cm$^{-3}$) | Skeletal density, $\rho_s$ (g cm$^{-3}$) [d] | Porosity, Π (% v/v) [e] | Specific pore volume (cm$^3$ g$^{-1}$) | | | BET surface area, σ (m$^2$ g$^{-1}$) | Average pore diameter Φ, (nm) [i] |
| --- | --- | --- | --- | --- | --- | --- | --- | --- | --- |
| | | | | | $V_{Total}$ [f] | $V_{1.7\text{-}300\_nm}$ [g] | $V_{>300\ nm}$ [h] | | |
| TMOS-co-APTES monolith | 14.30 ± 0.02 [b] | 0.190 ± 0.007 [a] | 1.79 ± 0.02 | 89 | 4.52 | 2.50 | 2.02 | 554 | 32.6 |
| X-TMOS-co-APTES monolith | 13.1$_8$ ± 0.19 [b] | 0.56 ± 0.04 [a] | 1.670 ± 0.002 | 62 | 1.19 | 1.26 | 0 | 374 | 12.7 |
| APTES@TMOS powder | — | 0.35 | 1.770 ± 0.001 | 80 | 2.29 | 1.32 | 0.97 | 294 | 31.2 |
| X-APTES@TMOS powder | — | 0.81 | 1.470 ± 0.005 | 45 | 0.55 | 0.15 | 0.40 | 113 | 19.5 |
| X-APTES@TMOS compact | — | 1.04 ± 0.01 [a] | 1.470 ± 0.001 | 29 | 0.28 | 0.09 | 0.19 | 119 | 9.4 |
| Crude SiC object | 18.6$_9$ ± 0.88 [c] | 0.390 ± 0.003 [a] | 3.04 ± 0.05 | 88 | 2.23 | 0.02 | 2.21 | 5.8 | 1538 |
| SiC object | 20.8$_0$ ± 0.93 [c] | 0.410 ± 0.002 [a] | 3.19 ± 0.09 | 88 | 2.12 | 0.02 | 2.10 | 3.2 | 2642 [6226] |
| Crude Si$_3$N$_4$ object | 18.8$_4$ ± 0.85 [c] | 0.6$_9$ ± 0.18 [a] | 2.67 ± 0.02 | 74 | 1.07 | 0.69 | 0.38 | 152 | 28.1 |
| Si$_3$N$_4$ object | 21.3$_8$ ± 0.88 [c] | 0.35 ± 0.02 [a] | 2.98 ± 0.01 | 85 | 2.52 | 0.02 | 2.50 | 4.7 | 2158 [8027] |

[a] Average of 3 samples.
[b] Shrinkage = 100 × (mold diameter − sample diameter)/(mold diameter).
[c] Shrinkage relative to the X-APTES@TMOS compact.
[d] Single sample, average of 50 measurements.
[e] Porosity, Π = 100 × ($\rho_s$ − $\rho_b$)/$\rho_s$.
[f] $V_{Total}$ was calculated via $V_{Total}$ = (1/$\rho_b$) − (1/$\rho_s$).
[g] $V_{1.7\text{-}300\ nm}$ from N$_2$-sorption data via the BJH desorption method.
[h] $V_{>300\ nm}$ = $V_{Total}$ − $V_{1.7\text{-}300\ nm}$.
[i] For single number entries, or the first of two number entries: average pore diameters were calculated via the 4 V/σ method by setting V = $V_{Total}$ = (1/$\rho_b$) − (1/$\rho_s$); numbers in [brackets] are weighted averages calculated from the pore size distribution curves obtained using Hg-intrusion porosimetry.

Referring to FIG. 14, and cross-referencing with Table 1, there is a clear increase in compactness from a TMOS-co-APTES aerogel monolith (FIG. 14A) to the APTES@TMOS xerogel powder (FIG. 14C): the arrangement of the elementary building blocks (nanoparticles) is more dense in the xerogel powder, and both the porosity, Π, and the BET surface area, σ, decreased from 89% to 80%, and from 554 m$^2$ g$^{-1}$ to 294 m$^2$ g$^{-1}$. Also, as expected from all previous literature on polymer-crosslinked aerogels (e.g., see: Leventis, N., *Acc. Chem. Res.*, 40:874-884 (2007); Mohite, D. P., et al., *Chem. Mater.*, 24:3434-3448 (2012)), both Π and σ decreased from the TMOS-co-APTES aerogel (FIG. 14A: 89% and 554 m$^2$ g$^{-1}$) to the crosslinked X-TMOS-co-APTES aerogel (FIG. 14B: 62% and 374 m$^2$ g$^{-1}$). The same trend was noted with xerogel powders: by going from APTES@TMOS to X-APTES@TMOS, elementary particles in SEM became fuzzier ((FIGS. 14C and 14D), and the Π and σ values decreased from 80% and 294 m$^2$ g$^{-1}$, to 45% and 113 m$^2$ g$^{-1}$, respectively. It is noted that porosities reported for powders should be considered as the upper BET surface area (119 m$^2$ g$^{-1}$) was not affected. Those data suggest that on one hand grains of powder were squeezed together, which (a) was anticipated from the nature of the compacting process, and (b) is evident in lower-resolution SEM (FIG. 14E); on the other hand, however, the fundamental building blocks of the network inside crosslinked granules were not affected by compaction: not much difference was observed between FIGS. 14D and 14F, and the BET surface area, as just mentioned, remained unaffected.

Carbothermal reduction towards either SiC or Si$_3$N$_4$ caused about 19% shrinkage in linear dimensions relative to the compacts. In both cases, high-temperature treatment in air in order to remove residual carbon caused an additional 2% shrinkage. As expected from the very low amount of residual carbon in as-prepared SiC samples (see above and below), microscopically, as-prepared and clean-of-residual-carbon SiC (FIG. 15, top row) looked very similar to one another, consisting of macroporous networks formed by almost dendritic kind of structures. Using a higher magnification, the skeletal framework consisted of fused nanoparticles (pointed with arrows), reminiscent, both in shape and size, of the polyurea crosslinked particles in X-APTES@TMOS. On the other hand, the case with $Si_3N_4$ was different. As-prepared $Si_3N_4$ appeared grainy at all magnifications (FIG. 15, lower row). However, after pyrolytic removal of unreacted carbon, the skeletal framework of $Si_3N_4$ appeared macroporous and particulate; using a higher magnification it appeared consisting of stacked-and-fused rectangular-shaped platens. The approximate size of those platens (confined with arrows in SEM) matches with the crystallite size calculated from XRD via the Scherrer equation (about 50 nm). On the contrary, the size of the fused particles in SiC was larger than the calculated crystallite size (around 10 nm), meaning that those particles were polycrystalline.

The evolution of several key material properties (Table 1) was consistent with the evolution of the microscopic appearance of the samples before and after C removal (FIG. 15). Specifically, bulk and skeletal densities, porosities, pore volumes and BET surface areas of as-prepared, and of clean-of-carbon SiC were quite close to one another. On the other hand, after removing unreacted carbon, $Si_3N_4$ objects were less dense (0.35 vs. 0.69 g $cm^{-3}$), more porous (85% vs. 74%) and their BET surface area was much lower (4.7 $m^2$ $g^{-1}$) compared to as-prepared samples (152 $m^2$ $g^{-1}$). SEM and materials characterization data considered together were consistent with the fact that as-prepared SiC had hardly any unreacted carbon (0.29% w/w—by TGA, see above and below), while as-prepared $Si_3N_4$ included a significant amount (49% w/w) of unreacted carbon.

Overall, clean-of-carbon SiC and $Si_3N_4$ objects had similar bulk densities (0.410 vs. 0.352 g $cm^{-3}$, respectively), similar porosities (87% vs. 85% v/v, respectively), similar total specific pore volumes ($V_{Total}$, 2.12 vs. 2.52 $cm^3$ $g^{-1}$, respectively, calculated from bulk and skeletal density data), they both had low BET surface areas (3.2 vs. 4.7 $m^2$ $g^{-1}$), and they were void of mesopores and smaller macropores: in both cases the pore volumes of pores with sizes in the 1.7-300 nm range (by $N_2$ sorption) were just 0.02 $cm^3$ $g^{-1}$ (i.e., a very small fraction of $V_{Total}$).

Figure 16:
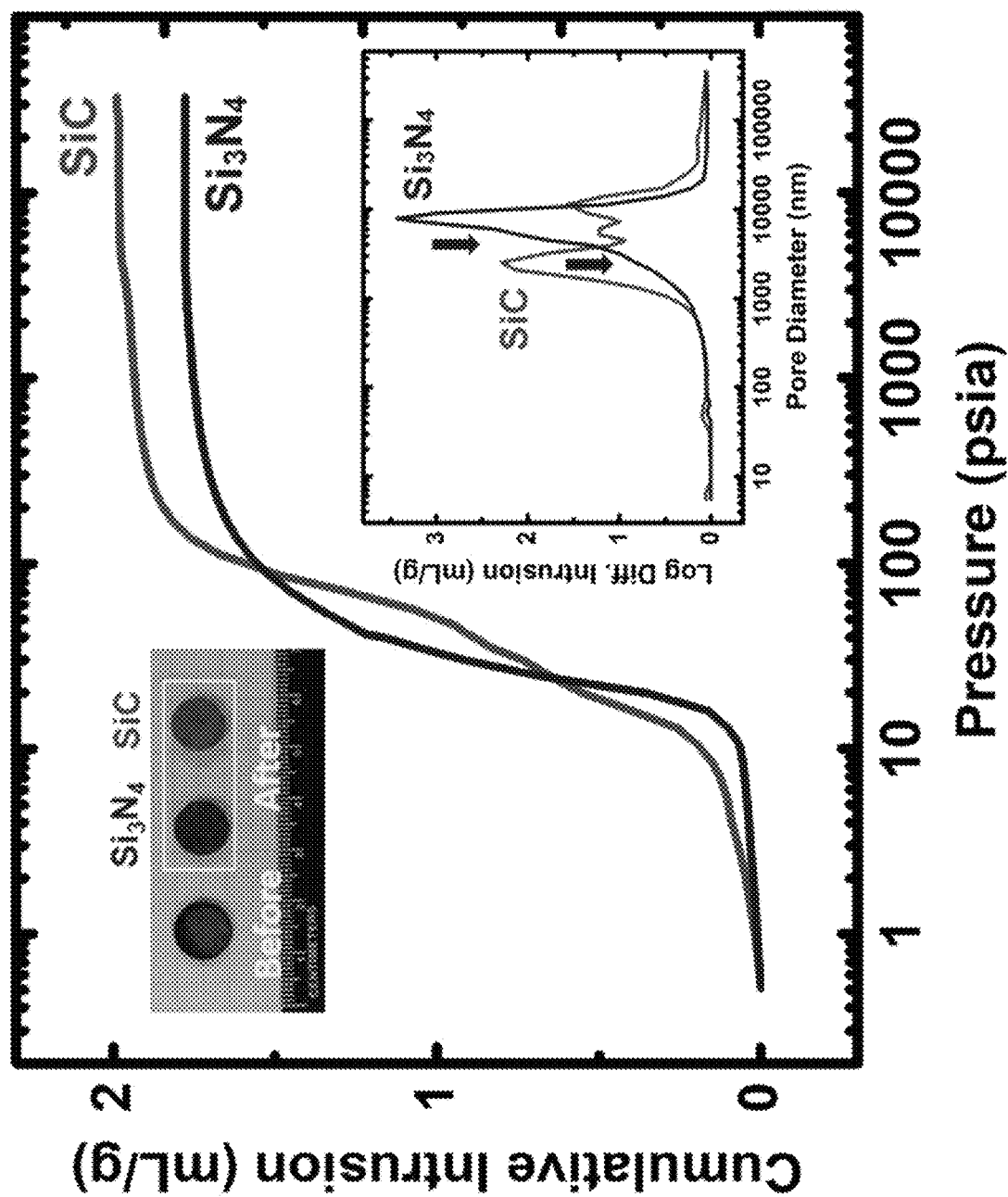
FIG. 16 shows Hg-intrusion porosimetry of porous SiC and $Si_3N_4$ artifacts. Lower Inset: Pore size distributions. Upper Inset: Before testing, $Si_3N_4$; after testing, as shown.

Finally, the macropore structure of both materials was quantified with Hg intrusion porosimetry (FIG. 16). The Hg intrusion curves for both materials were smooth, sigmoidal, they started rising early and both leveled off by 500 psi. Samples were recovered intact after the experiments (see inset photograph in FIG. 16). The intrusion curve of $Si_3N_4$ was steeper. Along increasing pressure, SiC showed two clear steps with a smaller deflection in the middle. Pore size distribution curves derived from those data (FIG. 16, lower inset) showed that SiC had a trimodal distribution of pores, with about half of the pore volume distributed around 2.5 μm, while most of the other half of the pore volume was assigned to pores centered around 11.0 μm, with the balance to pores distributed around 5.7 μm. The overall average pore size in SiC was calculated by integration of the pore size distribution curve, and was found equal to 6.23 μm. $Si_3N_4$ included one main kind of pores with a distribution maximum at 7.9 μm; two small bumps (shoulders, pointed at with blue arrows) at the left of that maximum were at positions where SiC showed maxima, namely at around 6 μm and 2.5-3 μm. The average pore size in $Si_3N_4$ was calculated in a similar fashion to that of SiC and was found equal to 8.0 μm.

Thermal characterization of SiC and $Si_3N_4$ articles: Properties of interest included thermal stability in oxidizing environments, and thermal conductivity. The thermal stability of the porous SiC and $Si_3N_4$ ceramic objects was investigated up to 1000° C. using TGA under $N_2$ and under $O_2$. Under $O_2$, $Si_3N_4$ appeared more stable than SiC. The latter started gaining mass at about 800° C. (FIG. 17A), presumably due to oxidation processes akin to sintering SiC powders (e.g., see: Roy, J., et al., *Rev. Adv. Mater. Sci*, 38:29-39 (2014); She, J., et al., *J. Eur. Ceram. Soc.*, 24:331-334 (2003).

Figure 17:
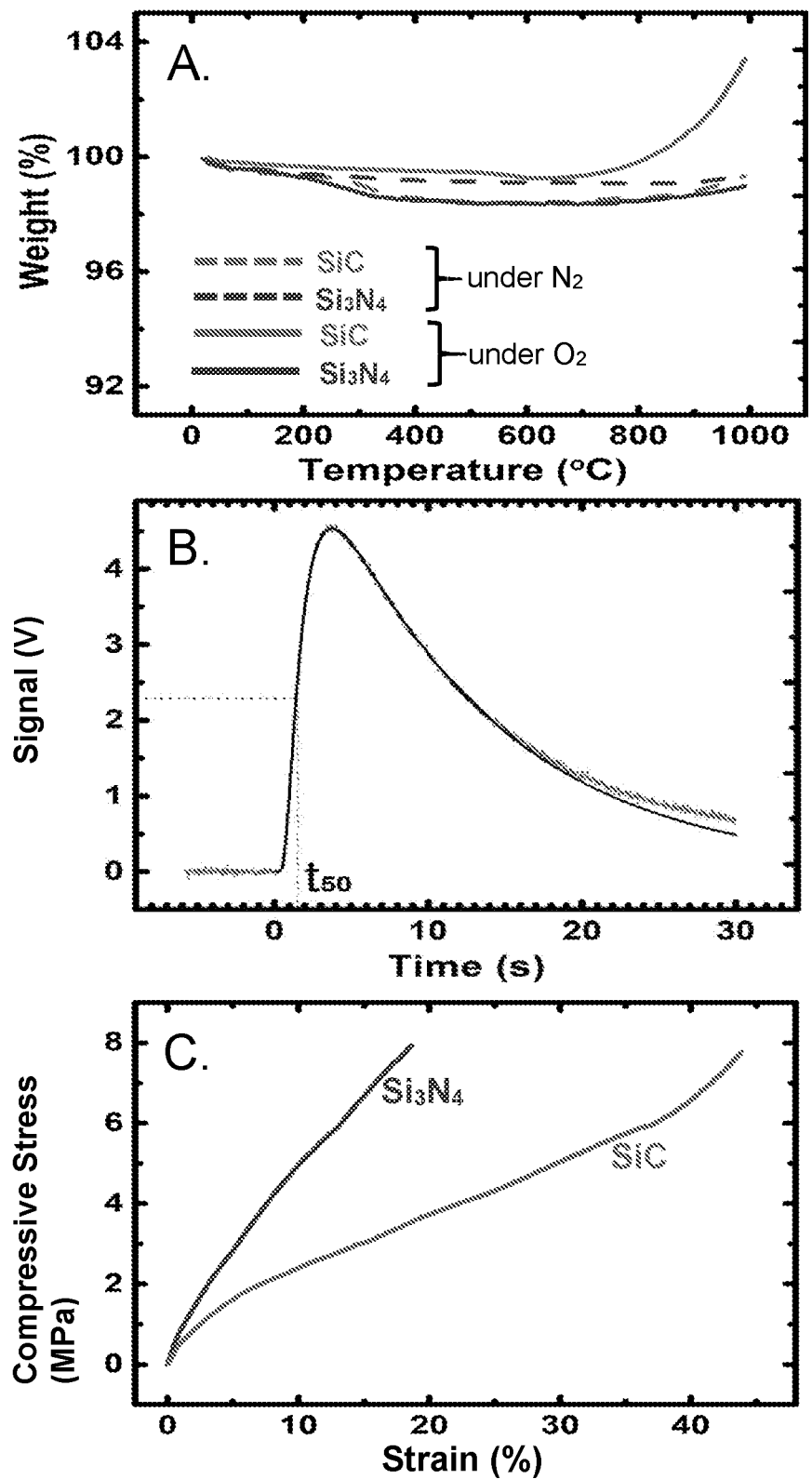
FIG. 17 shows representative applications related data for SiC and $Si_3N_4$ artifacts: (A) TGA data related to the thermal stability of the two porous ceramic artifacts up to 1000° C. under $O_2$ vs $N_2$. (B) Laser flash data for finding the thermal diffusivity, R, of the final C-free SiC and $Si_3N_4$ samples. The detector voltage was proportional to the temperature. Data shown are for SiC. $t_{50}$ is the time it takes for the temperature at the back side of the sample to reach 50% of its maximum value. (C) Compressive stress-strain data for the two porous ceramics at the densities given in Table 1.

The thermal conductivity of both ceramic artifacts was determined at room temperature using thermal diffusivity data obtained with the laser flash method. Representative data are shown in FIG. 17B. The voltage at the detector was proportional to the temperature of the sample at the side opposite to excitation. Fitting those data to Fick's first law (see: Cowan, R. D., *J. Appl. Phys.*, 32:1363-1369 (1961), and 34:926-927 (1963)), yielded the thermal diffusivity, R, of each sample. Thermal conductivities, λ, were calculated via $\lambda = \rho_b \times c_P \times R$, where $c_P$ is the heat capacity of each sample and was measured using modulated differential scanning calorimetry (MDSC). All relevant data are presented in Table 2. The thermal conductivities of the two materials were: $\lambda_{SiC}$=0.163 W $m^{-1}$ $K^{-1}$ and $\lambda_{Si3N4}$=0.070 W $m^{-1}$ $K^{-1}$, meaning that in general both porous ceramics were very good thermal insulators, despite that the corresponding dense ceramics are fairly good thermal conductors with conductivities equal to 120 W $m^{-1}$ $K^{-1}$ and 30 W $m^{-1}K^{-1}$, for SiC and $Si_3N_4$, respectively (see: http://accuratus.com/materials.html (10 Oct. 2017)). Further analysis of the relative thermal insulation properties of those two materials gave insight about the relative connectivity of their fundamental building blocks along their skeletal frameworks. To that end, first the thermal conduction had to be deconvoluted through the solid network, $\lambda_s$, from: (a) the gaseous thermal conduction through the air-filled porous network, $\lambda_g$, and (b) the thermal conduction via irradiation, $\lambda_{irr}$. The latter was eliminated completely by coating samples with carbon black: no early irradiation spike is observed in the data of FIG. 17B. On the other hand, $\lambda_g$ was calculated using Knudsen's equation (see footnote of Table 2) (see: Lu, X., et al., *Science*, 255:971-972 (1992); Reichenauer, G., et al., *Colloids Surf A*, 300:204-210 (2007)), and it was found equal to 0.0220 W $m^{-1}$ $K^{-1}$ and 0.0214 W $m^{-1}$ $K^{-1}$ for SiC and $Si_3N_4$, respectively (Table 2). As expected from the large pore sizes of both materials, those $\lambda_g$ values were close to the thermal conductivity of still open air ($\lambda_{g,o}$=0.02619 W $m^{-1}$ $K^{-1}$, at 300 K, 1 bar). The thermal conductivities through the two solid frameworks, $\lambda_{s,SiC}$ and $\lambda_{s,Si3N4}$, were then calculated by subtracting their $\lambda_g$ values from their λ values ($\lambda_s = \lambda - \lambda_g$), and they were found: $\lambda_{s,SiC}$=0.141 W $m^{-1}$ $K^{-1}$ and $\lambda_{s,Si3N4}$=0.049 W $m^{-1}K^{-1}$.

Mechanical characterization of SiC and $Si_3N_4$ articles: The elastic modulus of the two aerogels was measured under quasi-static compression in the spirit of ASTM D1621-04a using cylindrical specimens with length/diameter ratio of about 0.6. The shape of the stress-strain curves of $Si_3N_4$ showed brittle behavior, while the curves of SiC were polymer-aerogel-like (see: Chidambareswarapattar, C., et al., *Chem. Mater.*, 25:3205-3224 (2013)), showing some ductility with a compaction onset at about 40% strain (FIG. 17C). At comparable bulk densities (0.410 g $cm^{-3}$ versus 0.352 g $cm^{-3}$ for SiC and $Si_3N_4$, respectively) the ultimate strengths of the two materials were also similar, 7.47±0.30 MPa for SiC versus 7.35±0.41 MPa for $Si_3N_4$, however, because the $Si_3N_4$ curves were steeper, they reached the ultimate strength at lower strains (17.1±5.1%, versus 49.3±3.9% for SiC). The elastic moduli of the two materials, E, were calculated from the early slopes of the stress-strain curves (at <3% strain) and were found $E_{SiC}$=36.7±6.6 MPa, and $E_{Si_3N_4}$=59.4±7.4 MPa. Curiously, $Si_3N_4$ appeared stiffer than SiC, even though the intrinsic elastic modulus of pure $Si_3N_4$ ($E°_{Si_3N_4}$=304 GPa) is lower than that of SiC ($E°_{SiC}$=430 GPa) (see: Calister, W. D. Jr., "Materials Science and Engineering an Introduction," Fourth Edition, John Wiley & Sons, Inc. New York, N.Y.: 1997, Chapter 13.8, p 401).

TABLE 2

Thermal Conductivity Data

| Sample | Bulk density $\rho_b$ (g cm$^{-3}$) | Heat capacity @ 23° C. $c_P$ (J g$^{-1}$ K$^{-1}$) | Thermal diffusivity R (mm$^2$ s$^{-1}$) | Thermal conductivity $\lambda$ (W m$^{-1}$ K$^{-1}$) $^a$ | $\Pi$ $^b$ (% v/v) | Avg. pore diameter $\Phi$ (nm) $^c$ | Gaseous thermal conductivity $\lambda_g$ (W m$^{-1}$ K$^{-1}$) $^d$ | Solid thermal conductivity $\lambda_s$ (W m$^{-1}$ K$^{-1}$) $^e$ |
|---|---|---|---|---|---|---|---|---|
| SiC | 0.410 ± 0.002 | 0.72$_6$ ± 0.074 | 0.54$_8$ ± 0.049 | 0.16$_3$ ± 0.010 | 0.8772 | 6226 | 0.02198 | 0.141 |
| $Si_3N_4$ | 0.35$_2$ ± 0.024 | 0.76$_4$ ± 0.028 | 0.262 ± 0.005 | 0.070 ± 0.001 | 0.8467 | 8027 | 0.02142 | 0.049 |

$^a$ Via $\lambda = \rho_b \times c_P \times R$, average of 3 samples.
$^b$ Porosity in decimal notation.
$^c$ From Hg intrusion porosimetry.
$^d$ From Knudsen's equation: $\lambda_g = (\lambda_{g,o}\Pi)/(1 + 2\beta(l_g/\Phi))$, whereas: $\lambda_{g,o}$ is the intrinsic conductivity of the pore-filling gas (for air at 300 K at 1 bar, $\lambda_{g,o}$ = 0.02619 W m$^{-1}$ K$^{-1}$), $\beta$ is a parameter that accounts for the energy transfer between the pore-filling gas and the aerogel walls (for air $\beta$ = 2), $l_g$ is the mean free path of the gas molecules (for air at 1 bar pressure, $l_g \approx$ 70 nm).
$^e$ Via $\lambda_s = \lambda - \lambda_g$.

Example 4

Materials synthesis. Without being bound by theory, the comparative chemical characterization of TMOS-co-APTES monolithic aerogels and of APTES@TMOS powders (FIG. 8) may be considered as providing proof to a long-standing hypothesis that during co-gelation of TMOS/APTES, APTES first catalyzes the formation of a TMOS-derived network, to which it gets attached later.

Disruption of gelation with vigorous agitation has been an efficient method to produce sol-gel silica powders. The powder particles were irregular-shaped. It is understood that there may be other methods involving use of surfactants that may yield spherical silica particles (e.g., see: Alnaief, M., et al., *J. Supercrit. Fluid*, 55:1118-1123 (2011)); however, it has been reported that vibrated irregular particles pack more densely (e.g., see: Mounfield, C. C., et al., *Physica A*, 210:301-316 (1994)), thereby those alternative approaches to more spherical particles were not considered herein. TIPM-derived polyurea is attached to the surface of silica via the APTES-supplied —NH$_2$ groups, but as $^{29}$Si NMR evidence suggests (FIG. 8), TIPM appears to be an opportunistic crosslinker that engages not only —NH$_2$ groups, but also dangling —SiOH groups at Q3 and T2 positions.

The polymer (e.g., polyurea and/or polyurethane) layer coating of silica nanoparticles acts as a binder that, under compression, glues the powder grains together yielding sturdy compacts. Carrying out the whole process with xerogel-like powders, dried via solvent evaporation rather than via supercritical fluids, has brought core-shell-like skeletal silica particles coated with a carbonizable polymer in close contact with one another. For example, in the case of SiC, initial reaction of SiO$_2$ with C at their interface yields a thin layer of SiC (e.g., see: Matrin, H. P., et al., *J. Eur. Ceram. Soc.*, 18:1737-1742 (1998)) that prevents further direct reaction between the two. Complete consumption of SiO$_2$ and its conversion to SiC relies on CO, produced via SiC+2SiO$_2$→3 SiO+CO, passing though the SiO$_2$ core. However, owing to the topology of that reaction (at the SiC/SiO$_2$ interface) only half of CO goes through silica; the other half moves through carbon and once it reaches the nearest pore (at the other side of the C-coating) it is carried away and is lost. In xerogel compacts, however, most of the CO moving through the C shell does not reach a pore; instead, it enters the C-shell of another C-on-SiO$_2$ particle at a nearby strand, and eventually reaches silica again. The result was that complete conversion of SiO$_2$ to SiC was achieved with a near stoichiometric ratio of C:SiO$_2$ (4.4), while conversion of more loosely-packed aerogels requires a large excess of carbon (>7 mol/mol) in order to compensate for the loss of CO (see: Leventis, N., et al., *Chem. Mater.*, 22:2790-2803 (2010)). Finally, the observation that conversion of X-APTES@TMOS compacts to Si$_3$N$_4$ left half of the carbon unreacted may imply that Si$_3$N$_4$ and SiC were produced in parallel processes, namely SiC was not an intermediate to Si$_3$N$_4$. That understanding was further confirmed by control experiments in which SiC aerogel articles were pyrolyzed under conditions that produce pure Si$_3$N$_4$ (1500° C., N$_2$) and remained intact.

Example 5

Application-relevant material properties and relationship to the nanostructure. Both types of porous ceramics of the invention herein were highly porous, yet sturdy, and thermally stable in air up to fairly high temperatures (near 1000° C.). Although at first glance Si$_3$N$_4$ aerogel articles appeared stiffer and better thermal insulators that their SiC counterparts, a sounder comparison of the two materials may be obtained by further analysis of their solid thermal conduction, $\lambda_s$, and their elastic moduli, E, from the perspective of their skeletal frameworks.

Following are observations regarding the skeletal framework from a thermal conductivity perspective. In porous materials, $\lambda_s$ depends on their bulk density, $\rho_b$, and is usually modeled according to Equation (5) (see: Lu, X., et al., *J. Non-Cryst. Solids*, 188:226-234 (1995); Lu, X., et al., *J. Appl. Phys.*, 73:581-584 (1993)).

$$\lambda_s = C(\rho_b)^\alpha \quad (5)$$

Exponent $\alpha$ depends on how material fills space, and typically varies between 1 and 1.5. For foams, for example, $\alpha$=1 (e.g., see: Weigold, L., et al., *J. Non-Cryst. Solids*, 368:105-111 (2013)), in base-catalyzed silica aerogels $\alpha$=1.5 (e.g., see: Fricke, J., et al., *Int. J. Heat Mass Transfer*, 35:2305-2309 (1992)), in resorcinol-formaldehyde aerogels 1.2≤$\alpha$≤1.5 (e.g., see: Lu, X., et al., *J. Non-Cryst. Solids*, 188:226-234 (1995)), and for several polyurethane aerogels, on average 1.0≤α≤1.5 (e.g., see: Chidambareswarapattar, C., et al., *Chem. Mater.*, 25:3205-3224 (2013)). Here, owing to the similarity of the two materials in terms of their origin, bulk density and pore structure, it is reasonable to assume that $\alpha_{SiC}=\alpha_{Si3N4}$. Pre-exponential factor C on the other hand depends on the chemical identity of the material and the pore geometry, which controls the thermal efficiency of interparticle contacts along the skeletal framework. For instance, larger contacts conduct heat more efficiently hence the C value is higher. Using Ashby's approach for modeling the pre-exponential factor (in a similar expression describing the evolution of Young's modulus as a function of density; see below), C was expressed as $C=\lambda_{pure\_SiC}$ (or $\lambda_{pure\_Si3N4}$)×$C_G$, where $C_G$ is the geometric factor of interparticle contacts, in the context of what was just described. Considering the experimental ratio $\lambda_{s,SiC}/\lambda_{s,Si3N4}$ of the two materials (=2.878), and setting the other values accordingly (i.e., the $\rho_b$'s of SiC and Si$_3$N$_4$; see Table 2), it is calculated that for $\alpha=1.0$, $C_{G,SiC}=0.62\times C_{G,Si3N4}$, and that for $\alpha=1.5$, $C_{G,SiC}=0.57\times C_{G,Si3N4}$. Thereby, the interparticle contacts in the Si$_3$N$_4$ aerogel framework render its porous structure a more efficient (by about 2×) thermal conductor than the SiC porous structure, which is the opposite than what is suggested by considering the ratio of the intrinsic thermal conductivities of the two materials: $\lambda_{pure\_SiC}/\lambda_{pure\_Si3N4}=4$. That inverted behavior of our nanostructured Si$_3$N$_4$ is attributed to the large-area, face-to-face contacts between its skeletal platens (FIG. 15).

Following are observations regarding the skeletal framework from a stiffness perspective. Without being bound by theory, the higher stiffness of the Si$_3$N$_4$ aerogels may be attributed to the more efficient contacts between skeletal platens as identified via analysis of $\lambda_s$. Yet, the question is how can a significantly stiffer material (SiC) end up with lower modulus? The modulus of low-density porous materials like aerogels is modeled as a function of their relative density, $\rho_b/\rho_s$ (calculated from values in Table 1), according to Equation (6) published in the literature, where E° is the intrinsic modulus of $$E = E°A_G\left(\frac{\rho_b}{\rho_s}\right)^X \quad (6)$$

the pure, non-porous material, $A_G$ is a geometric factor similar to $C_G$ (see above), and "X" is an exponent that expresses the sensitivity of E to $\rho_b$, and is related to the network morphology. Here, $E°_{SiC}=430$ GPa, and $E°_{Si3N4}=304$ GPa (see: Calister, W. D. Jr., Materials Science and Engineering, an Introduction, Fourth Edition, John Wiley & Sons, Inc. New York, N.Y.: 1997, Chapter 13.8, p 401). By considering the experimental ratio $E_{SiC}/E_{Si3N4}$ (=0.618), and by setting $A_G=C_G$ (=0.60, i.e., equal to the average $C_G$ values discussed above), it was calculated that exponents $X_{SiC}$ and $X_{Si3N4}$ were related via Equation (7), namely $X_{SiC}>X_{Si3N4}$, $$X_{SiC}=1.05\times X_{Si3N4}\pm 0.156 \quad (7)$$

thereby SiC aerogels were more sensitive to changes in bulk density than Si$_3$N$_4$ aerogels, which justifies the observed crossover, whereas stiffer SiC in the bulk form, ended up with lower modulus in the porous form. Thus, the higher stiffness of the Si$_3$N$_4$ artifacts may be attributed to both the apparently efficient contact between its skeletal platens, and the different way the two materials fill space (platens vs fused particles).

Following is an overall assessment of SiC versus Si$_3$N$_4$ aerogel articles. For this purpose, the properties of the SiC aerogel articles that are advantageously obtained from xerogels in accordance with embodiments of the invention herein are compared with the substantially inferior properties of the SiC foams reported in the literature by Jana, D. C., et al., *J. Am. Ceram. Soc.*, 100:312-322 (2017). Thus, comparing the mechanical properties and the thermal conductivity of the SiC aerogels of this invention with those for the SiC foams of Jana et al. at the same relative density ($\rho_b/\rho_s=0.12$), and porosity (88%), the materials of this invention are slightly stronger (7.5 vs. 3.5 MPa), much less stiff (37 MPa vs. 2.5 GPa), and much better thermal insulators (0.163 vs. ca. 3.5 W m$^{-1}$ K$^{-1}$) than the SiC foams. Without being bound by theory, those trends may be attributed to, or expected from, the morphological differences between SiC of this invention, and the literature SiC foams. On the other hand, owing to the lower intrinsic thermal conductivity of silica (1.38 W m$^{-1}$ K$^{-1}$ at room temperature) (see: http://accuratus.com/materials.html (10 Oct. 2017)), together with the smaller, more numerous particles filling space at similar porosities like those reported here for SiC and Si$_3$N$_4$, silica aerogels are much better thermal insulator (see: Li, Z.-Y., et al., *J. Non. Cryst. Solids*, 430:43-51 (2015)) than both porous ceramics of this invention. By the same token, however, owing to its lower melting point, silica is not suitable for very high temperature applications. In that regime, data presented herewith suggest that Si$_3$N$_4$ aerogels are better overall materials than SiC; they display higher oxidation resistance (up to 1000° C.), lower overall thermal conductivity (despite the penalty due to the efficient contact of platens) and higher modulus.

The following Examples provide additional experimental details of the procedures used in the invention.

Example 6

Materials. All reagents and solvents were used as received, unless noted otherwise. Tetramethylorthosilicate (TMOS), 3-aminopropyltriethoxysilane (APTES) and ammonium hydroxide (NH$_4$OH, ACS reagent) were purchased from the Sigma Aldrich Chemical Co. HPLC grade solvents including hexane, methanol (CH$_3$OH), ethyl acetate (EtOAc), n-pentane were purchased from Sigma Aldrich Chemical Co. Technical grade acetone was purchased from Univar (St. Louis, Mo.). Tris(4-isocyanatophenylmethane) (TIPM) was donated by Covestro LLC (Pittsburgh, Pa.) as a 27% w/w solution in dry EtOAc under the trade name Desmodur RE. Ultra-high purity Ar (grade 5), N$_2$ (grade 4.8) and Ar (99.99999%) gases were purchased from Ozarc Gas (Rolla, Mo.). For comparison and chemical identification purposes, authentic samples of α-SiC (Grade UF-25) and of Si$_3$N$_4$ (Grade M11) were purchased from H. C. Stark Inc. (Euclid, Ohio); β-SiC was purchased from Performance Ceramics Co. (Peninsula, Ohio).

Example 7

Preparation of APTES@TMOS silica powder. Hexane (43 mL, 3× the volume of the intended sol) was added under flowing dry (drying tube) Ar (99.99999%) to a three-neck round bottom flask equipped with a mechanical stirrer and a drying tube. To that flask, Solution A consisting of 4.5 mL of CH$_3$OH and 3.85 mL (0.026 mol) of TMOS, and solution B consisting of 4.5 mL of CH$_3$OH, 1.5 mL (0.083 mol) of water and 40 μL NH$_4$OH were added successively at room temperature under vigorous stirring (770-950 rpm). As soon as the mixture developed fine particles and turned white (approximately 20 min), 1.28 mL of APTES (approximately ⅓× the volume of TMOS) was added to the flask, and the reaction mixture was stirred at the same rate for 24 h at room temperature. The resulting APTES@TMOS suspension was transferred to centrifuge tubes (50 ml, Fisher Scientific) and the solvent was exchanged twice with ethyl acetate and once with water-saturated ethyl acetate (EtOAc/$H_2O$). After standing for 15 h in EtOAc/$H_2O$, the APTES@TMOS suspension was given one acetone wash and was either processed to X-APTES@TMOS powder (see below), or was dried under vacuum at room temperature after three more washes with pentane. All washes and solvent exchanges were carried out with centrifugation for 15-20 min at 2450 rpm. Each time, the supernatant solvent was removed and the volume of the new solvent that was brought in was 2× the volume of the compacted slurry (paste) at the bottom of the centrifuge tubes. Before every new centrifugation step, the compacted slurry was re-suspended with vigorous agitation with a glass rod.

Example 8

Preparation of crosslinked X-APTES@TMOS silica powder. Desmodur RE (6× the volume of the centrifuged paste) was added to the centrifuge tubes containing the APTES@TMOS slurry from the last acetone wash, the tubes were sealed tightly with their caps, and the suspension was heated in an oven at 65° C. for 72 h. The mixture was swirled slowly every 10 to 12 h to re-distribute the settled powder and increase the diffusion rate. At the end of the 3-day period, the tubes were allowed to cool to room temperature and they were centrifuged for 15 to 20 min followed successively by three acetone washes and three pentane washes. The wash solvent was always removed by centrifugation. Again, for all washes, the volume of solvent added was twice the volume of the paste at the bottom of the tubes. After removing the solvent from the last pentane wash, the contents of the tubes were transferred with the aid of small portions of pentane and were combined in a round bottom flask. Pentane was removed, and the product was dried under reduced pressure (water aspirator connected via a drying tube) at room temperature into a dry, freely flowing X-APTES@TMOS powder.

Example 9

Preparation of TMOS-co-APTES and X-TMOS-co-APTES monolithic aerogels. These were prepared by mixing Solution A and Solution B from above, following standard procedures that involve drying with supercritical fluid $CO_2$ (e.g., see: Katti, A., et al., *Chem. Mater.*, 18:285-296 (2006)).

Example 10

Preparation of porous SiC and $Si_3N_4$ monoliths. Dry X-APTES@TMOS powder was compressed into various cylindrical and annular monolithic objects using aluminum dies of different sizes and shapes and a hydraulic press operated at 15,000 psi. Placement of the powder in the dies was carried out in small portions under continuous tapping. Compressed objects were converted to porous SiC or $Si_3N_4$ pyrolytically in a tube furnace set at 1500° C. for 36 h under flowing ultra-high purity Ar or $N_2$, respectively. In both cases the gas flow rate was set at 325 mL min$^{-1}$. Residual carbon from the crude SiC and $Si_3N_4$ samples was removed by heating in air for 24 h in a muffle furnace at 800° C. and 600° C., respectively.

Example 11

Methods. Pyrolytic conversion of X-APTES@TMOS compacts to SiC and $Si_3N_4$ was carried out in a programmable MTI GSL1600X-80 tube furnace (outer and inner tubes both of 99.8% pure alumina; outer tube: 1022 mm×82 mm×70 mm; inner tube: 610 mm×61.45 mm×53.55 mm; heating zone at set temperature: 457 mm). The temperature of the tube furnace was raised under flowing Ar or $N_2$ from ambient to the carbothermal reaction temperature at 2.5° C. min$^{-1}$. The temperature was maintained at that level for the prescribed length of time. Cooling back to room temperature was carried out under constant flow of Ar or $N_2$, again at 2.5° C.

Example 12

Physical Characterization. Bulk densities (pb) were calculated from the weight and the physical dimensions of the samples. Skeletal densities (os) were determined with helium pycnometry using a Micromeritics AccuPyc II 1340 instrument. Samples for skeletal density measurements were outgassed for 24 h at 80° C. under vacuum before analysis. Percent porosities, Π, were determined from the $\rho_b$ and $\rho_s$ values via $\Pi=100\times(\rho_s-\rho_b)/\rho_s$.

Example 13

Figure 10:
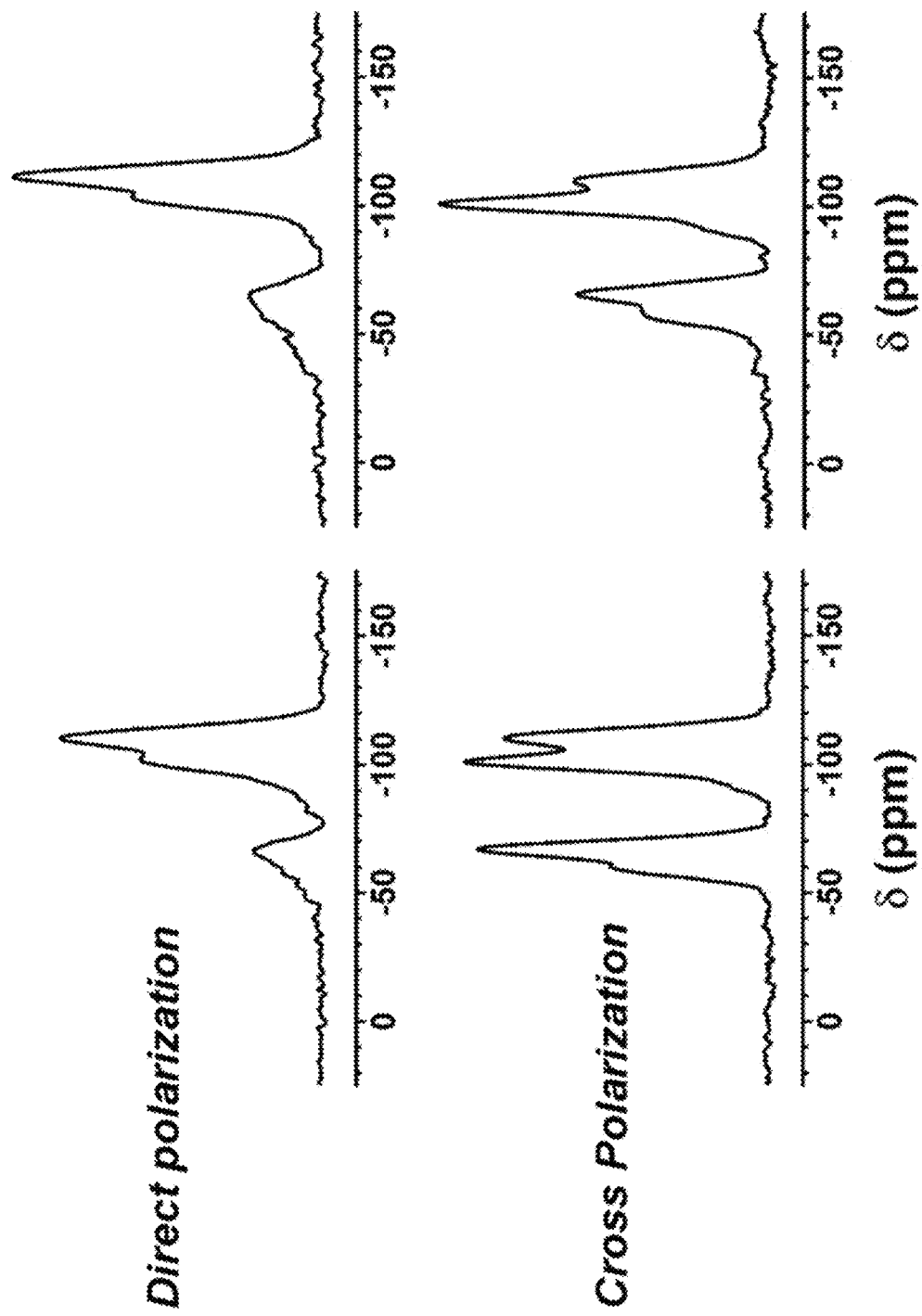
FIG. 10 displays solid-state $^{29}Si$ NMR of APTES@TMOS and of X-APTES@TMOS under two different acquisition conditions (using two different modes): Direct and cross-polarization (CP). The enhancement of Q3 and T2 under CP, and the even higher enhancement of Q3 relative to Q4 after crosslinking, signify that the TIPM-derived crosslinking polymer (polyurea) latches not only on APTES-provided —$NH_2$ groups, but also on —OH groups of Q3 positions.

Chemical Characterization. Solid-state $^{13}$C NMR spectra were obtained for powder samples on a Bruker Avance III 400 MHz spectrometer with a carbon frequency of 100 MHz using a 7 mm Bruker MAS probe and magic-angle spinning at 5 kHz. Broadband proton suppression along with CPTOSS pulse sequence were used for cross-polarization and spin sideband suppression. Solid-state $^{13}$C NMR spectra were referenced externally to glycine (carbonyl carbon at 176.03 ppm), Solid-state $^{29}$Si NMR spectra were also obtained on the same Bruker Avance III 400 MHz spectrometer with a 59.624 MHz silicon frequency using again a 7 mm Bruker MAS probe and magic angle spinning at 5 kHz. $^{29}$Si NMR spectra of samples without protons (SiC, FIG. 12) were acquired using a single pulse excitation (i.e., direct polarization). $^{29}$Si NMR spectra of all other samples were obtained using both cross-polarization (CPMAS pulse sequence —FIG. 8), and direct polarization (FIG. 10). $^{29}$Si NMR spectra were referenced externally to neat tetramethylsilane (TMS. 0 ppm). The relaxation delay was set at 5 s in all experiments, while the number of scans was set at 2,048 and 16,384 for $^{13}$C and $^{29}$Si, respectively. The cross-polarization contact time was set at 3000 μs.

Example 14

X-ray diffraction analysis was performed with powders of the corresponding materials using a PANalytical X'Pert Pro multipurpose diffractometer (MPD) with Cu Kα radiation (λ=1.54 Å) and a proportional counter detector equipped with a flat graphite monochromator. Crystallite sizes were calculated using the Scherrer equation (see Patterson, A., *Phys. Rev.*, 56:978-982 (1939)), from the full-width-at-half-maxima of selected reflections after subtracting the instrument line broadening.

Example 15

Solid Framework Characterization. Scanning electron microscopy (SEM) was conducted with Au-coated samples on a Hitachi Model S-4700 field-emission microscope.

Example 16

Pore Structure Analysis. BET surface areas were determined with $N_2$-sorption porosimetry at 77 K using a Micromeritics ASAP 2020 surface area and porosity analyzer. Samples for $N_2$-sorption analysis were outgassed for 24 h at 80° C. under a vacuum before analysis. The pore size distribution of both the SiC and $Si_3N_4$ objects was also investigated with Hg-intrusion porosimetry using a Micromeritics AutoPore IV 9500 instrument.

Example 17

Thermal Characterization. Thermogravimetric analysis (TGA) was conducted under $N_2$ or $O_2$ with a TA Instruments Model TGA Q50 thermogravimetric analyzer, using a heating rate of 5° C. $min^{-1}$.

Modulated Differential Scanning calorimetry (MDSC) was conducted under $N_2$ with a TA Instruments Differential Scanning calorimeter Model Q2000. Heat capacities, $c_P$, at 23° C. of powders (4-8 mg), needed for the determination of their thermal conductivity, $\lambda$, were measured using the MDSC method with a TA Instruments Differential Scanning calorimeter Model Q2000 calibrated against a sapphire standard and run from 0° C. to 40° C. at 0.5° C. $min^{-1}$ in the modulated T4P mode, using 100 s as the modulation period and 0.13° C. as the modulation amplitude. Raw $c_P$ data were multiplied with a correction factor (1.008±0.041) based on measuring the heat capacities of a rutile and of a corundum sample just before running the SiC and $Si_3N_4$ aerogel samples, and taking the ratios with the corresponding literature values for heat capacities.

Thermal conductivities, $\lambda$, were determined via $\lambda = \rho_b \times c_P \times R$, whereas the thermal diffusivity, R, was measured with a Netzsch NanoFlash Model LFA 447 flash diffusivity instrument using disk samples about 1 cm in diameter, 1.8-2.5-mm-thick (see Parker, W. J., et al., *J. Appl. Phys.*, 32:1679-1684 (1961)). Samples were first sputter-coated with gold and then spray-coated with carbon on both faces to minimize radiative heat transfer and ensure complete absorption of the heat pulse (see Lee, D., et al., *J. Non-Cryst. Solids*, 186:285-290 (1995)). Before every run, the instrument was checked with manufacturer provided standards (Pyrex 7740, Pyrocream 9606, 99.8% Alumina and AXM-5Q Poco Graphite). Samples were heated with a heat pulse from one side, and the temperature increase was observed as a function of time on the other. Subsequently, data (FIG. 17B) were fitted with the pulse-corrected Cowan model that approximates the heat-transfer equation using an initial value for the thermal diffusivity estimated from the time it takes the detector voltage (proportional to the temperature) to reach its half-maximum value (denoted as $t_{50}$) (see: Cowan, R. D., *J. Appl. Phys.*, 32:1363-1369 (1961) and 34:926-927 (1963)).

Example 18

Mechanical Characterization. Quasi-static compression testing at low strain rates (2.5 mm/mm) was conducted on an Instron 4469 Universal Testing Machine using a 500 N load cell, following testing procedures and specimen length/diameter ratios in the spirit of ASTM D1621-04a (Standard Test Method for Compressive Properties of Rigid Cellular Plastics), as described before (see Leventis, N., et al., *J. Mater. Chem.*, 18:2475-2482 (2008)). The specimens had a nominal diameter of 1.0 cm and a length/diameter ratio of 0.6. The recorded force as a function of displacement (machine-compliance corrected) was converted into stress as a function of strain.

Example 19

Figure 18:
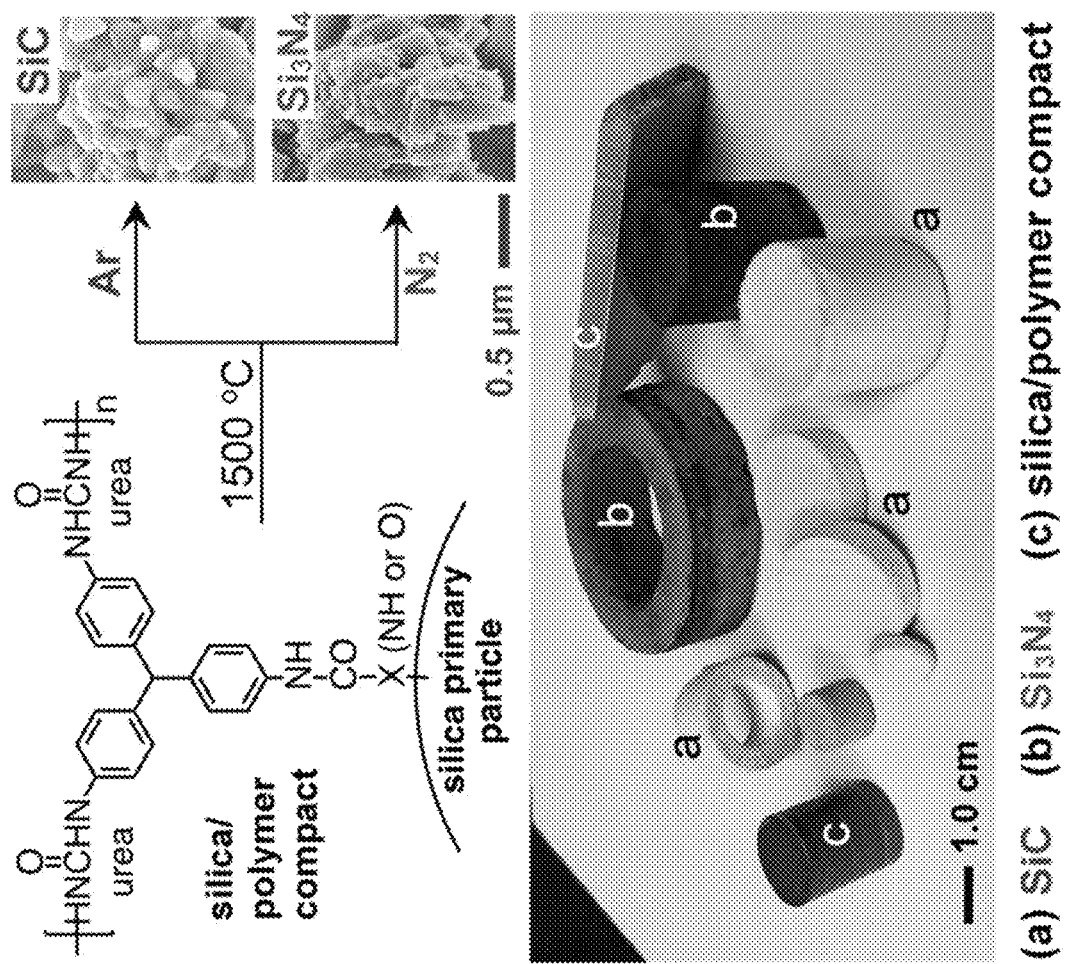
FIG. 18 shows large SiC and $Si_3N_4$ aerogel monoliths with porosities over 85% as prepared herein carbothermally at 1500° C. under Ar or $N_2$, respectively, from compressed-to-shape silica xerogel powders coated conformally with a carbonizable polyurea/polyurethane.

FIG. 18 shows large SiC and $Si_3N_4$ aerogel monoliths with porosities over 85% as prepared herein carbothermally at 1500° C. under Ar or $N_2$, respectively, from compressed-to-shape silica xerogel powders coated conformally with a carbonizable polyurea.

Example 20

Figure 19:
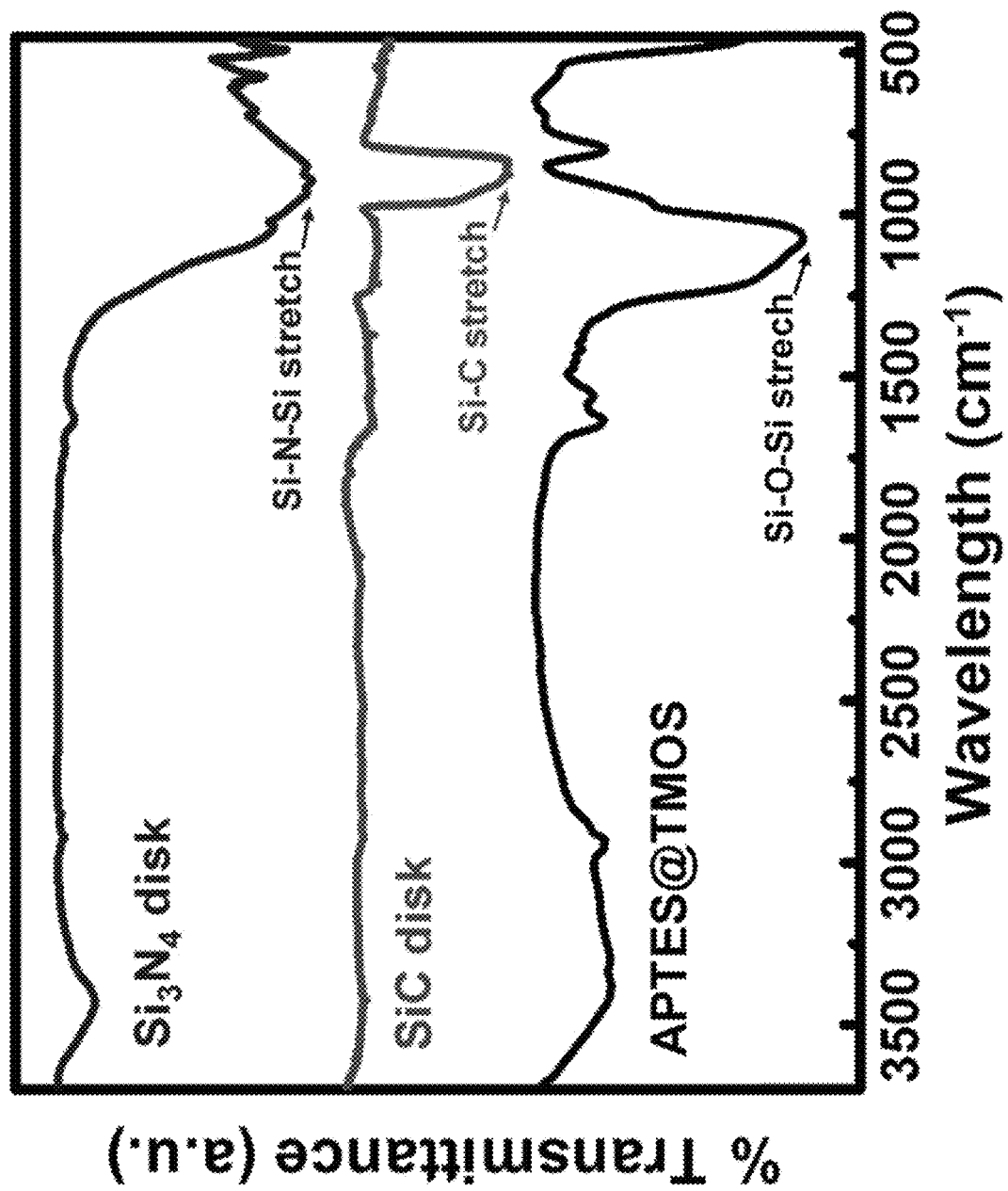
FIG. 19 shows FTIR spectra of APTES@TMOS powder, SiC, and $Si_3N_4$ disks.

FIG. 19 shows FTIR spectra of powder, SiC, and $Si_3N_4$ disks. The FTIR spectrum of aptes@tmos powder shows a peak at 1073 $cm^{-1}$ corresponding to Si—O—Si stretch; that peak is completely diminished in SiC representing absence of unreacted silica. A new peak at 823 $cm^{-1}$ corresponds to Si—C stretch of SiC. The FTIR spectrum of $Si_3N_4$ shows a broad peak at around 900 $cm^{-1}$ corresponding to Si—N—Si stretch.

Example 21

Figure 20:
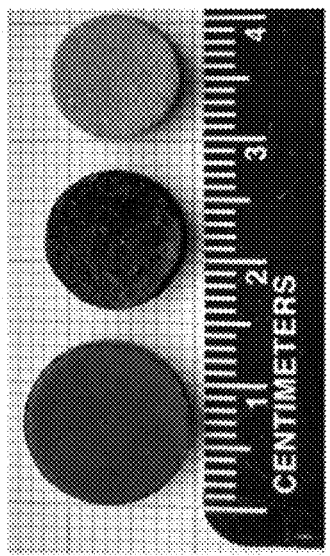
FIG. 20 shows a display summarizing some key properties of SiC and $Si_3N_4$ discs produced according to the embodiments herein.
Figure 20:

FIG. 20 shows a display summarizing some key properties of SiC and $Si_3N_4$ discs produced according to the embodiments herein.

Details regarding extending the foregoing procedures for preparation of sturdy, shaped, highly porous SiC and $Si_3N_4$ monolithic aerogel compositions or objects towards preparation of sturdy, shaped, highly porous monolithic metal carbide, metal boride, and metallic aerogels are provided in the following illustrative examples.

Example 22

Figure 21:
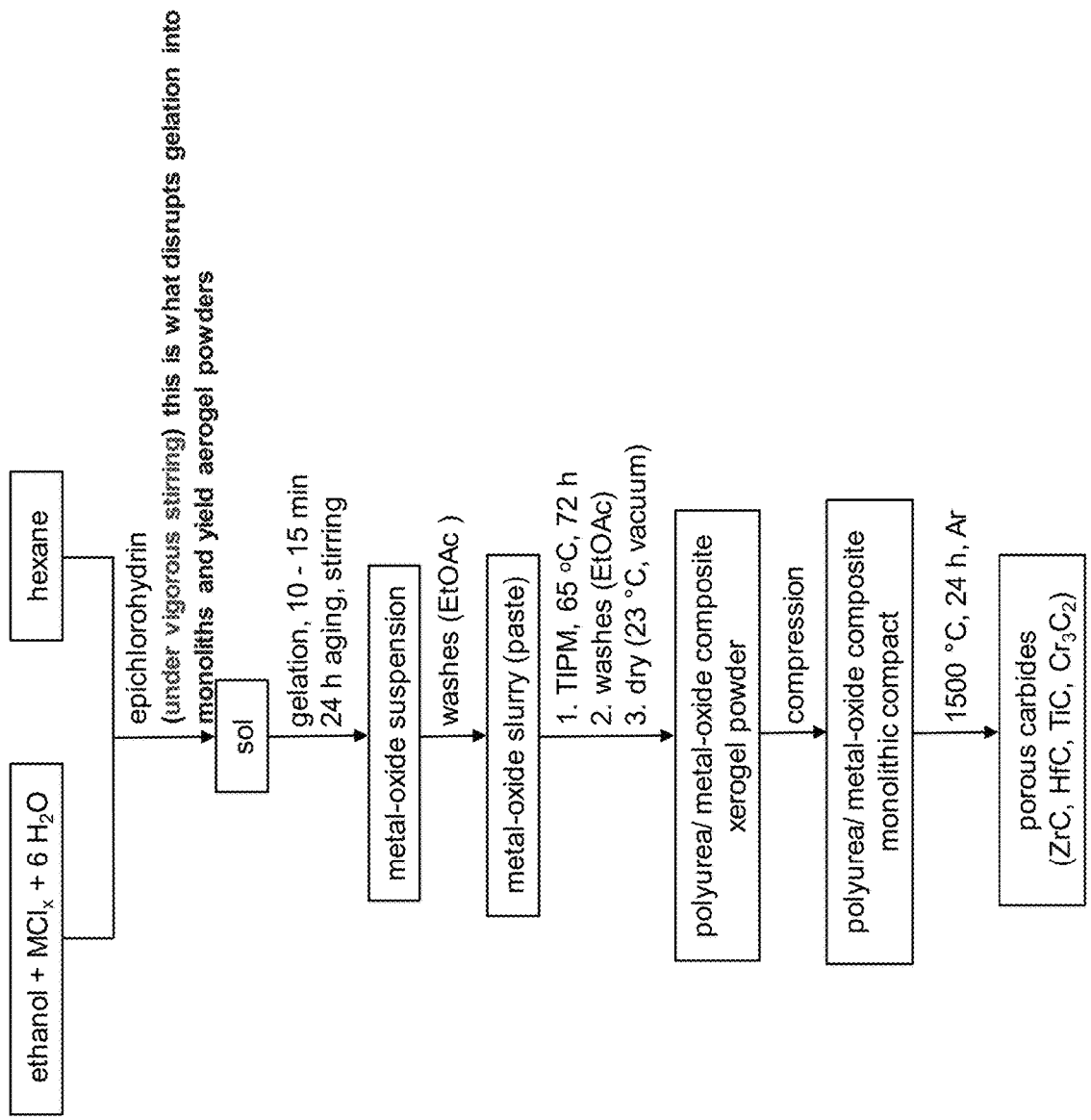
FIG. 21 shows a flowchart for the synthesis of monolithic porous metal carbides according to the embodiments herein. M=metal.
Figure 22:
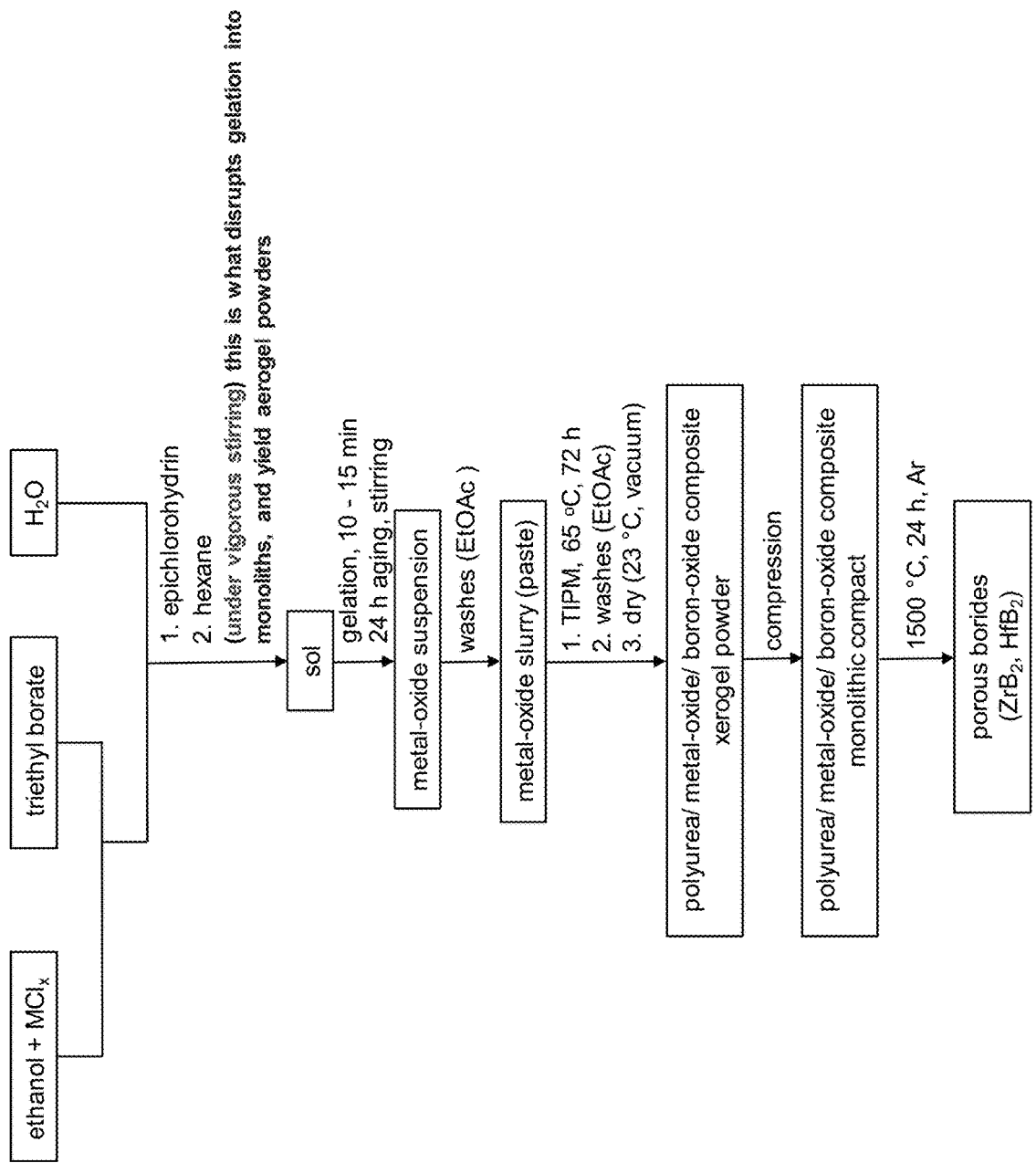
FIG. 22 shows a flowchart for the synthesis of monolithic porous metal borides according to the embodiments herein. M=metal.

FIG. 21 shows a flowchart for the synthesis of the monolithic porous metal carbide aerogels; FIG. 22 shows a flowchart for the synthesis of monolithic porous metal boride aerogels. Synthesis of the monolithic porous carbide aerogels (ZrC, HfC, TiC, $Cr_3C_2$) and boride aerogels ($ZrB_2$, $HfB_2$) was accomplished as follows:

(a) Preparation of suspensions of sol-gel derived metal-oxides for conversion to metal carbides. Anhydrous metal chloride salt (0.06622 mol) was dissolved in 200 mL of ethanol followed by addition of 7.15 mL (0.397 mol) of water. To this solution, 200 mL of hexane and 55 mL (0.632 mol) of epichlorohydrin (a proton removing agent) was added in sequence. The reaction mixture was stirred for 24 h (unoptimized) at room temperature.

(b) Preparation of suspensions of sol-gel derived metal-oxides/boron-oxides for conversion to metal borides. Anhydrous metal chloride salt (0.06622 mol) was dissolved in 200 mL of ethanol followed by addition of 67.55 mL (0.397 mol) of boron ethoxide. To that solution, 25 mL (1.391 mol) of water, 200 ml of hexane and 55 mL (0.632 mol) of epichlorohydrin was added in a stepwise manner in the order mentioned. The reaction mixture was stirred for 24 h at room temperature.

(c) The resulting metal-oxide or metal-oxide/boron-oxide suspension was transferred to centrifuge tubes (50 mL, Fischer Scientific), and the solvent was exchanged three times with ethyl acetate. All washes and solvent exchanges were carried out with centrifugation for 15-20 min. Each time, the supernatant solvent was removed and the volume of the new solvent that was brought in was 2× the volume of the compacted slurry (paste) remaining at the bottom of the centrifuge tubes. Before every new centrifugation step, the compacted slurry was re-suspended with vigorous agitation using a glass rod.

(d) Preparation of polyurea-modified metal-oxide or metal-oxide/boron-oxide composite xerogel powders. Desmodur® RE (1 to 6× the volume of the centrifuged paste) was added to the centrifuge tubes containing the metal oxide or metal-oxide/boron-oxide slurry from the last ethyl acetate wash, the tubes were sealed tightly with their caps, and the suspension was heated in an oven at 65° C. for 72 h (unoptimized). The mixture was swirled slowly every 10 to 12 h to re-distribute the settled powder and increase the diffusion rate. At the end of the 3-day period, the tubes were allowed to cool to room temperature and they were centrifuged for 15 to 20 min, followed successively by three washes with ethyl acetate. The wash solvent was removed by centrifugation every time. For all washes, the volume of solvent added was twice the volume of the paste at the bottom of the tubes. After removing the solvent from the last ethyl acetate wash, the contents of the tubes were transferred with the aid of small portions of ethyl acetate and were combined in a round bottom flask. The product was dried at 80° C. under reduced pressure (water aspirator connected via a drying tube) into a dry polyurea modified metal-oxide or metal-oxide/boron-oxide composite xerogel powder.

(e) Preparation of porous carbide and boride monoliths. The dry polyurea modified metal-oxide or metal-oxide/boron-oxide composite xerogel powder was compressed into pellets using an aluminum die and a hydraulic press operated at 15,000 psi. Placement of the powder in the die was carried out in small portions under continuous tapping. Compressed pellets were converted to porous carbides or borides in a tube furnace at 1500° C. for 24 h under flowing ultra-high purity Ar. The gas flow rate was set at 325 min$^{-1}$.

Example 23

Figure 23:
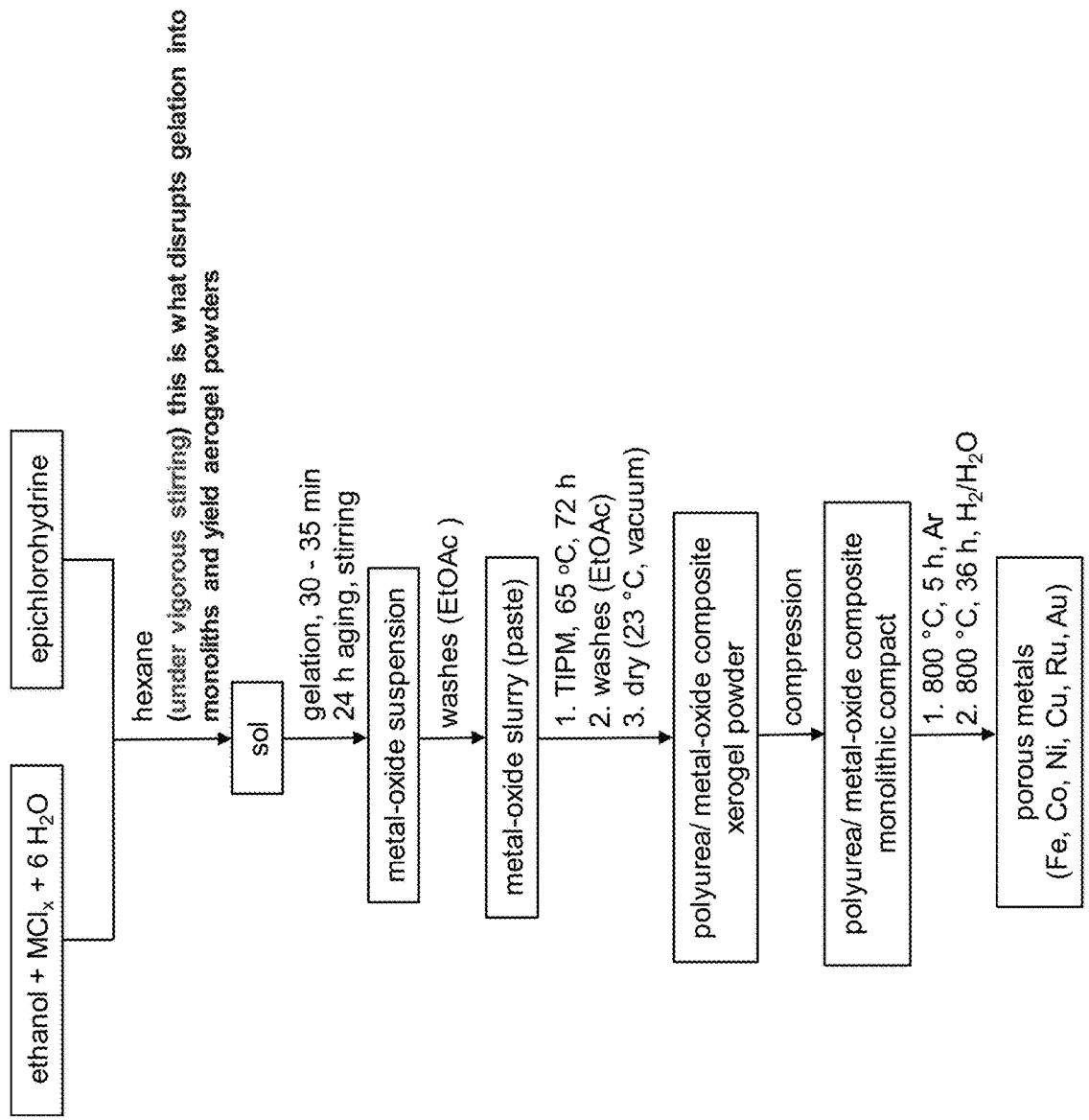
FIG. 23 shows a flowchart for the synthesis of monolithic nanoporous metals according to the embodiments herein. M=metal.

FIG. 23 shows a flowchart for the synthesis of the monolithic porous metallic aerogels. Synthesis of the monolithic nanoporous metallic aerogels of iron (Fe), nickel (Ni), cobalt (Co), copper (Cu), ruthenium (Ru), and gold (Au) was accomplished as follows:

(a) Preparation of suspensions of sol-gel derived metal-oxides. Hexahydrated metal chloride salt (0.06622 mol) was dissolved in 100 mL of ethanol followed by addition of 55 mL (0.632 mol) of epichlorohydrin as a proton removing agent. That sol was immediately added to a round bottom flask containing 100 mL of hexane under stirring. After about 35 min the mixture developed fine particles and was converted into a thick suspension. At this point another 50 mL of hexane was added. The reaction mixture was stirred for 24 h at room temperature. The suspension was transferred to centrifuge tubes (50 mL, Fischer Scientific), and the solvent was exchanged three times with ethyl acetate. All washes and solvent exchanges were carried out with centrifugation for 15-20 min. Each time, the supernatant solvent was removed and the volume of the new solvent that was brought in was 2× the volume of the compacted slurry (paste) remaining at the bottom of the centrifuge tubes. Before every new centrifugation step, the compacted slurry was re-suspended with vigorous agitation using a glass rod.

(b) Preparation of polyurea/metal-oxide composite xerogel powders. Desmodur® RE (1× the volume of the centrifuged paste) was added to the centrifuge tubes containing the sol-gel derived metal oxide slurry from the last ethyl acetate wash, the tubes were sealed tightly with their caps, and the suspension was heated in an oven at 65° C. for 72 h. The mixture was swirled slowly every 10 to 12 h to re-distribute the settled powder and increase the diffusion rate. At the end of the 3-day period (unoptimized), the tubes were allowed to cool to room temperature and they were centrifuged for 15 to 20 min, followed successively by three washes with ethyl acetate. The wash solvent was always removed by centrifugation. For all washes, the volume of solvent added was twice the volume of the paste at the bottom of the tubes. After removing the solvent from the last ethyl acetate wash, the contents of the tubes were transferred with the aid of small portions of ethyl acetate and were combined in a round bottom flask. The product was dried at 80° C. under reduced pressure (water aspirator connected via a drying tube) into a dry polyurea/metal-oxide composite xerogel powder.

(c) Preparation of porous metallic monoliths. The dry polyurea/metal-oxide composite powder was compressed into desirable shapes (e.g., pellets) using an aluminum die and a hydraulic press operated at 15,000 psi. Placement of the powder in the die was carried out in small portions under continuous tapping. Compressed pellets were carbothermally reduced in a tube furnace at 800° C. for 5 h under flowing high purity Ar. The resulting mostly-metallic pellets were further treated in the tube furnace for residual carbon removal in order to obtain pure highly porous metallic monoliths. That treatment was carried out with water saturated $H_2$ ($H_2$ was bubbled through water before directing to the furnace) at 800° C. for 36 h. During both runs the gas flow rate was set at 325 min$^{-1}$.

Example 24

Figure 24:
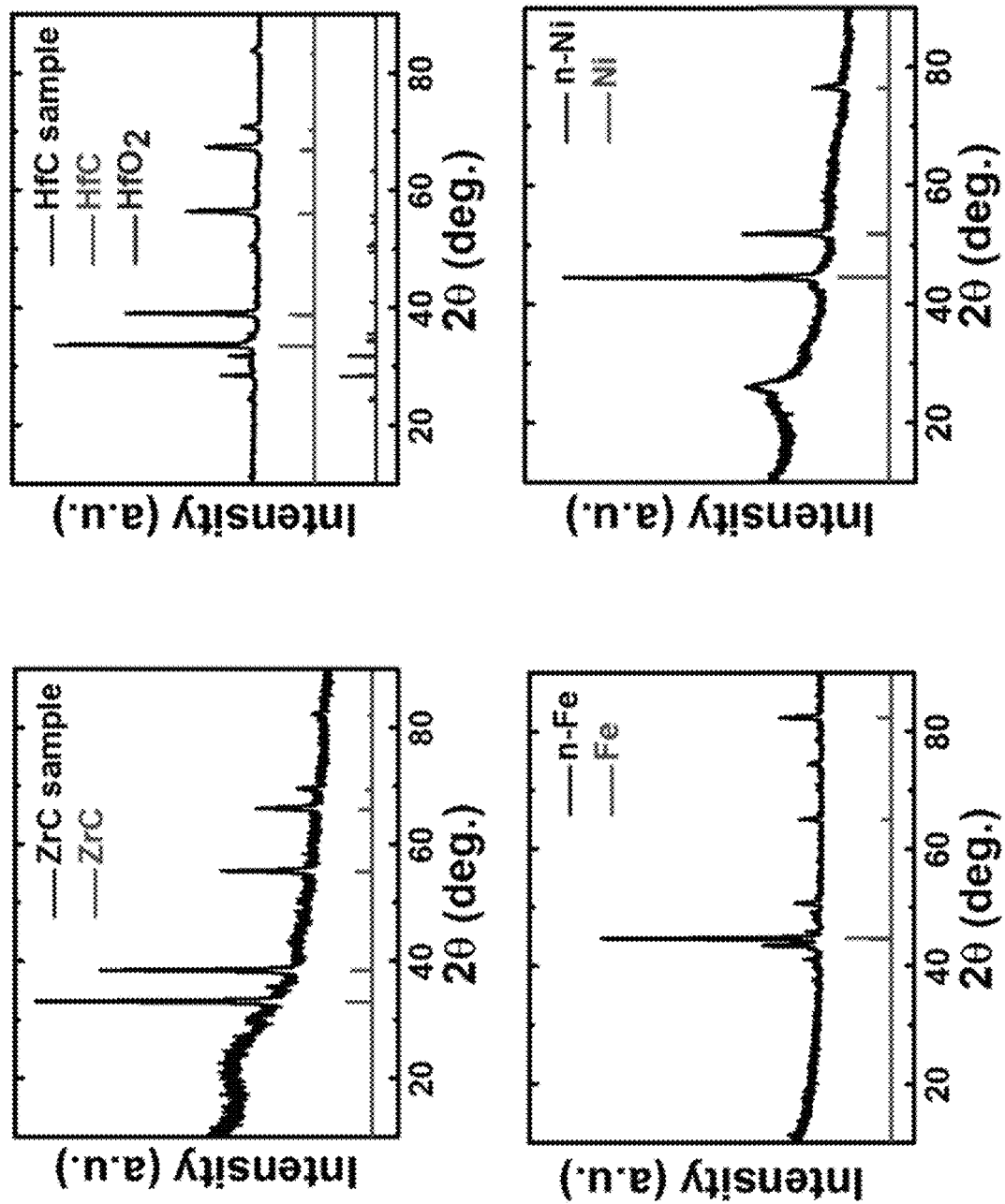
FIG. 24 displays characterization via XRD of representative pure, monolithic porous carbides and nanoporous metals produced according to the flowcharts of FIG. 21 and FIG. 23, namely, ZrC, HfC, Fe(0), and Ni(0).

FIG. 24 displays characterization via XRD of representative pure, monolithic porous carbides and nanoporous metals produced according to the charts of FIG. 21 and FIG. 23, namely, ZrC, HfC, Fe, and Ni.

Example 25

Figure 25:
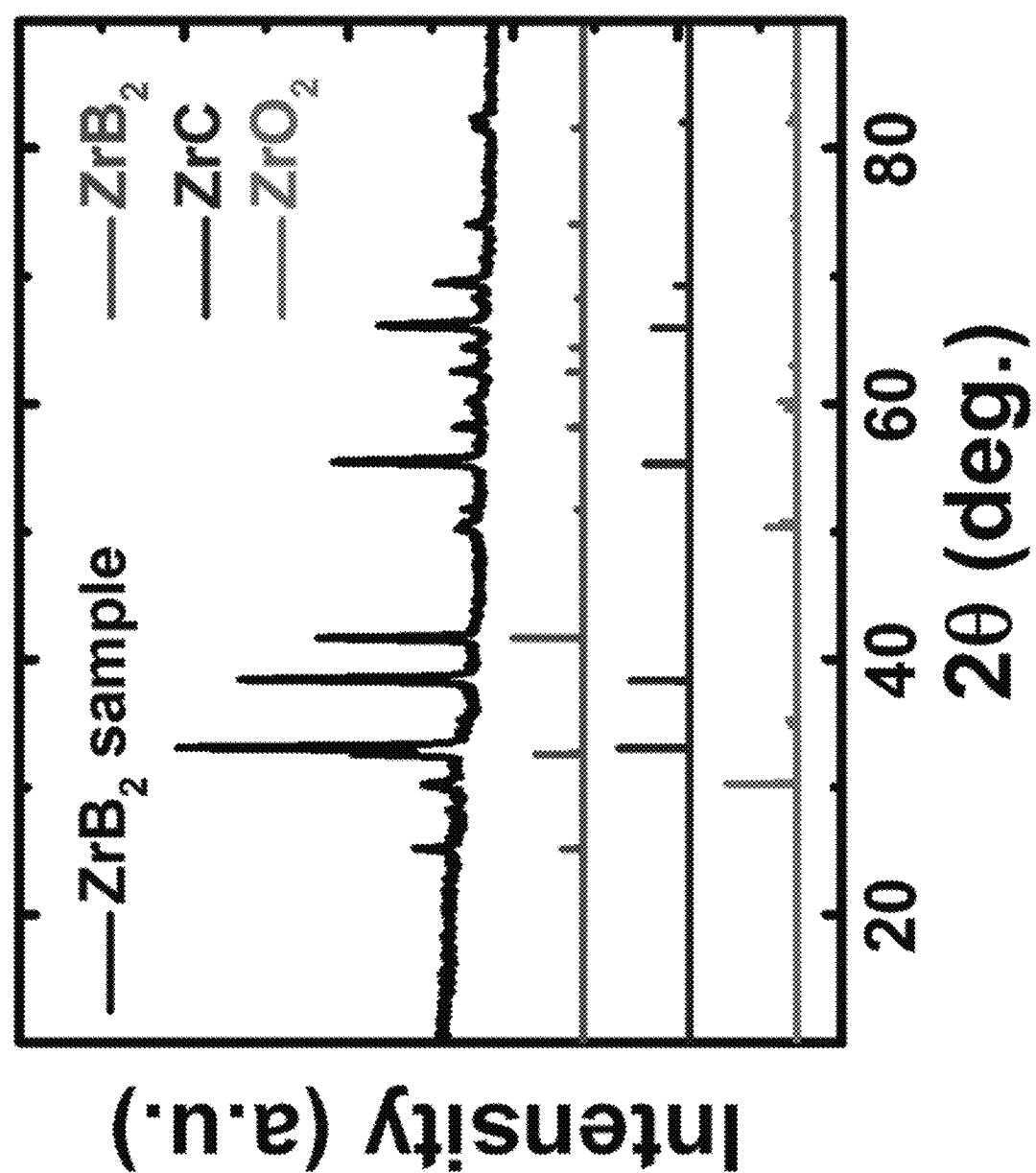
FIG. 25 displays characterization via XRD of a representative pure, monolithic porous metal boride, namely, $ZrB_2$ produced according to the flowchart of FIG. 24.

FIG. 25 displays characterization via XRD of a representative pure, monolithic porous metal boride, namely, $ZrB_2$ produced according to the chart of FIG. 22.

Example 26

The porosity of metallic Fe obtained according to the method herein was on the order of about 94%, whereas the porosities of metallic Cu and Co were in the range between 35% and 56%. However, all three porous metals obtained herein include close porosity in their skeletal framework in the range between 52% and 66%. Note that "close porosity" reflects voids that are not accessible from the outside; the presence of close porosity is inferred and calculated from skeletal density measurements, in combination with TGA data that confirms that the material is basically pure metal.

As can be easily understood from the foregoing, the basic concepts of the present invention may be embodied in a variety of ways. The invention involves numerous and varied embodiments of producing and characterizing the compositions described herein. As such, the particular embodiments or elements of the invention disclosed by the description or shown in the figures or tables accompanying this application are intended to be exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of a composition or an apparatus or each step of a method may be described by a composition term, an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of a composition or apparatus may be disclosed as the physical element or the action which that physical element facilitates.

In addition, as to each term used, it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. For example, a numerical range of one to five includes the numeric values 1, 1.5, 2, 2.75, 3, 3.80, 4, 5, and so forth. It will be further understood that the endpoints of each of the ranges are significant both in relation to the other endpoint and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

It is to be understood that, as used herein, the grammatical conjunction "and/or" refers throughout to either or both of the stated possibilities.

The use of the term "or" in the claims is used to mean "and/or" unless explicitly indicated to refer to alternatives only or the alternatives are mutually exclusive, although the disclosure supports a definition that refers to only alternatives and "and/or."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Moreover, for the purposes of the present invention, the term "a" or "an" entity refers to one or more of that entity unless otherwise limited. As such, the terms "a" or "an", "one or more" and "at least one" can be used interchangeably herein.

As used herein, the term "composition" generally refers to any product comprising the specified ingredients in the specified amounts, as well as any product which results, directly or indirectly, from combinations of the specified ingredients in the specified amounts. It is to be understood that the compositions described herein may be prepared from isolated compounds described herein or from salts, solutions, hydrates, solvates, and other forms of the compounds described herein. It is also to be understood that the compositions may be prepared from various amorphous, non-amorphous, partially crystalline, crystalline, and/or other morphological forms of the compounds described herein. It is also to be understood that the compositions may be prepared from various hydrates and/or solvates of the compounds described herein. Accordingly, such compositions that recite compounds described herein are to be understood to include each of, or any combination of, the various morphological forms and/or solvate or hydrate forms of the compounds described herein.

For the purpose of this invention, it is to be understood that terms such as "gel and/or aerogel composition", "gel and/or aerogel material", "gel and/or aerogel", and related terms used herein, may be used interchangeably, unless clearly indicated by the context.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed, or deemed to be admitted as prior art with respect to the invention.

The claims set forth in this specification are hereby incorporated by reference as part of this description of the invention, and the applicants expressly reserve the right to use all of or a portion of such incorporated content of such claims as additional description to support any of or all of the claims or any element or component thereof, and the applicants further expressly reserve the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification are further intended to describe the metes and bounds of a limited number of the preferred embodiments of the invention and are not to be construed as the broadest embodiment of the invention or a complete listing of embodiments of the invention that may be claimed. The applicants do not waive any right to develop further claims based upon the description set forth above as a part of any continuation, division, or continuation-in-part, or similar application.

While the disclosure has been illustrated and described in detail in the figures and foregoing description, the same is to be considered as illustrative and not restrictive in character, it being understood that only selected embodiments have been shown and described and that all changes, modifications and equivalents that come within the spirit of the disclosures described heretofore and/or defined by the following claims are desired to be protected. It will be apparent to one of ordinary skill in the art that various changes and modifications can be made to the claimed invention without departing from the spirit and scope thereof. Thus, for example, those skilled in the art will recognize, or be able to ascertain, using no more than routine experimentation, numerous equivalents to the specific substances and procedures described herein. In addition, all publications cited herein are indicative of the level of skill in the art and are hereby incorporated by reference in their entirety as if each had been individually incorporated by reference and fully set forth.

What is claimed is:

1. A method for preparing porous ceramics and metals from chemically corresponding xerogel powder precursors said method comprising the steps of:
   (a) reacting the xerogel powder precursors with one or more polyfunctional monomers to obtain polymer-modified xerogel powder precursors;
   (b) compressing said polymer-modified xerogel powder precursors under pressure to obtain polymer-modified xerogel compacts;
   (c) subjecting the polymer-modified xerogel compacts to pyrolysis to obtain said porous ceramics and metals;
   wherein the polymer is pyrolytically carbonizable.

2. The method of claim 1, wherein said porous ceramics and metals are monoliths.

3. The method of claim 2, wherein said porous ceramic and metal monoliths are aerogels.

4. A method for preparing ceramic and metallic aerogels from chemically corresponding xerogel precursors, said method comprising the steps of:
   (a) reacting the xerogel precursors with one or more polyfunctional monomers to obtain polymer-modified xerogel precursors;
   (b) compressing said polymer-modified xerogel precursors under pressure to obtain polymer-modified xerogel compacts;
   (c) subjecting the polymer-modified xerogel compacts to pyrolysis to obtain said ceramic and metallic aerogels;
   wherein the polymer is pyrolytically carbonizable.

5. A method for preparing sturdy, shaped, highly porous silicon carbide (SiC) and silicon nitride ($Si_3N_4$) monolithic aerogel objects, said method comprising the steps of:
   (a) preparing a first solution comprising a silicon oxide-precursor in a first solvent, wherein the silicon oxide-precursor is a compound of the formula $Si(OR_a)_4$ where $R_a$ is a 1-4 carbon straight or branched alkyl group, and the first solvent is an alcohol selected from MeOH and EtOH;
   (b) preparing a second solution comprising one or more catalyst in a second solvent, wherein the catalyst is a compound capable of converting said silicon oxide-precursor to the corresponding silicon oxide, and wherein the second solvent is a mixture of water and an alcohol in a vol/vol ratio of about 1:3, wherein the alcohol is selected from MeOH and EtOH, and wherein the amount of alcohol in the second solvent is about the same as the amount of alcohol in the first solvent;
   (c) mixing together under vigorous stirring the first solution prepared in step (a) and the second solution prepared in step (b) in the presence of a non-polar solvent selected from hexane and pentane, for a period of time between about 10 minutes and about 30 minutes, to provide a suspension of silicon oxide, wherein the volume of non-polar solvent used is between about twice to about four times the combined volume of the first and second solutions;
   (d) continuing vigorous stirring of said suspension of silicon oxide for a period of time between about 18 hours and about 30 hours to cause disruption of gelation, and to result in obtaining a suspension of nanoparticulate silicon oxide;
   (e) adding to the vigorously stirred suspension of nanoparticulate silicon oxide a quantity of an aminating agent that introduces $NH_2$ groups to the nanoparticulate silicon oxide, and continuing vigorous stirring for a period between about 18 hours and about 30 hours, resulting in an aminated nanoparticulate silicon oxide suspension, wherein said aminating agent is a compound of the formula $H_2N(CH_2)_mSi(OR_b)_3$, where $R_b$ is a 1-4 carbon alkyl group and m is an integer in the range 2-6, and wherein the mol/mol ratio of aminating agent:silicon oxide-precursor is between about 0.1 and about 0.3;
   (f) subjecting the aminated nanoparticulate silicon oxide suspension to one or more washings with one or more solvents selected from an ester solvent, an ester solvent saturated with $H_2O$, and a ketone solvent, followed by removal of the solvents, to provide the aminated nanoparticulate silicon oxide in slurry or solid form;
   (g) reacting the aminated nanoparticulate silicon oxide with one or more polyisocyanate compound in an ester solvent at a temperature between about 55° C. and about 75° C. for a period of time between about 2 days and about 4 days, followed by 1-3 washings with acetone and 1-3 washings with an alkane solvent selected from pentane and hexane, and drying under vacuum, to obtain a nanoparticulate polyurethane- and/or polyurea-modified silicon oxide xerogel powder, wherein the polyisocyanate compound is a compound of the general formula $G_1$-$(NCO)_q$, in which $G_1$ is a moiety selected from $C_1$-$C_{10}$ straight chain alkyl or branched alkyl or cycloalkyl, alkylaryl, aryl, heteroalkyl, heterocyclylalkyl, or heteroaryl, each of which is optionally substituted, and q is an integer in the range 2-6, and wherein the amount of polyisocyanate compound used is such that the ratio of total NCO groups per mol of silicon-oxide precursor is in the range between about 0.4 and about 6.3;
   (h) compressing said nanoparticulate polyurethane- and/or polyurea-modified silicon oxide xerogel powder in one or more dies under a pressure between about 10,000 psi and about 20,000 psi, to obtain one or more shaped, nanoparticulate polyurethane- and/or polyurea-modified silicon oxide xerogel monolithic compacts;
   (i) subjecting said shaped, nanoparticulate polyurethane- and/or polyurea-modified silicon oxide xerogel monolithic compacts to one or more pyrolysis under one or more flowing gas, to obtain the porous monolithic SiC or $Si_3N_4$ aerogel objects;
wherein the one or more pyrolysis in step (i) includes a first pyrolysis at a temperature between about 1300° C. and about 1700° C. for a period of between about 24 hours and about 48 hours under flowing Ar gas, to result in impure aerogels of SiC that contain residual carbon, or under flowing $N_2$ gas, to result in impure aerogels of $Si_3N_4$ that contain residual carbon, followed by a second pyrolysis in air for a period of between about 18 hours and about 30 hours to remove the residual carbon at a temperature between about 700° C. and about 900° C. in the case of the impure SiC aerogel, or at a temperature between about 500° C. and about 700° C. in the case of the impure $Si_3N_4$ aerogel.

6. The method of claim 5, wherein the silicon oxide-precursor is tetramethoxysilane.

7. The method of claim 5, wherein the catalyst in step (b) is $NH_4OH$, used in an amount in the range between about 1 mL per mol of silicon oxide-precursor and about 2 mL per mol of silicon oxide-precursor.

8. The method of claim 5, wherein the aminating agent in step (e) is 3-aminopropyl triethoxysilane.

9. The method of claim 5, wherein in step (g) the one or more polyisocyanate compound is one or more compound of the general formula (II):

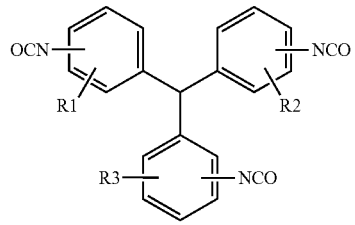
(II)

wherein the isocyanate groups of compound (II) are independently attached to their respective aryl rings at the 2, 3, or 4-positions of the aryl rings; and, wherein R1, R2, and R3 are independently one or more substituents selected from H, alkyl, cycloalkyl, alkoxy, alkylthio, aryl, aryloxy, arylthio, each of which is optionally substituted, and halogen, nitro, or cyano.

10. The method of claim 9, wherein the one or more polyisocyanate compound is 4,4',4"-triisocyanatophenyl-methane.

11. The method of claim 5, wherein in step (g) the period of time is about 3 days, and the temperature is about 65° C.

12. The method of claim 5, wherein the highly porous monolithic aerogel objects of SiC and $Si_3N_4$ have porosities ≥35%.

13. The method of claim 5, wherein the highly porous monolithic aerogel objects of SiC and $Si_3N_4$ have porosities ≥85%.

14. A method for preparing a nanoparticulate polyurethane- and/or polyurea-modified silicon oxide xerogel powder, said method consisting of steps (a) to (g) of the method of claim 5.

15. A nanoparticulate polyurethane- and/or polyurea-modified silicon oxide xerogel powder composition, obtained in accordance with steps (a) to (g) of the method of claim 5.

* * * * *